US010530998B2

(12) United States Patent
Oshima

(10) Patent No.: US 10,530,998 B2
(45) Date of Patent: Jan. 7, 2020

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/936,798

(22) Filed: Mar. 27, 2018

(65) Prior Publication Data
US 2018/0220071 A1 Aug. 2, 2018

Related U.S. Application Data

(63) Continuation of application No. PCT/JP2016/076806, filed on Sep. 12, 2016.

(30) Foreign Application Priority Data

Sep. 30, 2015 (JP) ................................. 2015-193478

(51) Int. Cl.
H04N 5/232 (2006.01)
G06T 3/40 (2006.01)
H04N 5/262 (2006.01)

(52) U.S. Cl.
CPC ........... H04N 5/23238 (2013.01); G06T 3/40 (2013.01); H04N 5/23293 (2013.01); H04N 5/2628 (2013.01)

(58) Field of Classification Search
CPC ........... H04N 5/23238; H04N 5/23293; H04N 5/23222; G06F 3/0485; G03B 37/005; G03B 37/02; G03B 37/04; G03B 37/06
See application file for complete search history.

(56) References Cited

U.S. PATENT DOCUMENTS 6,532,037 B1 3/2003 Shimura
2007/0159524 A1* 7/2007 Kim .................. G06T 3/4038
348/36

(Continued)

FOREIGN PATENT DOCUMENTS

JP 2000-125190 A 4/2000
JP 2002-94849 A 3/2002

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/076806, dated Apr. 12, 2018, with English translation.

(Continued)

Primary Examiner — Clifford Hilaire
(74) Attorney, Agent, or Firm — Birch, Stewart, Kolasch & Birch, LLP

(57) ABSTRACT

The plurality of captured images are stored as original linages in the image storage unit. A display region to be displayed in an enlarging manner in the panoramic images is set. It is determined whether or not the display region is in an imaging range of the original image. In a case where NO is determined, the display region is trimmed from the panoramic image and displayed on the display unit in an enlarging manner, and in a case where it is determined that the display region is in an imaging range of the original image, a corresponding region corresponding to the display region is trimmed from the original image and displayed on the display unit.

20 Claims, 33 Drawing Sheets

(56) References Cited

U.S. PATENT DOCUMENTS

| | | |
|---|---|---|
| 2009/0290013 A1 | 11/2009 | Hayashi |
| 2012/0011464 A1 | 1/2012 | Hayashi et al. |
| 2012/0105601 A1* | 5/2012 | Jeon .................... H04N 13/261 |
| | | 348/50 |
| 2012/0154442 A1 | 6/2012 | Takaoka et al. |
| 2014/0132708 A1 | 5/2014 | Kato |
| 2014/0300688 A1* | 10/2014 | Shin .................. H04N 5/23238 |
| | | 348/36 |

FOREIGN PATENT DOCUMENTS

| | | |
|---|---|---|
| JP | 2009-268037 A | 11/2009 |
| JP | 2011-90258 A | 5/2011 |
| JP | 2012-18237 A | 1/2012 |
| JP | 2012-133085 A | 7/2012 |
| WO | WO 2013/015024 A1 | 1/2013 |

OTHER PUBLICATIONS

International Search Report (Form PCT/ISA/210) for International Application No. PCT/JP2016/076806, dated Oct. 25, 2016, with English translation.
Japanese Decision to Grant a Patent for Japanese Application No. 2017-543084, with English translation.

* cited by examiner

IMAGE PROCESSING DEVICE, IMAGING DEVICE, IMAGE PROCESSING METHOD, AND PROGRAM

CROSS-REFERENCE TO RELATED APPLICATIONS

The present application is a Continuation of PCT International Application No. PCT/JP2016/076806 filed on Sep. 12, 2016 claiming priority under 35 U.S.C § 119(a) to Japanese Patent Application No. 2015-193478 filed on Sep. 30, 2015. Each of the above applications is hereby expressly incorporated by reference, in their entirety, into file present application.

BACKGROUND OF THE INVENTION

1. Field of the Invention

The present invention relates to an image processing device, an imaging device, an image processing method, and a program for performing image processing on a plurality of captured images obtained by continuously executing imaging while moving an imaging range of an imaging unit in a horizontal direction.

2. Description of the Related Art

In recent years, an imaging unit that can be rotated in a panning direction and a tilting direction is known. A plurality of captured images of a subject around an imaging unit are obtained by causing the imaging unit to execute imaging at each rotation angle position while rotating (panning) the imaging unit in a horizontal direction by a constant rotation angle. By displaying the plurality of captured images on a display unit it is possible to confirm the subject around the imaging unit However, in a case where the number of captured images is large, there is a problem in that it is difficult to recognize in which direction the captured image currently displayed on the display unit is captured or a problem in that it is difficult to recognize a positional relationship of a subject across between the captured images.

Therefore, a method of generating a panoramic image by connecting a plurality of captured images obtained by executing imaging continuously while rotating an imaging unit, the plurality of captured images being obtained by executing imaging while earning imaging ranges to be partially duplicated before and after successive imaging, in a state in which duplicate regions between two successive pieces of captured images are overlapped with each other is known. Since the panoramic image is a super wide-angle image, a user can look down the entire subject and it becomes easy to recognize the positional relationship of the subject.

JP2000-125190A describes a method of performing a cylindrical transformation princess on a plurality of captured images obtained by continuously executing imaging while rotating an imaging unit in the horizontal direction on the basis of an angle of view information of the imaging unit, and connecting the captured images after the cylindrical transformation process to generate a panoramic image.

JP2002-94849A describes a method of performing imaging using a plurality of cameras arranged so that the imaging ranges are partially duplicated, geometrically transforming coordinates of the captured images captured by other cameras according to coordinate of a captured image captured by one reference camera, and then, connecting the captured images to generate a panoramic image.

WO2013/015024 describes a method of generating a panoramic image of 360° or more around an imaging point and superimposing common subjects included in a start and an end of the panoramic image of 360° or more to generate a panoramic image of 360°.

SUMMARY OF THE INVENTION

Meanwhile, with the increase in the number of pixels of an image sensor mounted on an imaging unit in recent years, resolution of a captured image that is captured by the imaging unit also increases. Therefore, a panoramic image obtained by connecting a plurality of captured images with high resolution also has an ultrahigh resolution. Accordingly, in a case where this panoramic image with the ultrahigh resolution is displayed on a display device with original resolution, only a part of the panoramic image can be displayed. As a result, in a case where any one of the methods of JP2000-125190A, JP2002-94849A, and WO2013/015024 is used, there are a problem in that it is difficult to recognize in which direction the imaging is performed for an image currently displayed on the display unit, a problem in that it is difficult to recognize a positional relationship of the subject between captured images, and a problem in that the amount of me of a display memory (Video RAM) increases. Therefore, in order to avoid such problems, it is necessary to perform a reducing process (resolution reduction) on the panoramic image according to the resolution of the display unit in a case where a panoramic image with ultrahigh resolution is displayed on the display unit.

However, in a case where the panoramic image subjected to a reducing process is displayed on the display unit, the subject within the panoramic image cannot be confirmed in detail. Particularly, in a case where this panoramic image is used for various verifications or the like of the subject, a problem arises in a result of verifications or the like in a case where there is a place at which detailed confirmation, is difficult in the subject.

The present invention has been made in view of the above circumstances, and an object of the present invention is to provide an image processing device, an imaging device, an image processing method, and a program that enables a subject to be looked down and details thereof to be confirmed from a plurality of captured images obtained by continuously executing imaging while moving an imaging range of an imaging unit in a horizontal direction.

An image processing device for achieving the object of the present invention is an image processing device comprising: an image acquisition unit that acquires a plurality of captured images obtained by continuously executing imaging while moving an imaging range of an imaging unit in a horizontal direction, the plurality of captured images being obtained by executing imaging while causing the imaging ranges to be partially duplicated before and after successive imaging; a panoramic image generation unit that generates a panoramic image in which a plurality of reduced images obtained by performing a reducing process on the plurality of captured images are connected, from the plurality of captured images acquired by the image acquisition unit; an image storage control unit that stores the plurality of captured images before the reducing process by the panoramic image generation unit as original images in an image storage unit; a display control unit that displays the panoramic image generated by the panoramic image generation unit on a display unit; a display region setting unit that sets a display region to be displayed in an enlarging manner in the panoramic images displayed on the display unit; and a determination unit that determines whether or not the display region set by the display region setting unit is in an imaging range of the original image, wherein the display control unit trims the display region from the panoramic image and displays the display region on the display unit in an enlarging manner in a case where the determination unit determines that the display region is not in the imaging range of the original image, and trims a corresponding region corresponding to the display region from the original image stored in the image storage unit and displays the corresponding region on the display unit in a case where the determination unit determines that the display region is in the imaging range of the original image.

According to this image processing device, it is possible to perform seamless switching between the display of the panoramic image and the display of the display region based on the trimming image trimmed from the panoramic image or a high-resolution original image in an enlarging manner.

In the image processing device according to another aspect of the present invention, in a case where the corresponding region within the original image is displayed on the display unit and a case where the display control unit further receives a moving operation for moving the position of the corresponding region within the original image, the display control unit moves the position of the corresponding region to be trimmed from the original image according to the moving operation. Accordingly since image data of a peripheral region (a region outside the corresponding region) outside the display surface of the display unit can be freely confirmed, it is possible to arbitrarily change a position at which details of the subject around the imaging unit are confirmed in detail.

In the image processing device according to still another aspect of the present invention, the display control unit executes a temporarily stopping process for temporarily stopping a movement of the position of the corresponding region in a case where the position of the corresponding region is moved to an image end on the side adjacent to the other image in one of the original images adjacent to each other by the moving operation, and a first transition process of causing a first position of the corresponding region at the image end of the one image to transition to a second position of the other image corresponding to the first position in a case where the display control unit further receives a moving operation for moving the position of the corresponding region subjected to the temporarily stopping process from the one image to the other image. Accordingly, it is possible to notify the user that the first transition process for the corresponding region is performed, and to reduce a sense of discomfort that is given to the user in a case where the display on the display unit is switched to the trimming image after trimming from the other image. Further, it is possible to update display content of the display unit to the trimming image after trimming from the other image without causing a connected part of individual images of the panoramic image to be aware of the user.

In the image processing device according to still another aspect of the present invention, the image acquisition unit acquires the plurality of captured images generated by performing imaging each time the imaging unit is rotated by a predetermined rotation angle in a horizontal direction.

In the image processing device according to still another aspect of the present invention, the imaging unit generates a plurality of captured images by performing first imaging each time the imaging unit is rotated by a predetermined rotation angle in a horizontal direction and generates the plurality of captured images by performing second imaging at a position further rotated by ½ of the rotation angle from a position of the first imaging each time the first imaging is performed, the image acquisition unit acquires the plurality of captured images generated by the first imaging of the imaging unit and the plurality of captured images generated by the second imaging, the panoramic image generation unit generates the panoramic image from the plurality of captured images obtained by any one of the first imaging and the second imaging, the image storage control unit sets the plurality of captured images obtained by the one imaging as a first original image, sets the plurality of captured images obtained by the other imaging different from the one imaging as a second original image, and stores the original image including the first original image and the second original image in the image storage unit, and the display control unit executes a temporarily stopping process for temporarily stopping a movement of the position of the corresponding region in a case where the position of the corresponding region is moved to an image end on the side adjacent to the other image in one of the original images adjacent to each other by the moving operation, and a second transition process of causing a first position of the corresponding region at the image end within the one image to transition to a third position corresponding to the first position within the second original image captured between the one image and the other image in a case where the display control unit further receives a moving operation for moving the position of the corresponding region subjected to the temporarily stopping process from the one image to the other image. Accordingly it is possible to reduce a sense of discomfort that is given to the user as compared with a case where the first transition process described above has been performed.

In the image processing device according to still another aspect of the present invention, the panoramic image generation unit generates the panoramic image in which the plurality of reduced images are connected in a state in which the plurality of reduced images are made adjacent to each other at intervals therebetween in an order of imaging in the imaging unit, the panoramic image being a panoramic image in which a duplicate region between adjacent images among the plurality of reduced images in which the imaging ranges are partially duplicated is subjected to a cutting process with a preset width from image ends facing each other in the duplicate regions between the adjacent images. Thus, it is possible to avoid occurrence of failure (combination failure) of the panoramic image, such as a distant or near subject present in the duplicate region being not normally combined, a subject becoming a double image, or a step (shift) occurring at a boundary portion between the images. Further, an influence of the tilt is less as compared with a case where the pieces of image data are simply arranged side by side, and if becomes easy to view the panoramic image data.

In the image processing device according to still another aspect of the present invention, the preset width is set to such a size that adjacent images among the plurality of reduced images subjected to the cutting process partially overlap each other. Accordingly, a part of the subject present in the image before the cutting process is prevented from being lost by the cutting process.

In the image processing device according to still another aspect of the present invention, the panoramic image generation unit generates the panoramic image in which the plurality of reduced images are connected in a state in which duplicate regions between adjacent images in which the imaging ranges are partially duplicated each other are overlapped, the image processing device further includes an origin coordinate storage control unit that stores origin coordinates of each of the plurality of reduced images in the panoramic image in the origin coordinate storage unit in a case where the panoramic image generation unit generates the panoramic image, and in a case where the determination unit determines that the display region is in the imaging range of the original image, the display control unit searches for the original image including the corresponding region from among the original images stored in the image storage unit on the basis of the display region set by the display region setting unit and the origin coordinates stored in the origin coordinate storage unit, trims the corresponding region of the original image that has been searched for, and displays the corresponding region on the display unit. Since it is possible to perform seamless switching between the display of the panoramic image and the display of the display region based on the trimming image trimmed from the panoramic image or a high-resolution original image in an enlarging manner even in a case where the panoramic image is generated using a general generation method, it is possible to look down the subject and confirm details thereof.

The image processing device according to still another aspect of the present invention further comprises a projective transformation, unit that performs a projective transformation process for performing projective transformation on the same projection plane on the basis of an angle of view of the imaging unit, on the plurality of captured images acquired by the image acquisition unit, wherein the panoramic image generation unit generates a panoramic image by connecting the plurality of reduced images generated from the plurality of captured images subjected to the projective transformation process by the projective transformation unit, and the image storage control unit stores the plurality of captured images subjected to the projective transformation process by the projective transformation unit in the image storage unit as the original image device. Accordingly, an influence of the tilt is suppressed, and the shift of the position of the subject between the adjacent images among the plurality of captured images is reduced.

In the image processing device according to still another aspect of the present invention, the display control unit displays an entire image indicating the entire panoramic image on a part of the display surface of the display unit in a case where the corresponding region is trimmed from the original image and displayed on the display unit. Thus, even in a case where the trimming image after trimming from the corresponding region of the original image is displayed on the display unit, the user can recognize the entire panoramic image.

In the image processing device according to still another aspect of the present invention, the display control unit superimposes and displays a range image indicating a range of the display region on the entire image. Thus, in a case where the trimming image after trimming from the corresponding region of the original image is displayed on the display unit, it is possible to easily discriminate which region of the panoramic image has been displayed in an enlarging manner for the trimming image.

An imaging device for achieving the object of the present invention includes an imaging unit, a rotation mechanism that rotates an imaging range of the imaging unit in a horizontal direction, and the image processing device described above.

In the imaging device according to still another aspect of the present invention, the imaging unit has an orientation detection function, and starts imaging from a preset orientation. Accordingly, it is possible to easily discriminate in which direction with respect to the imaging unit the subject has been imaged for each of the plurality of reduced images constituting the panoramic image.

An image processing method for achieving the object of the present invention is an image processing method comprising: an image acquisition step of acquiring a plurality of captured images obtained by continuously executing imaging while moving an imaging range of an imaging unit in a horizontal direction, the plurality of captured images being obtained by executing imaging while causing the imaging ranges to be partially duplicated before and after successive imaging; a panoramic image generation step of generating a panoramic image in which a plurality of reduced images obtained by performing a reducing process on the plurality of captured images are connected, from the plurality of captured images acquired in the image acquisition step; an image storage control step of storing the plurality of captured images before the reducing process in the panoramic image generation step as original images in an image storage unit; a display control step of displaying the panoramic image generated in the panoramic image generation step on a display unit a display region setting step of setting a display region to be displayed in an enlarging manner in the panoramic images displayed on the display unit; and a determination step of determining whether or not the display region set in the display region setting step is in an imaging range of the original image, wherein the display control step includes trimming the display region from the panoramic image and displays the display region on the display unit in an enlarging manner in a case where NO is determined in the determination step, and trimming a corresponding region corresponding to the display region from the original image stored in the image storage unit and displaying the corresponding region on the display unit in a case where it is determined in the determination step that the display region is in the imaging range of the original image.

A program for achieving the object of the present invention is a program causing a computer of an image processing device to function as: an image acquisition unit that acquires a plurality of captured images obtained by continuously executing imaging while moving an imaging range of an imaging unit in a horizontal direction, the plurality of captured images being obtained by executing imaging while causing the imaging ranges to be partially duplicated before and after successive imaging; a panoramic image generation unit that generates a panoramic image in which a plurality of reduced images obtained by performing a reducing process on the plurality of captured images are connected, from the plurality of captured images acquired by the image acquisition unit; an image storage control unit that stores the plurality of captured images before the reducing process by the panoramic image generation unit as original images in an image storage unit; a display control unit that displays the panoramic image generated by the panoramic image generation unit on a display unit; a display region setting unit that sets a display region to be displayed in an enlarging manner in the panoramic images displayed on the display unit; and a determination unit that determines whether or not the display region set by the display region setting unit is in an imaging range of the original image, wherein the display control unit trims the display region from the panoramic image and displays the display region on the display unit in an enlarging manner in a case where the determination unit determines that the display region is not in the imaging range of the original image, and trims a corresponding region corresponding to the display region from the original image stored in the image storage unit and displays the correspond- ing region on the display unit in a case where the determination unit determines that the display region is in the imaging range of the original image. A computer-readable non-transitory tangible medium having the program recorded thereon is included in an aspect of the present invention.

The image processing device, the imaging device, the image processing method, and the program of the present invention enable the subject to be looked down and details thereof to be confirmed from the plurality of captured images obtained by continuously executing imaging while moving the imaging range of the imaging unit in a horizontal direction.

Figure 5:
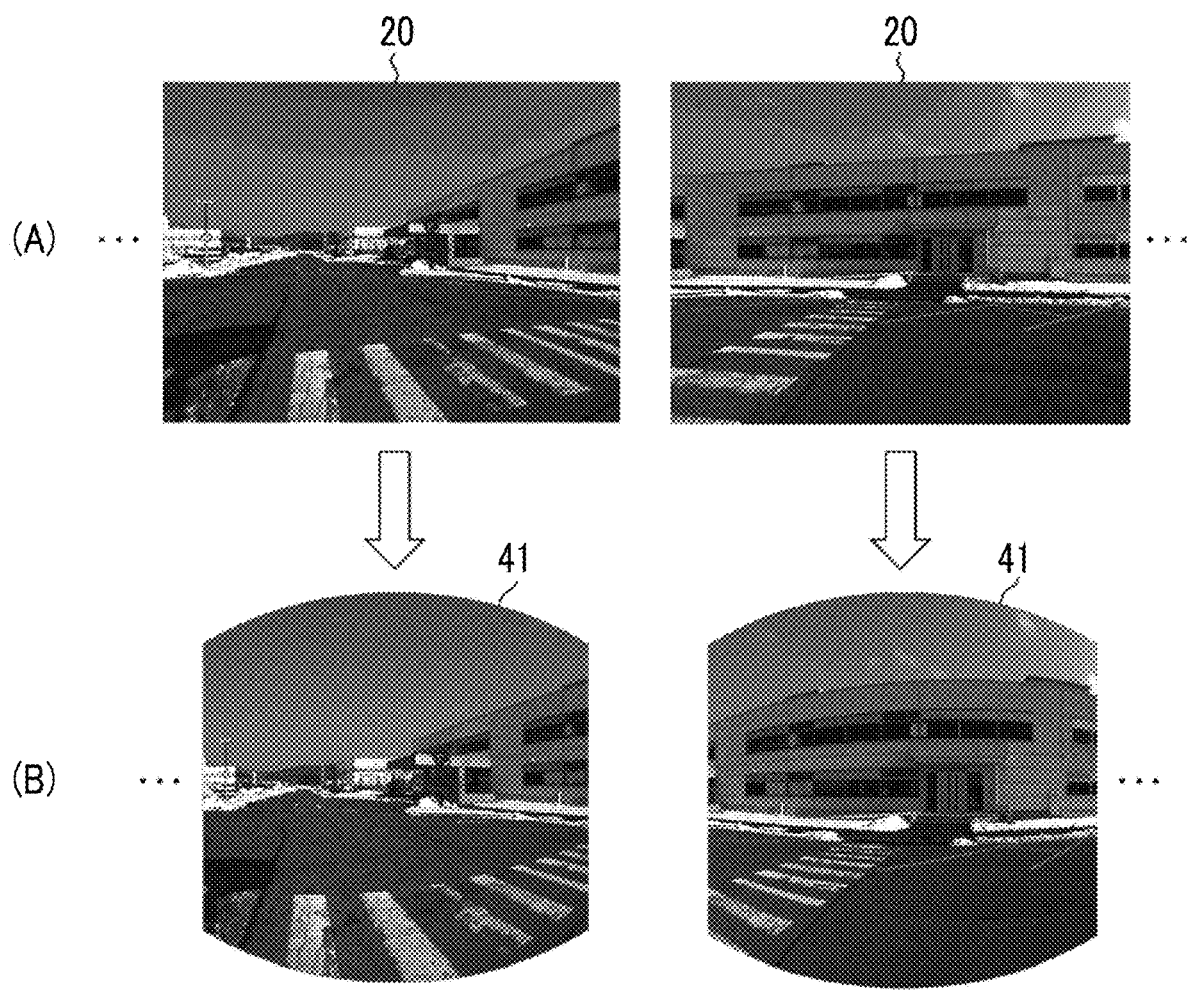

(A) of FIG. 5 is a front view of captured image data before the projective transformation process, and (B) of FIG. 5 is a front view of transformed image data after the projective transformation process.

Figure 6:
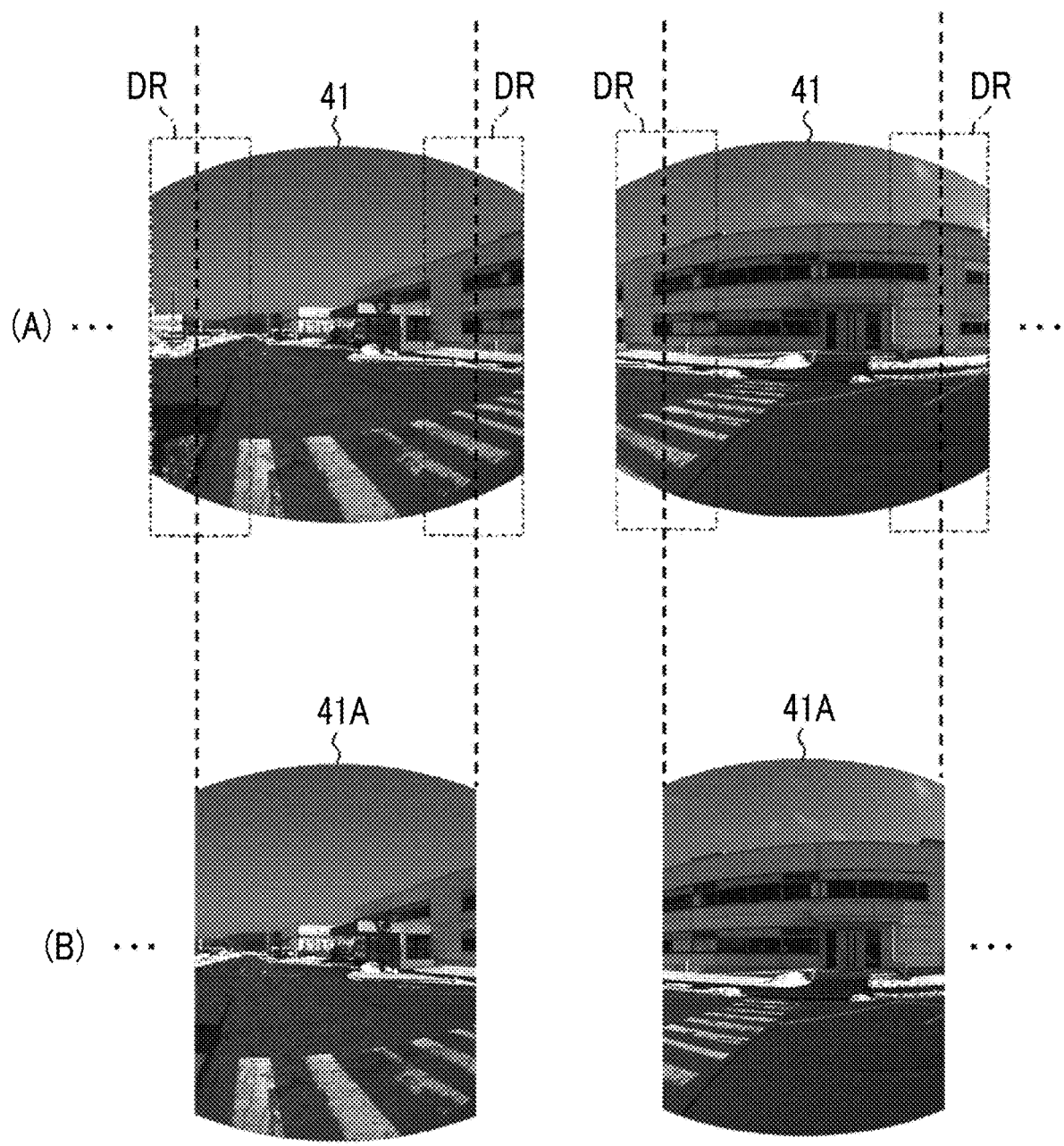

(A) of FIG. 6 is a front view of transformed image data before a cutting process in a cutting processing unit and (B) of FIG. 6 is a front view of cut image data after the cutting process in the cutting processing unit.

Figure 7:
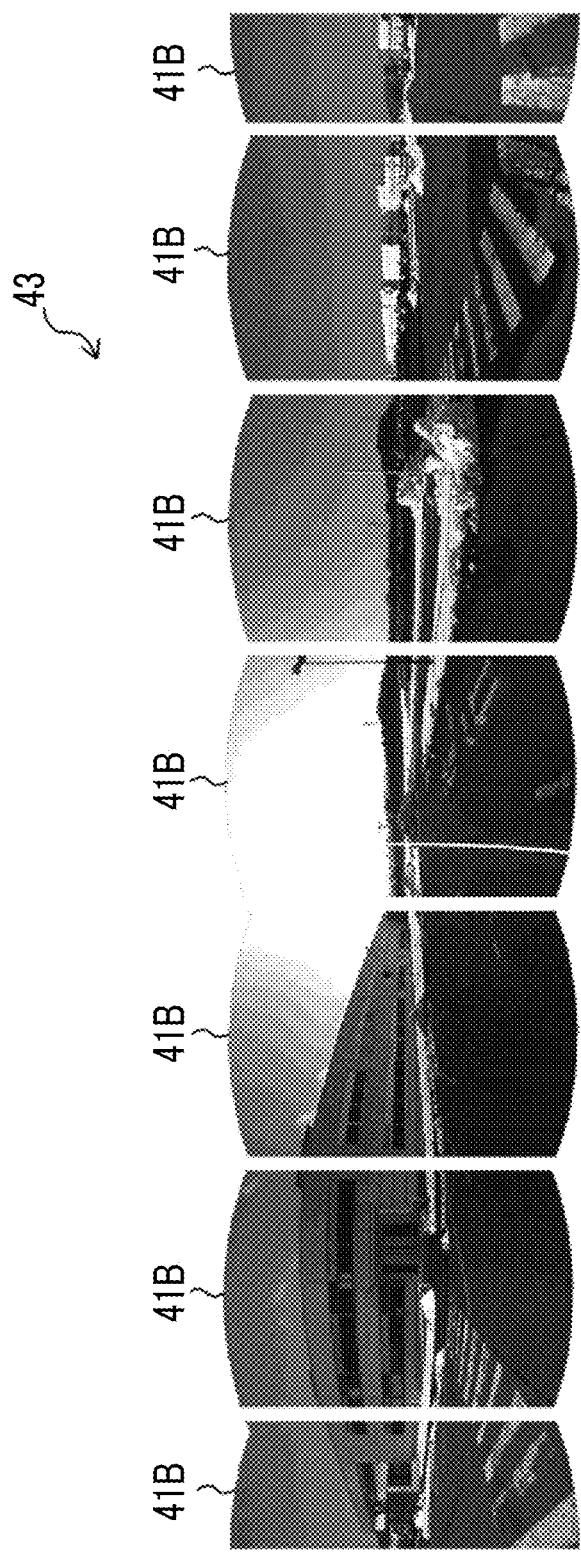

FIG. 7 is a front view of panoramic image data that is generated by a panoramic image generation unit.

Figure 8:
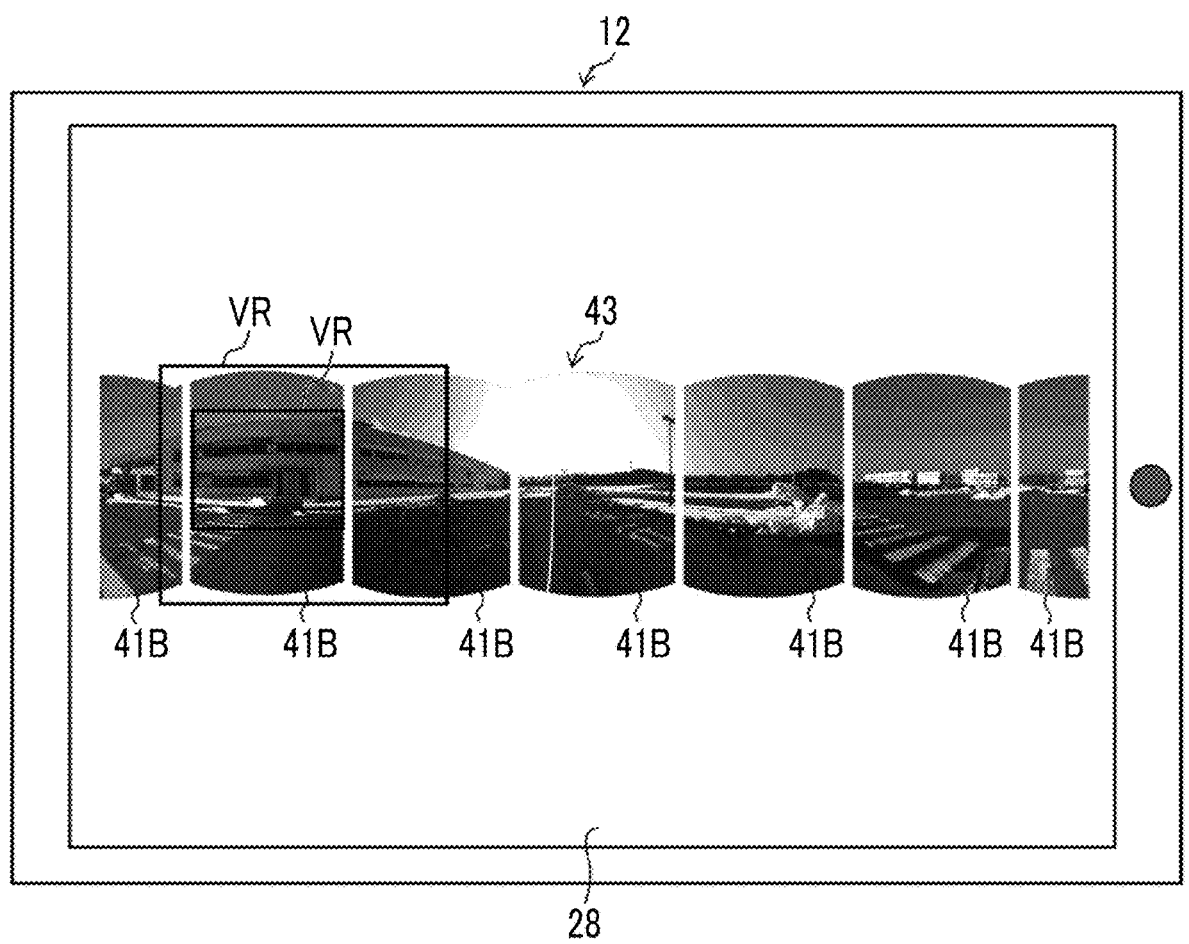

FIG. 8 is an illustrative diagram illustrating a process of displaying panoramic image data in a display control unit.

Figure 9:
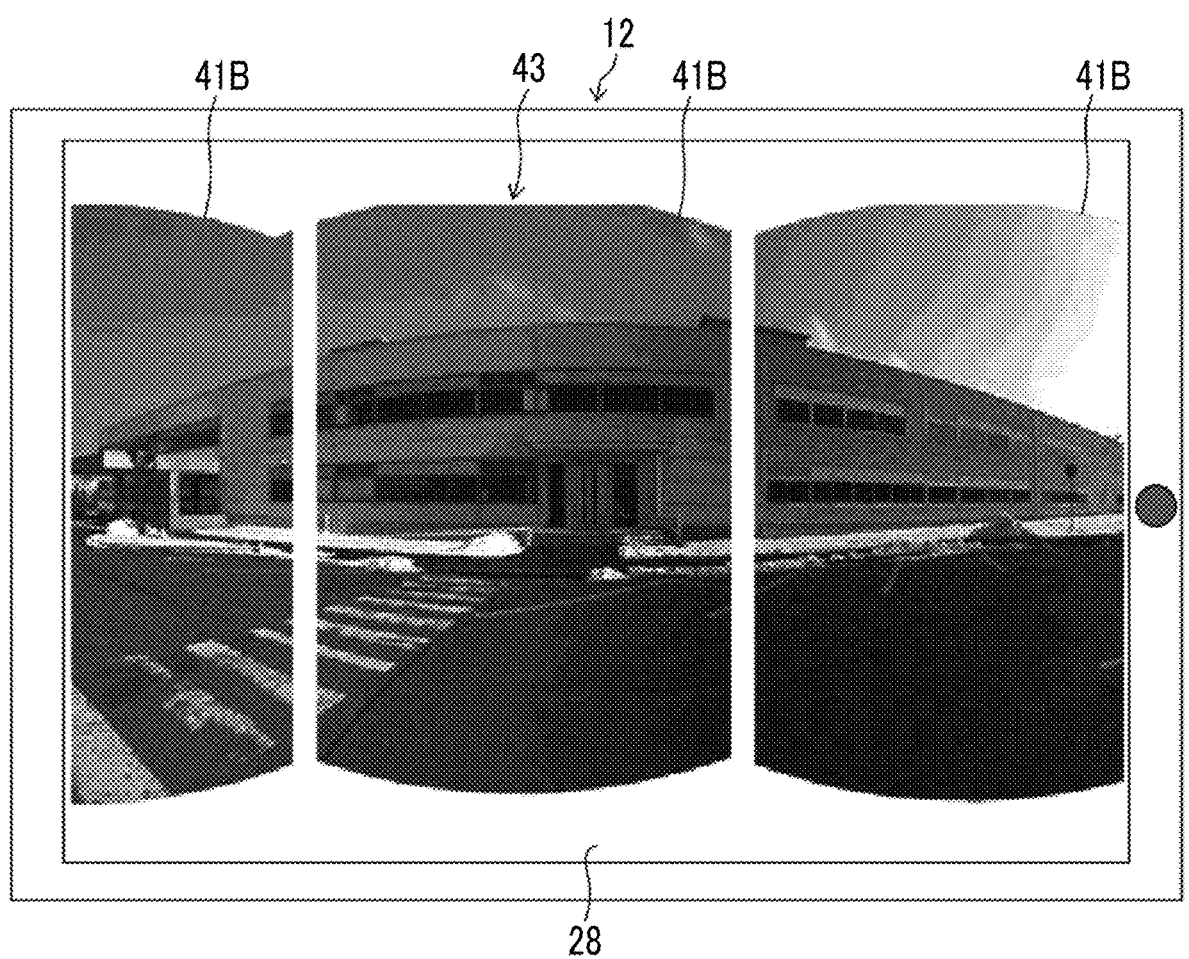

FIG. 9 is an illustrative diagram illustrating a modification example of the process of displaying the panoramic image data in the display control unit.

Figure 10:
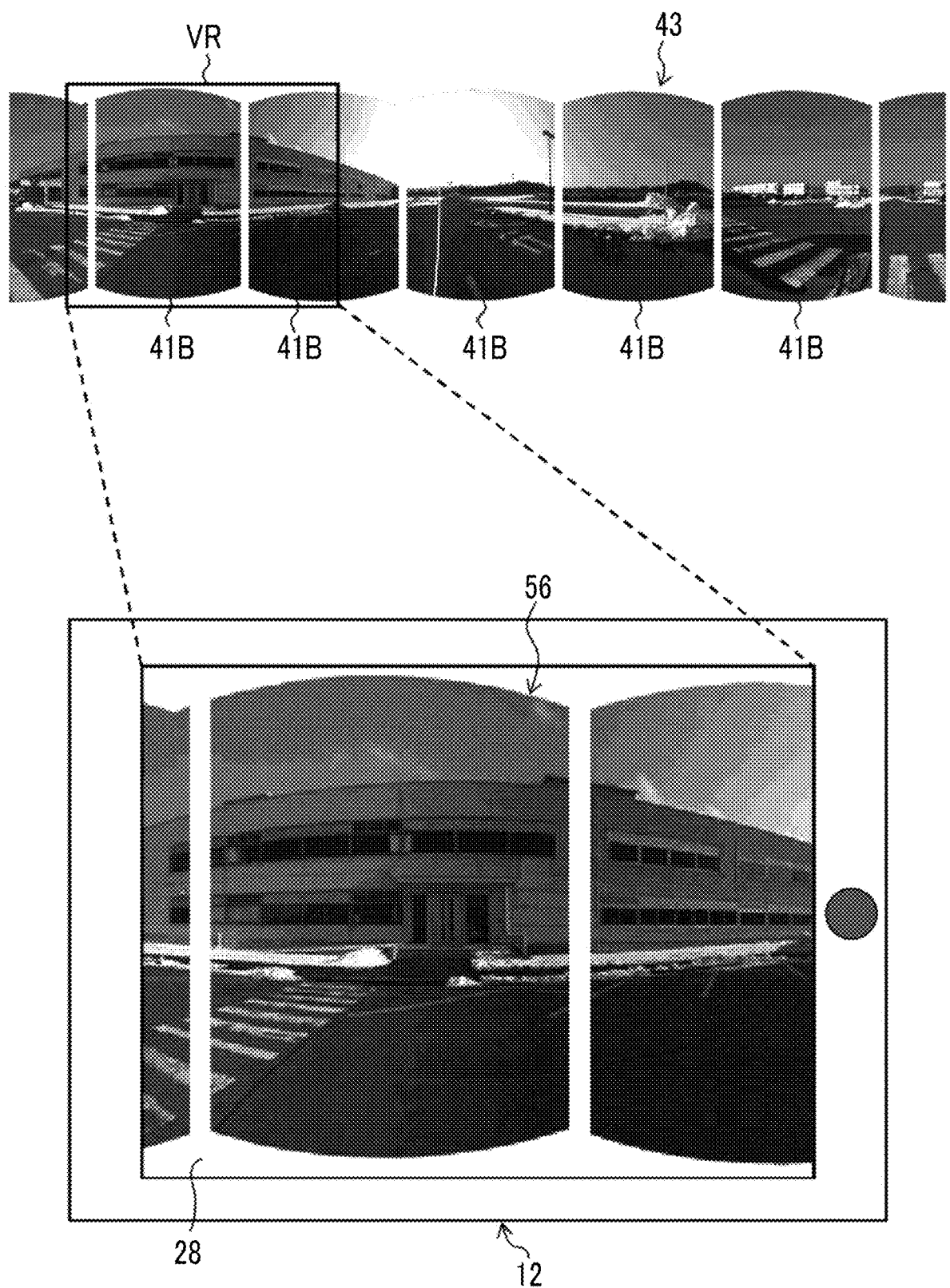

FIG. 10 is an illustrative diagram illustrating a display of a display region in an enlarging manner in the display control unit in a case where a determination unit determines that the display region is not in an imaging range of an original image.

Figure 11:
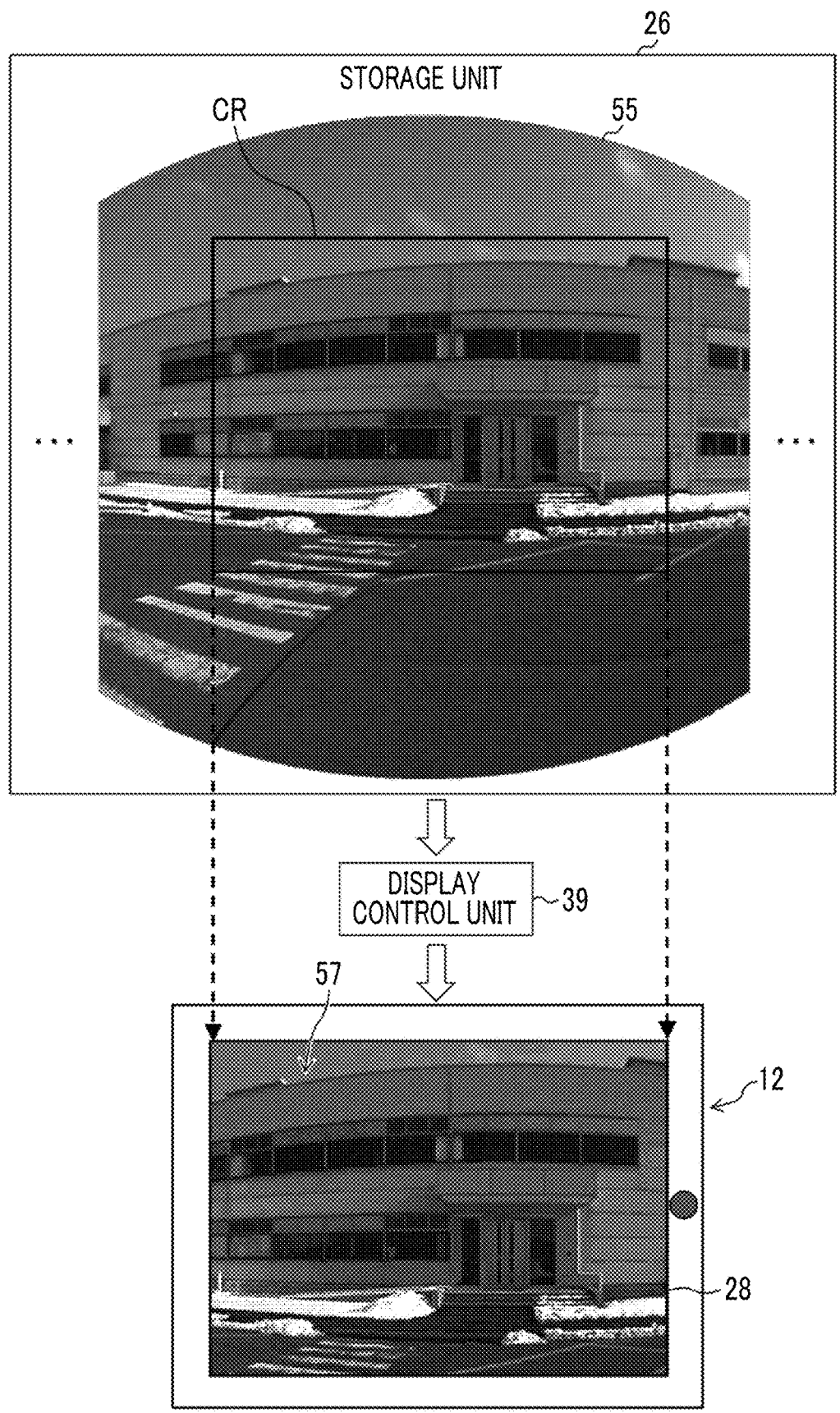

FIG. 11 is an illustrative diagram illustrating a display of a display region in an enlarging manner in a display control unit in a case where the determination unit determines that the display region is in an imaging range of the original image data.

Figure 12:
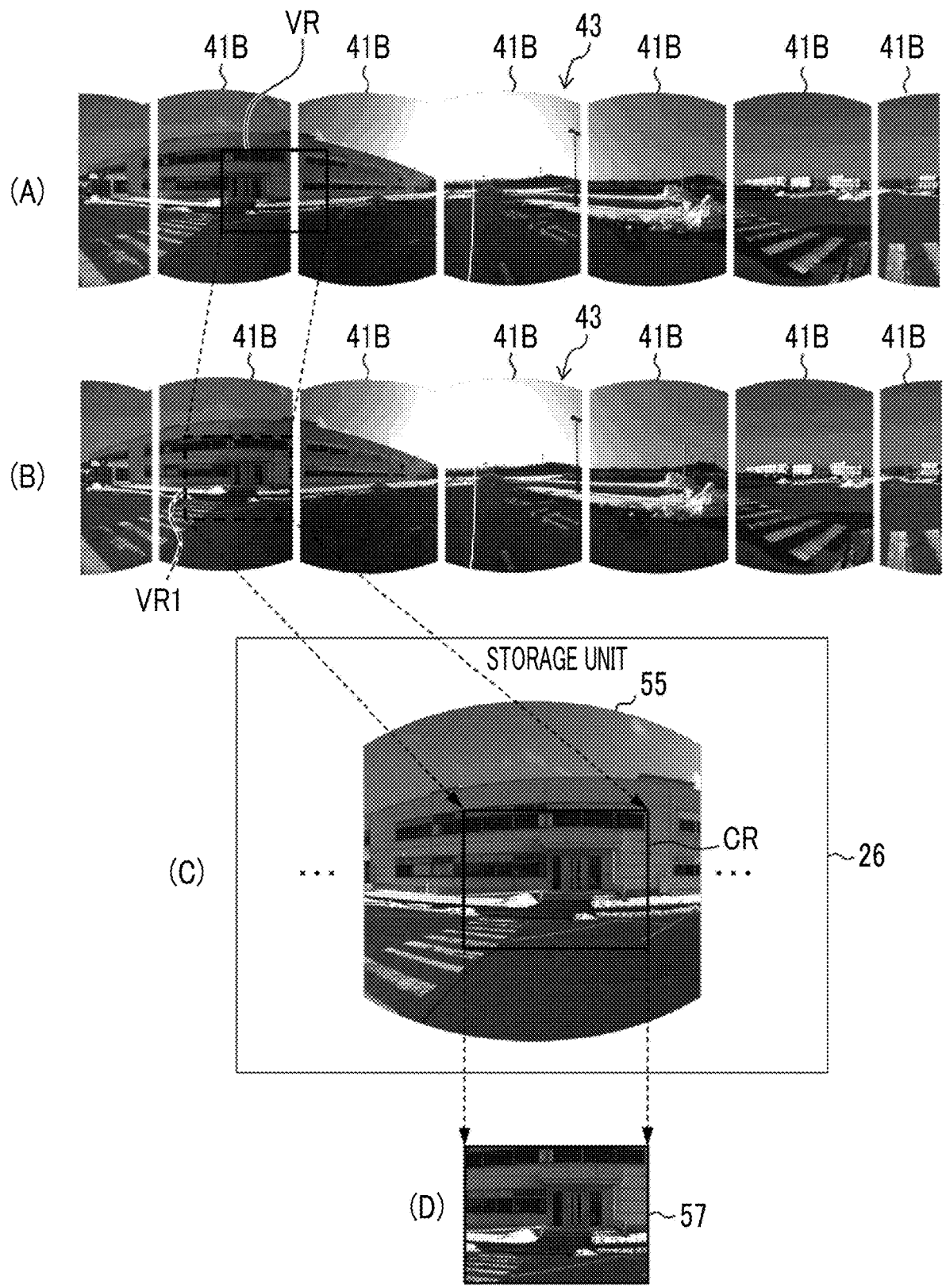

(A) to (D) of FIG. 12 is a diagram illustrating a display of a display region in an enlarging manner in a display control unit in a case where the determination unit determines that the display region is in an imaging range of original image data and a case where the display region is set to extend over two pieces of reduced image data.

Figure 13:
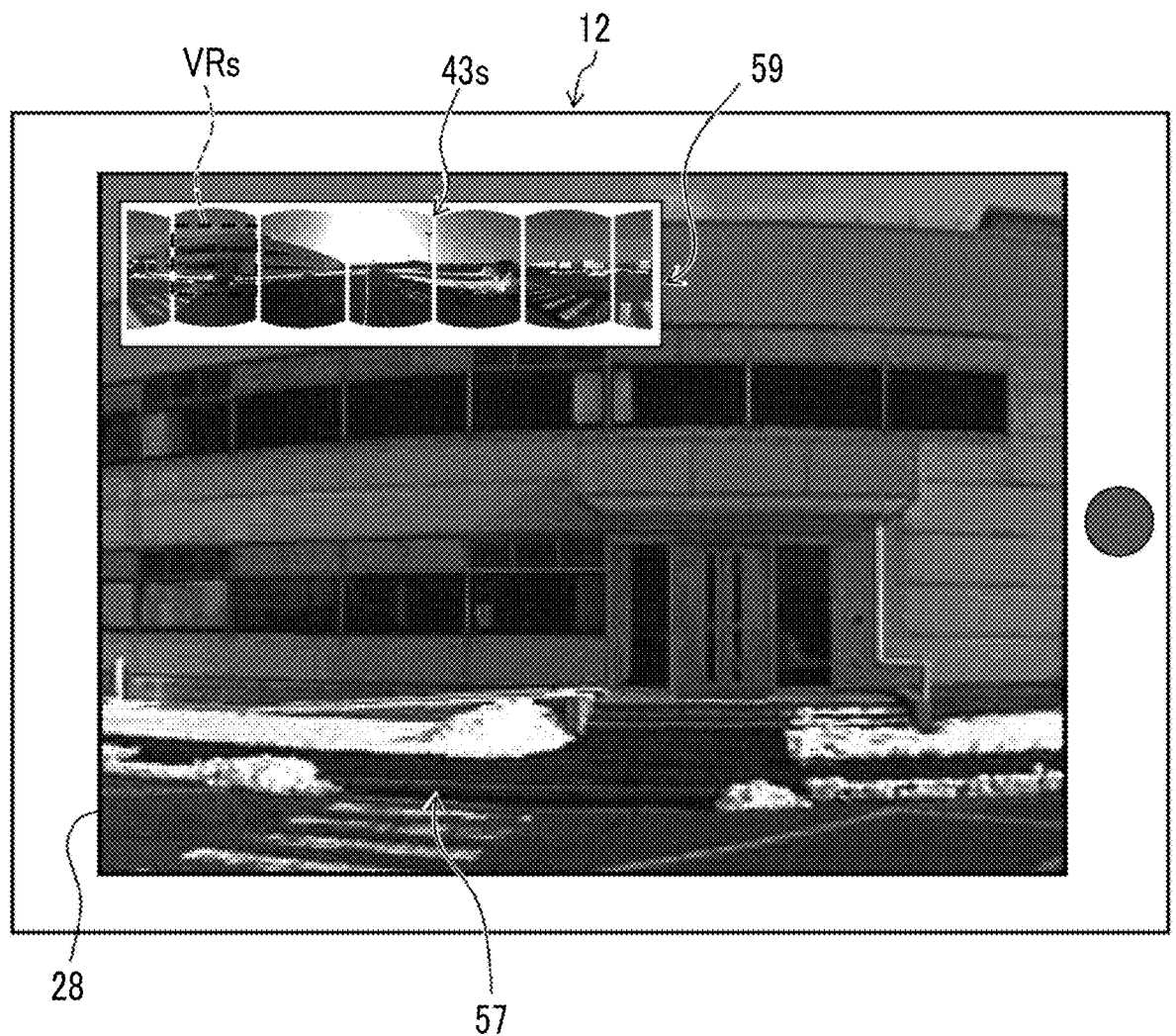

FIG. 13 is an illustrative diagram illustrating a sub-screen that is displayed on a display surface of a display unit in a superimposition and display mode.

Figure 14:
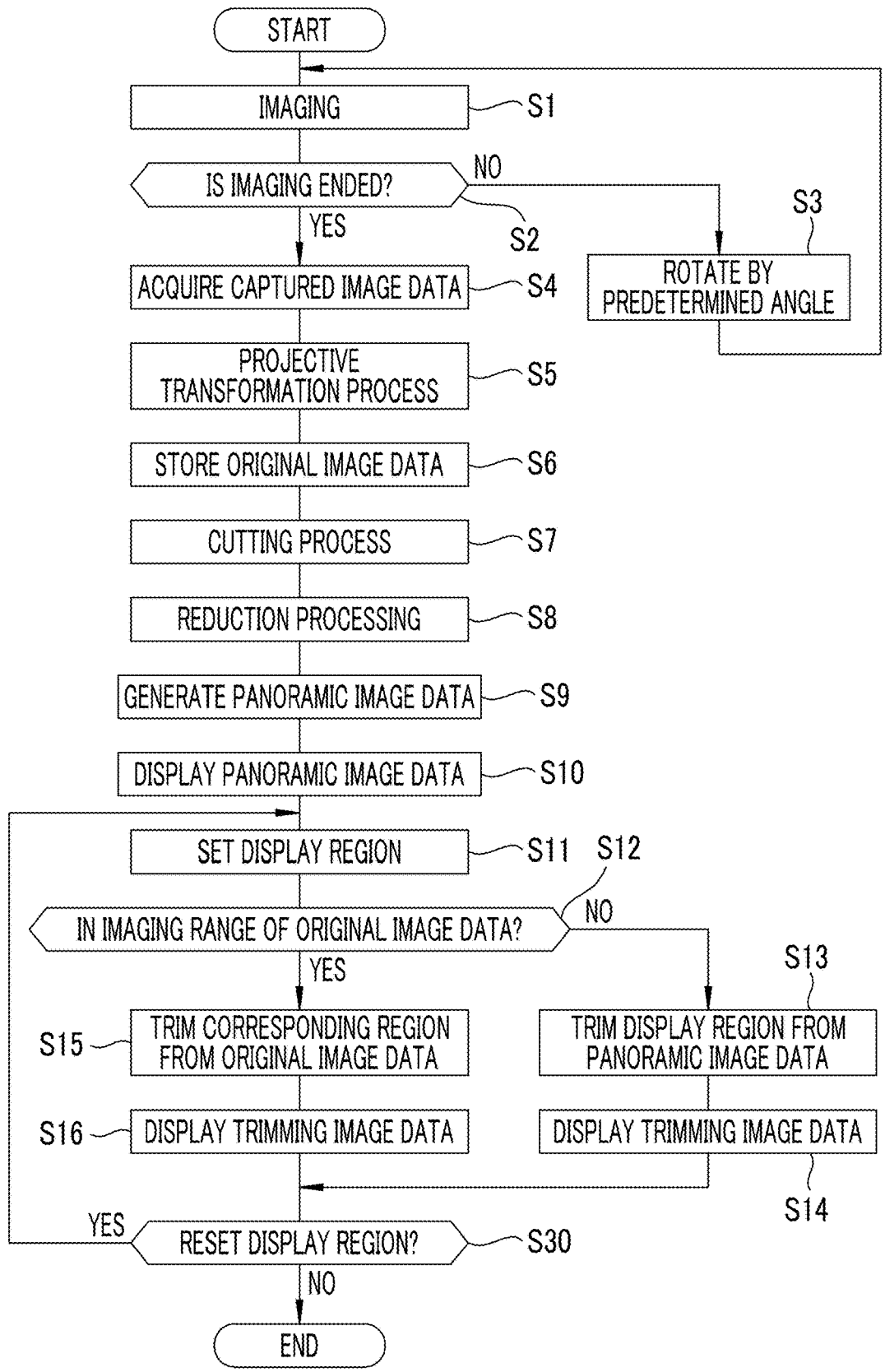

FIG. 14 is a flowchart illustrating a flow of a panoramic image data display process or a display region enlargement and display process in the imaging device of the first embodiment.

Figure 15:
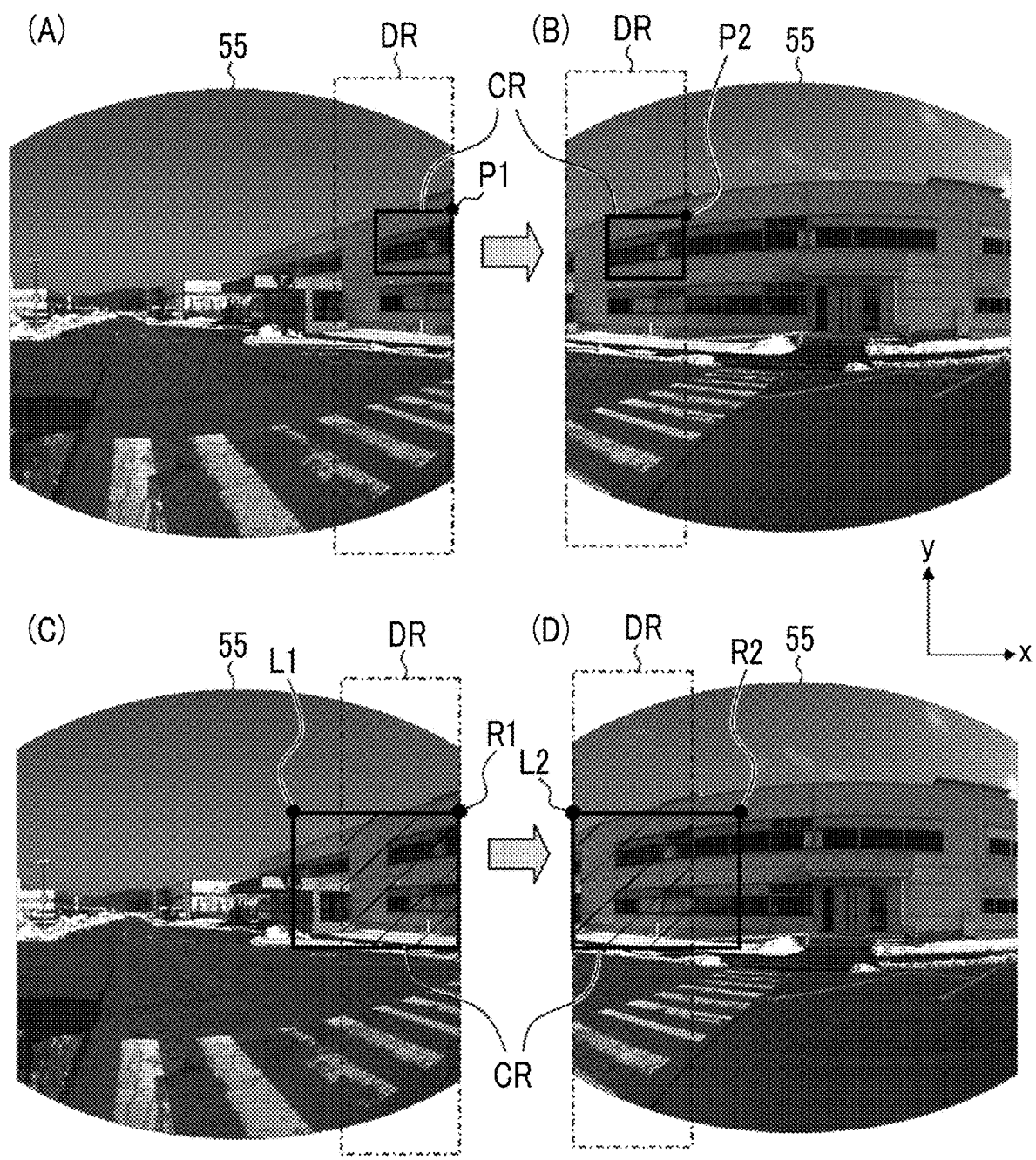

(A) and (B) of FIG. 15 is an illustrative diagram illustrating a first transition process of a position of a corresponding region between pieces of original image data adjacent to each other, and (C) and (D) of FIG. 15 is an illustrative diagram illustrating a first transition process in a case where the corresponding region has a size or shape not fit to the duplicate region.

Figure 16:
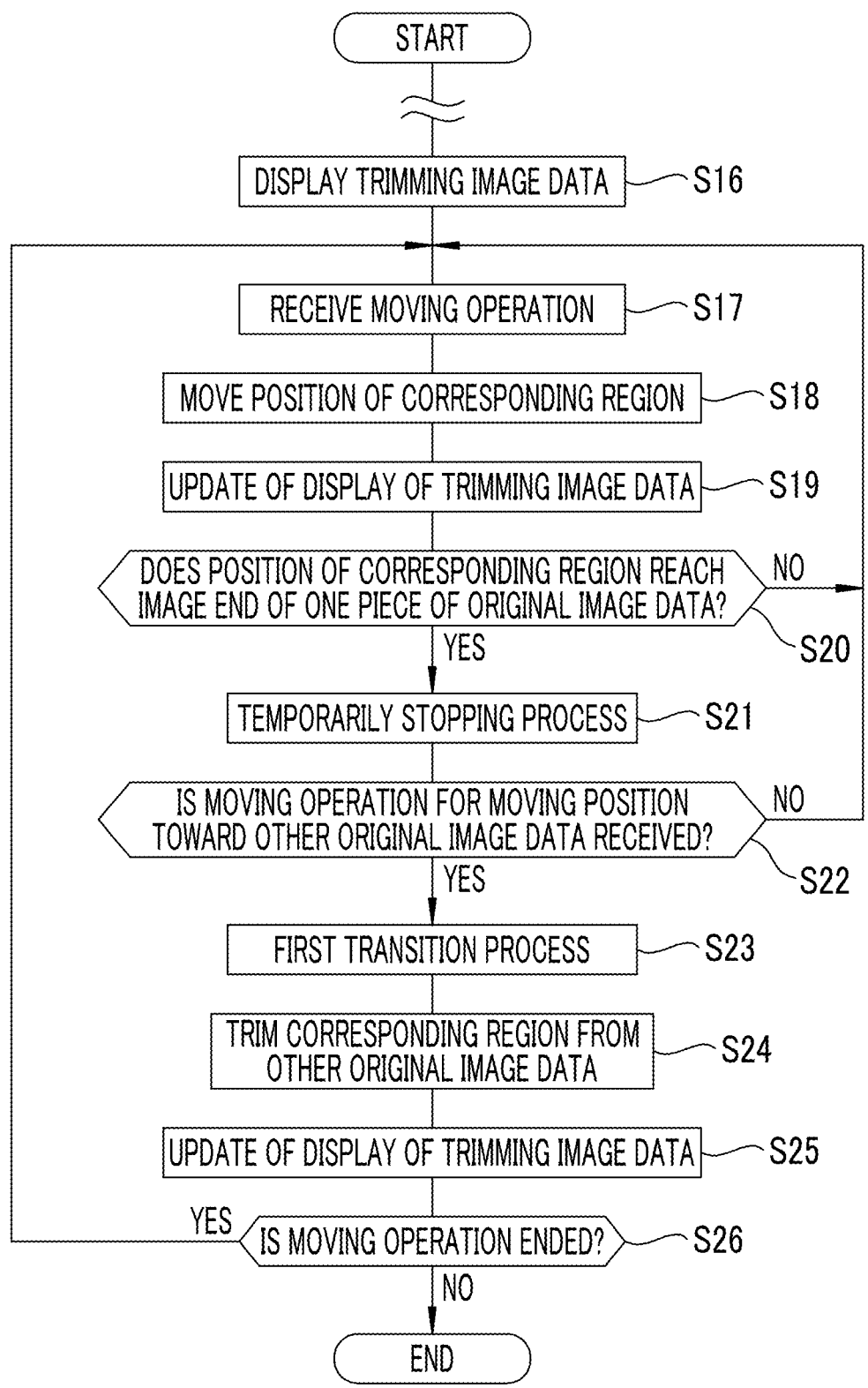

FIG. 16 is a flowchart illustrating a flow of a trimming image data display process in an imaging device according to a second embodiment.

Figure 17:
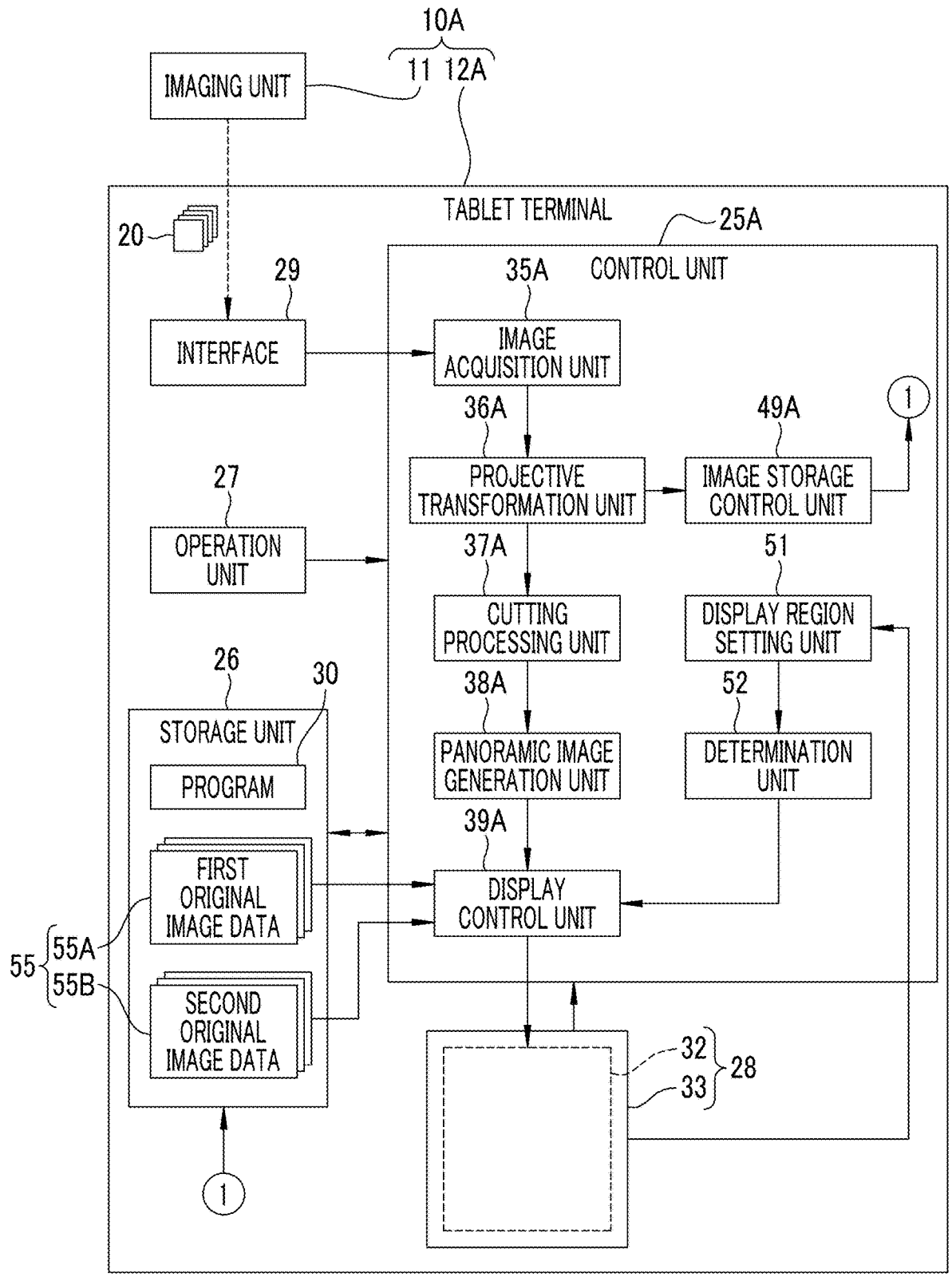

FIG. 17 is a block diagram illustrating a configuration of the imaging device according to a third embodiment.

Figure 18A:
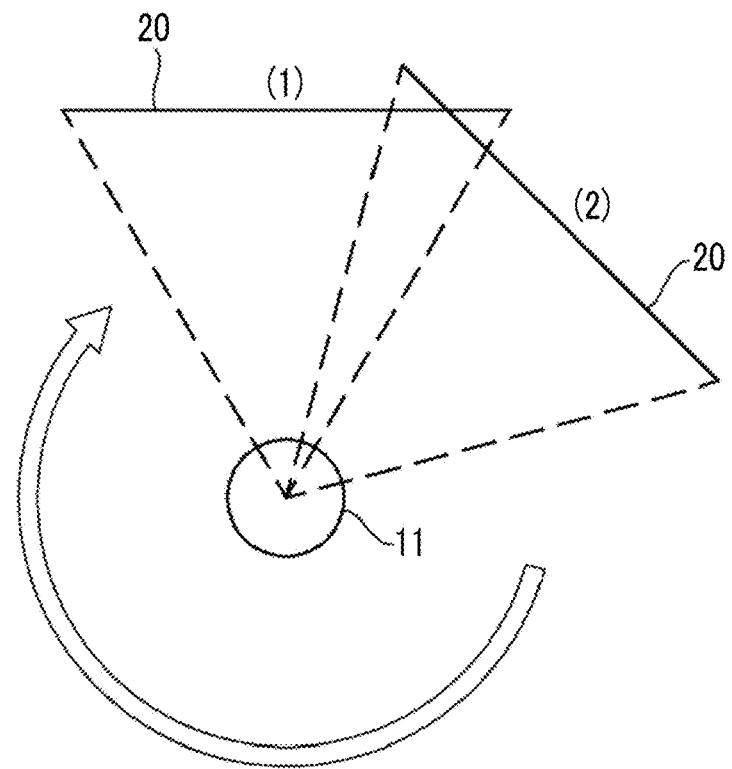
Figure 18B:
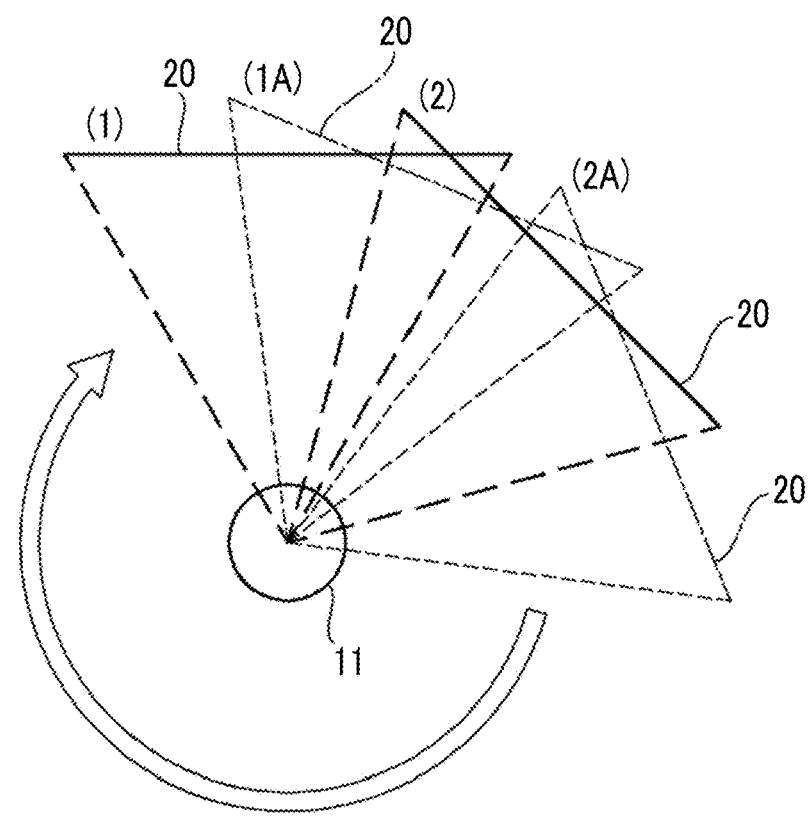

FIG. 18A is an illustrative diagram illustrating an example of imaging of a subject around the imaging unit in a dividing manner in the imaging unit according to the first embodiment or the like, and FIG. 18B is an illustrative diagram illustrating an example of imaging of a subject of the imaging unit in a dividing manner in the imaging unit of the third embodiment.

Figure 19:
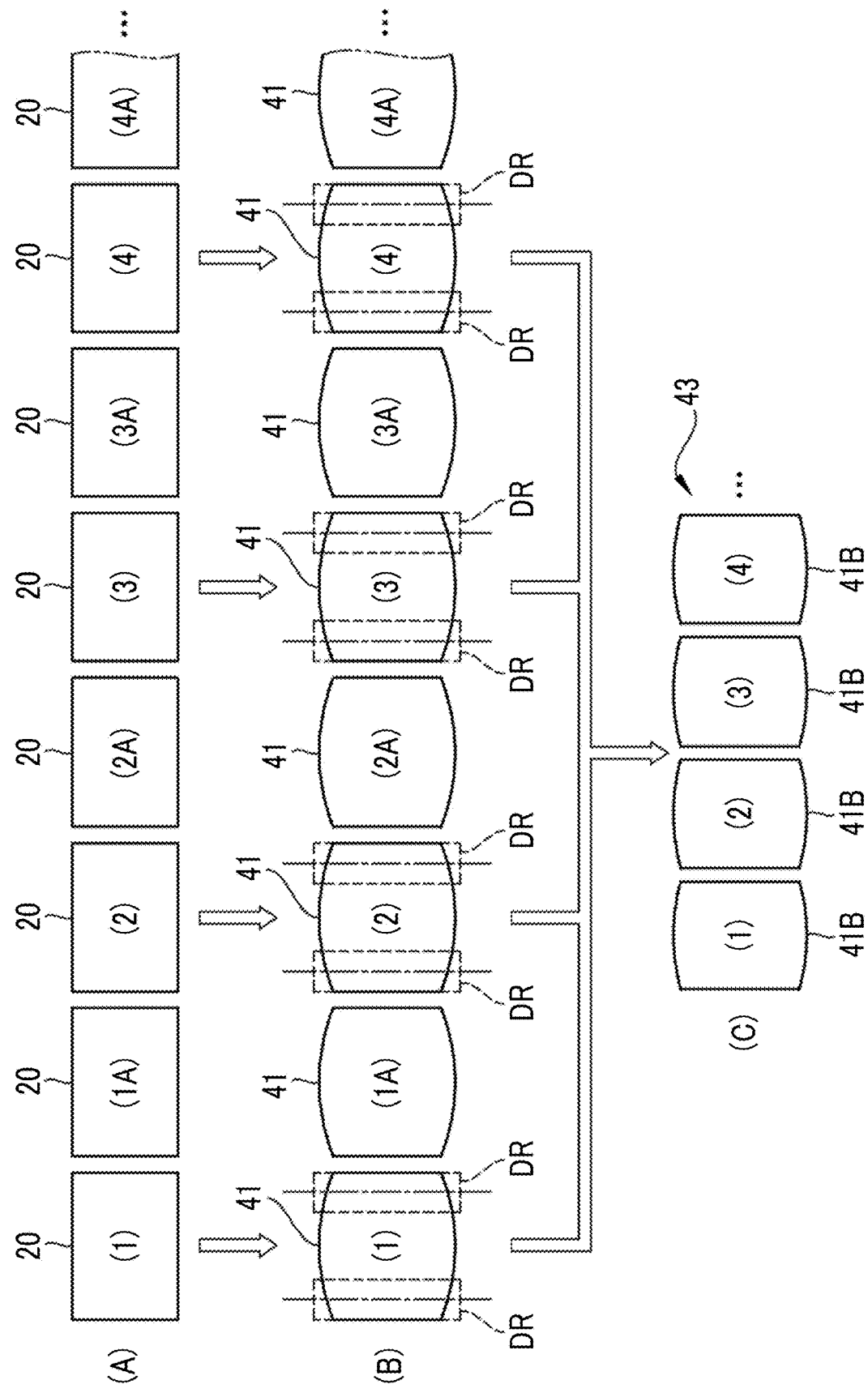

(A) to (C) of FIG. 19 is an illustrative diagram illustrating a flow from a projective transformation process to a panoramic image data generation process in a fourth embodiment.

Figure 20:
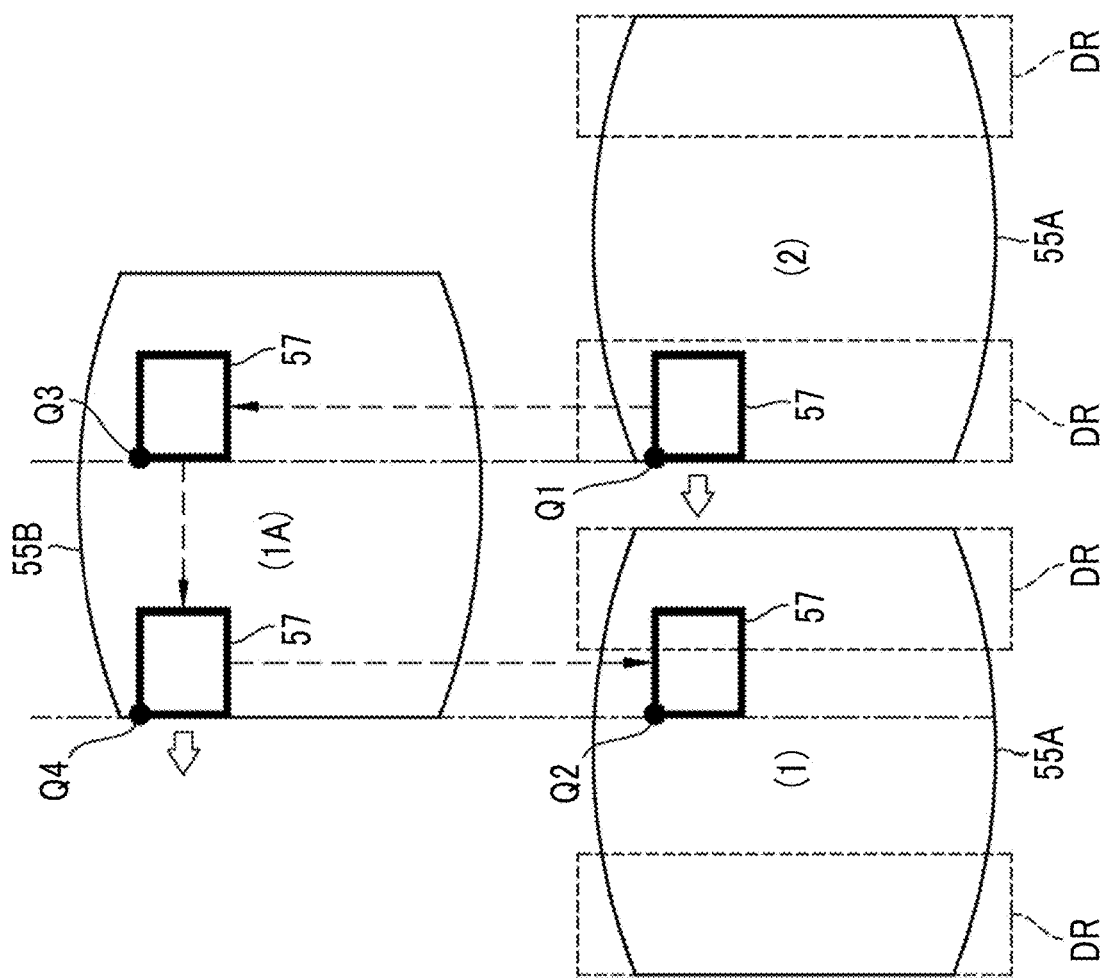

FIG. 20 is an illustrative diagram illustrating a second transition process in a display control unit according to the third embodiment.

Figure 21:
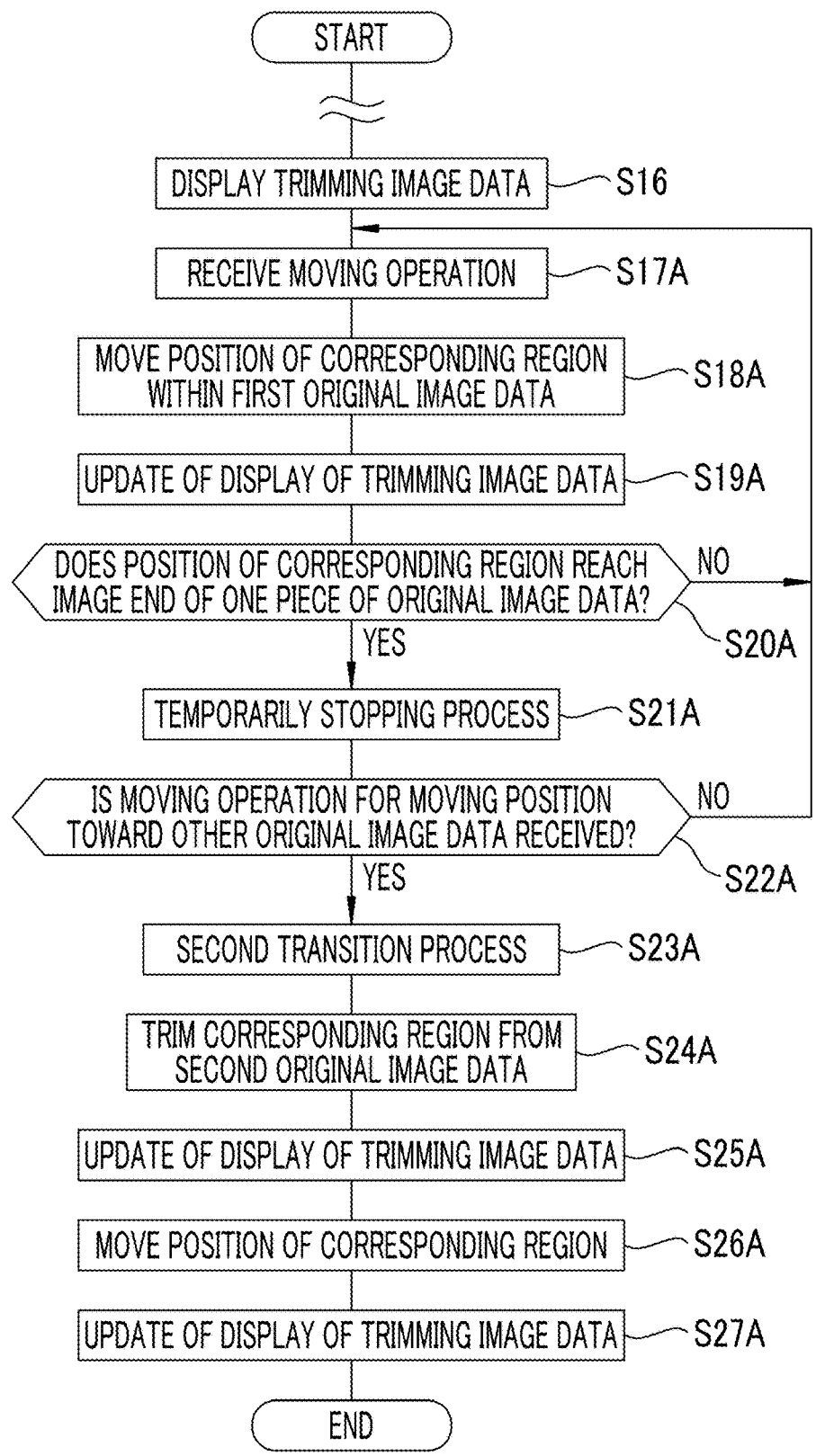

FIG. 21 is a flowchart illustrating a flow of a trimming image data display process in the imaging device according to the third embodiment.

Figure 22:
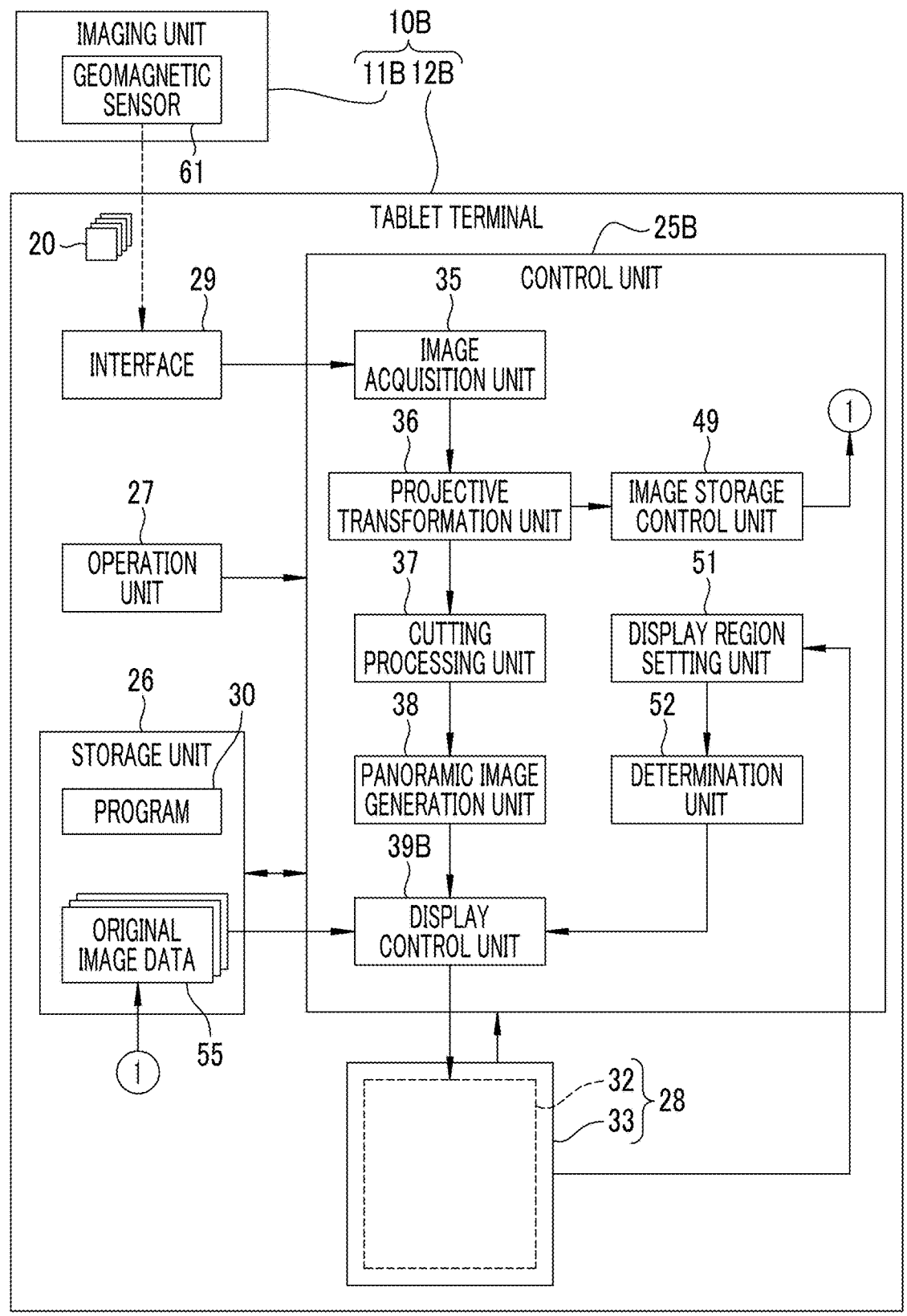

FIG. 22 is a block diagram illustrating a configuration of an imaging device according to the fourth embodiment.

Figure 23:
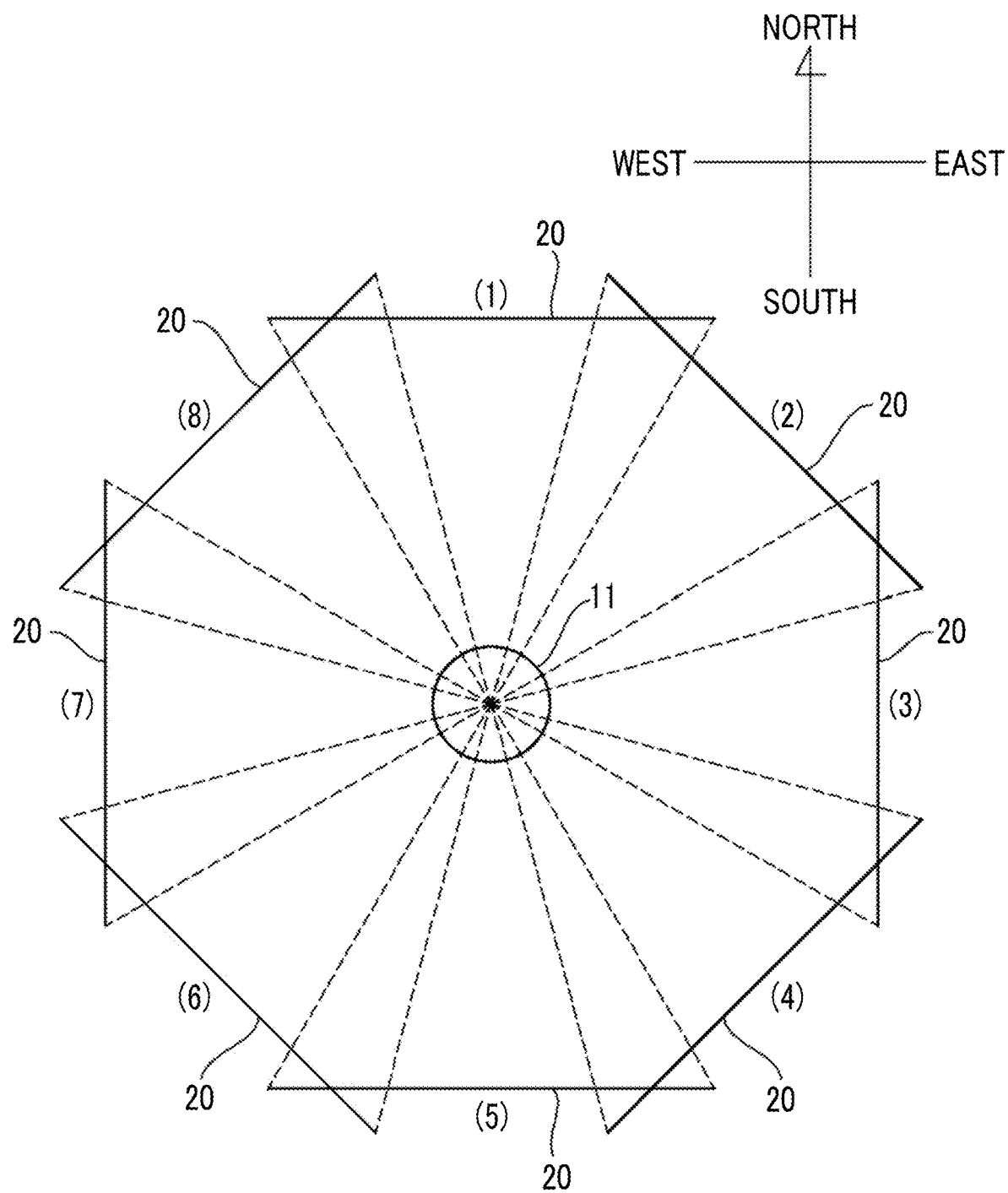

FIG. 23 is an illustrative diagram illustrating an example of imaging of a subject around an imaging unit in a dividing manner in the imaging unit according to the fourth embodiment.

Figure 24:
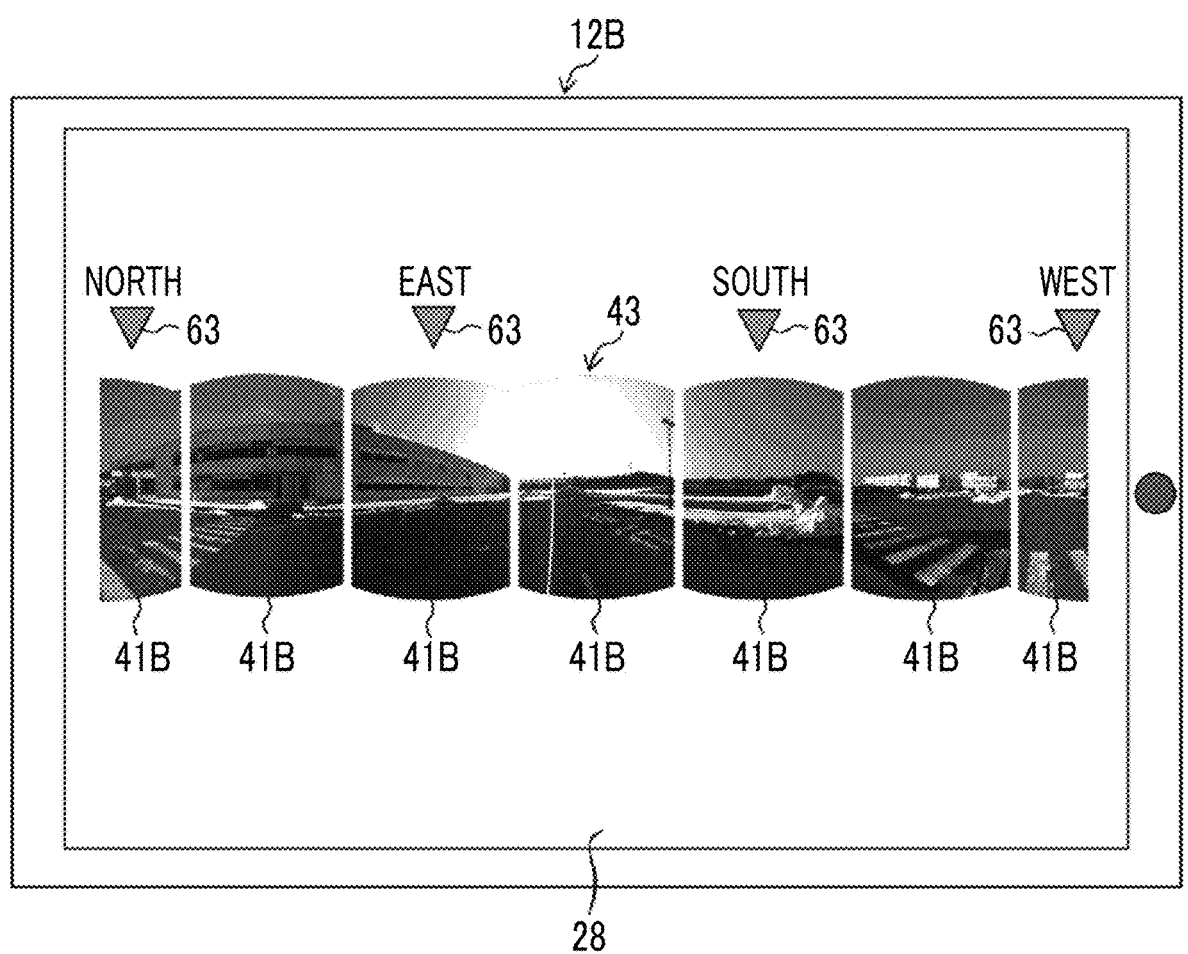

FIG. 24 is an illustrative diagram illustrating a process of displaying panoramic image data in a display control unit of the fourth embodiment.

Figure 25:
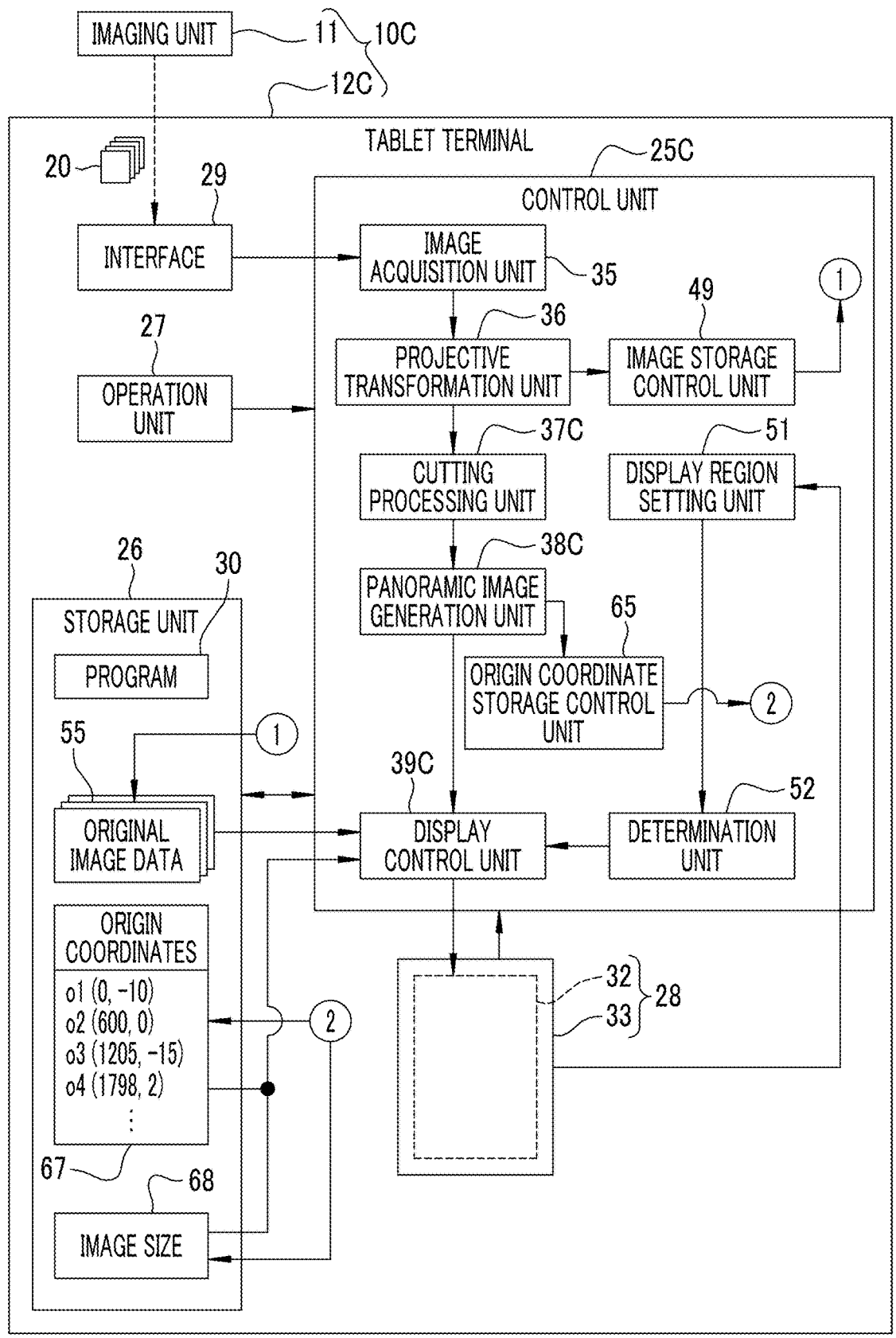

FIG. 25 is a block diagram illustrating a configuration of an imaging device according to a fifth embodiment.

Figure 26:
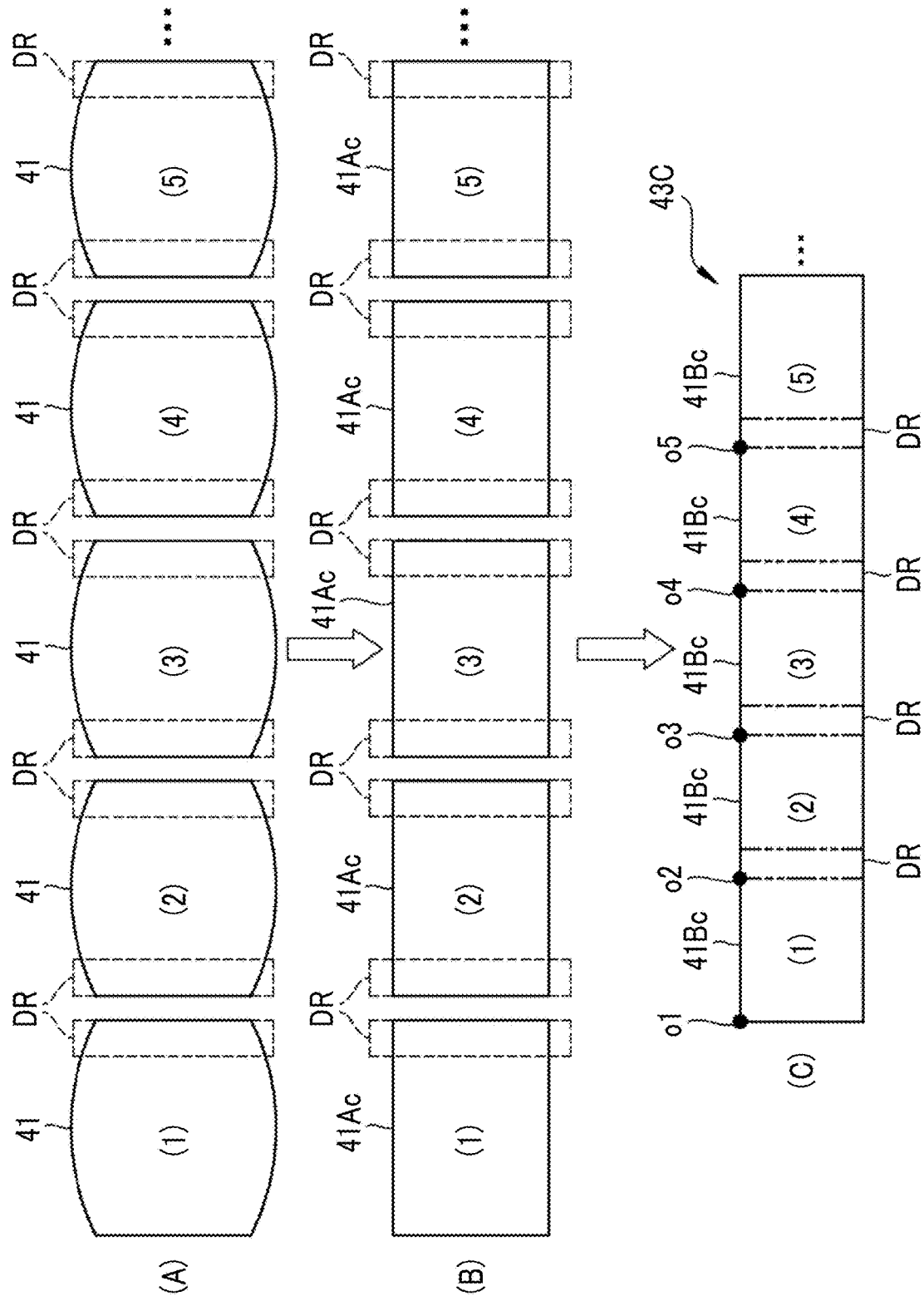

(A), (B), and (C) of FIG. 26 is an illustrative diagram illustrating a flow of a panoramic image data generation process in the fifth embodiment.

Figure 27:
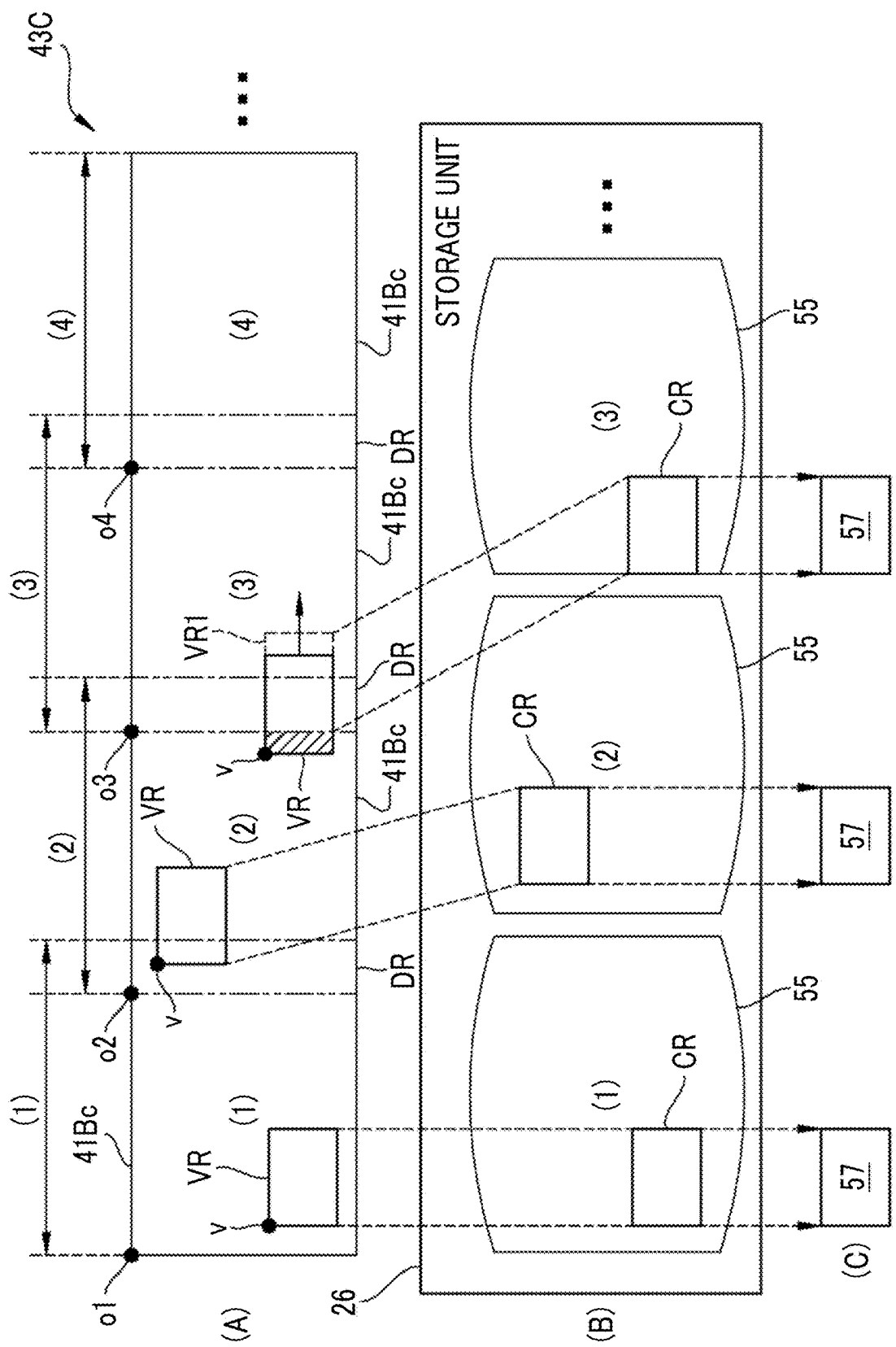

(A), (B) and (C) of FIG. 27 is an illustrative diagram illustrating a display of a display region in an enlarging manner in a display control unit of the fifth embodiment in a case where a determination unit determines that the display region is in an imaging range of original image data.

Figure 28:
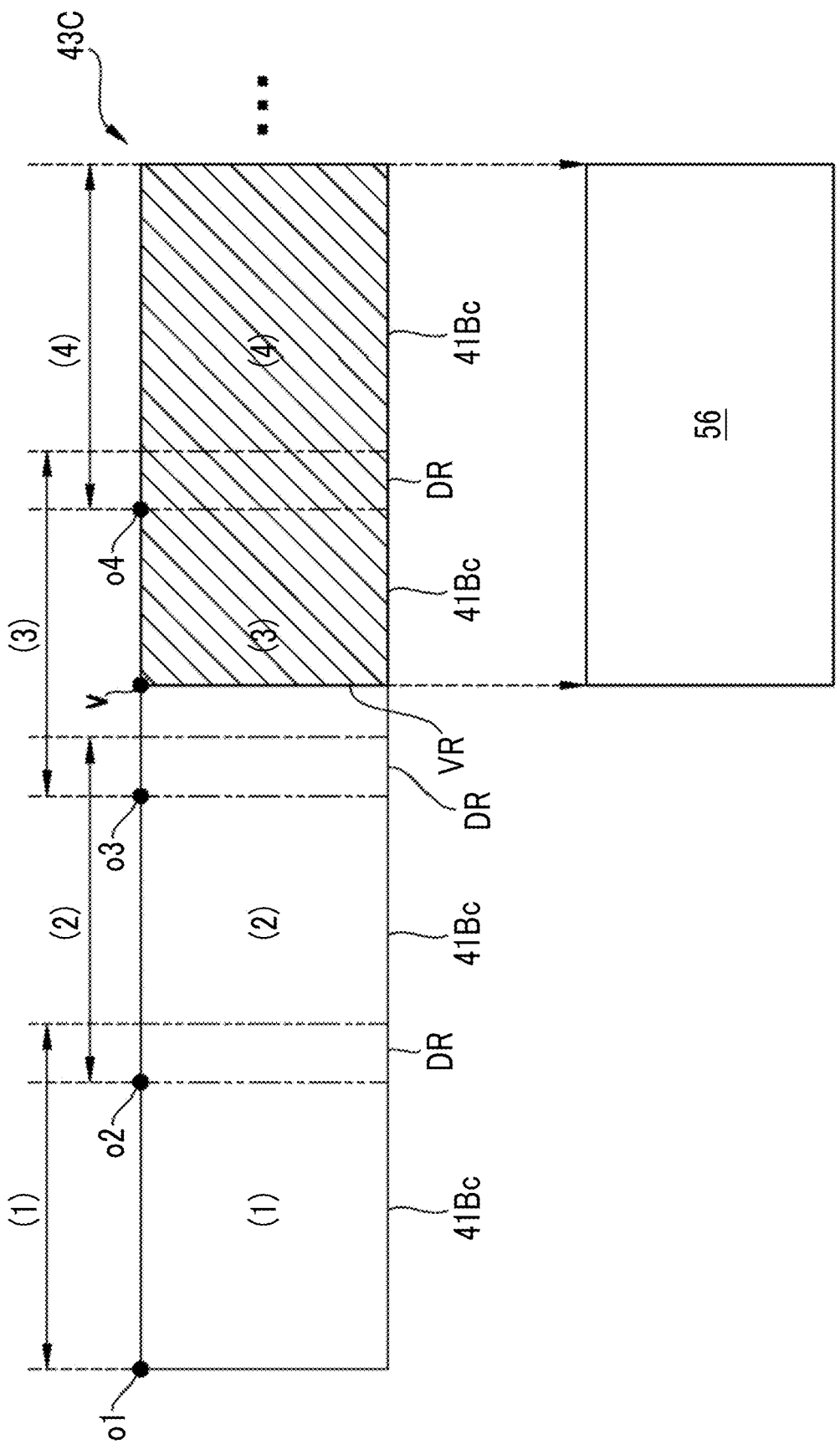

FIG. 28 is an illustrative diagram illustrating a display of a display region in an enlarging manner in the display control unit according to the fifth embodiment in a case where the determination unit that the display region is not in an imaging range of an original image.

Figure 29:
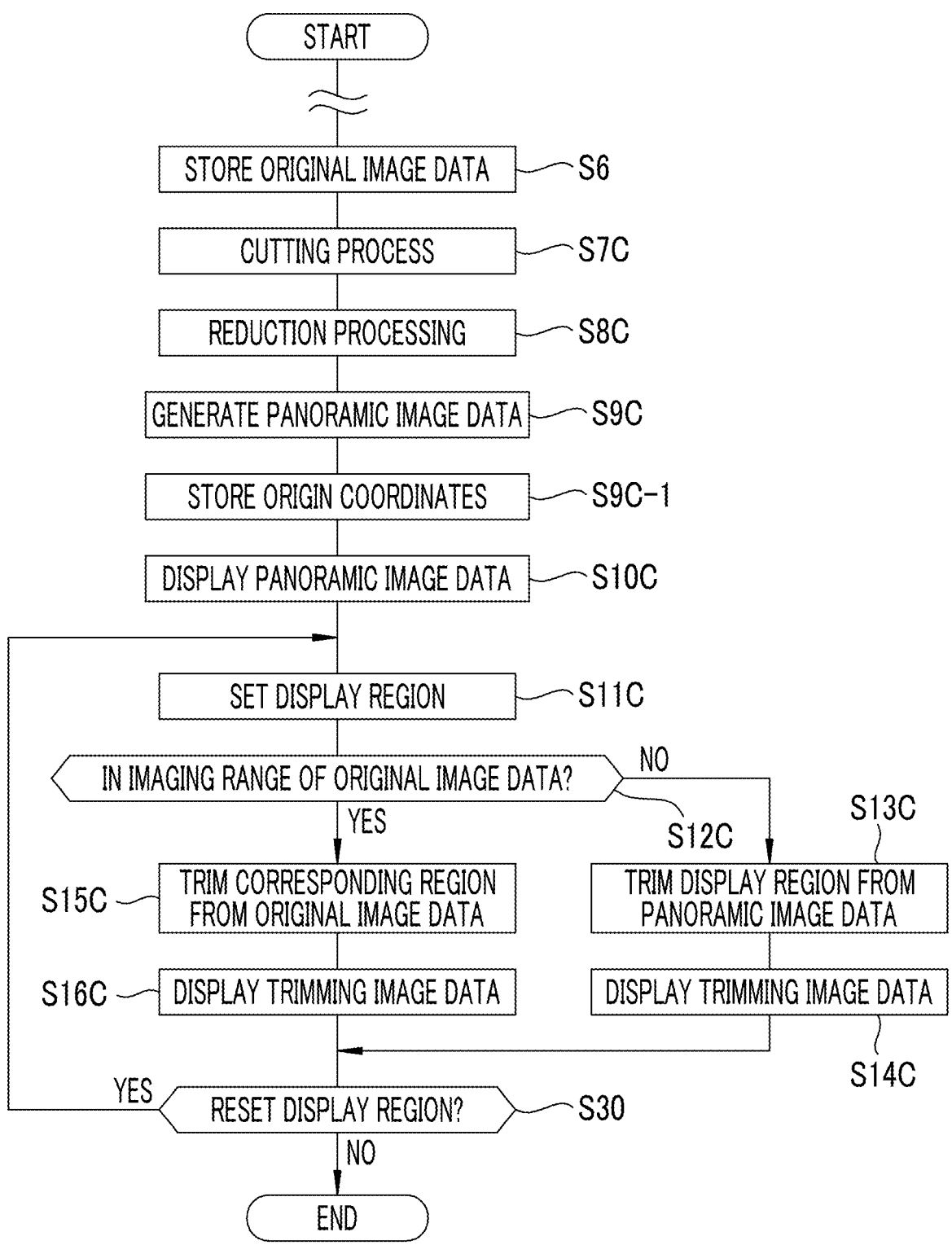

FIG. 29 is a flowchart illustrating a flow of panoramic image data display process and a display region d display process in an enlarging manner in the imaging device of the fifth embodiment.

Figure 30A:
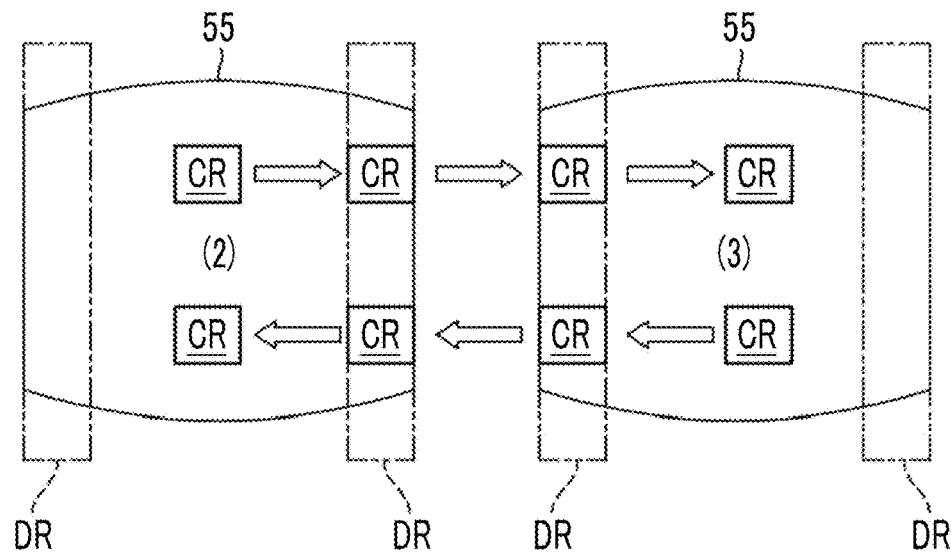
Figure 30B:
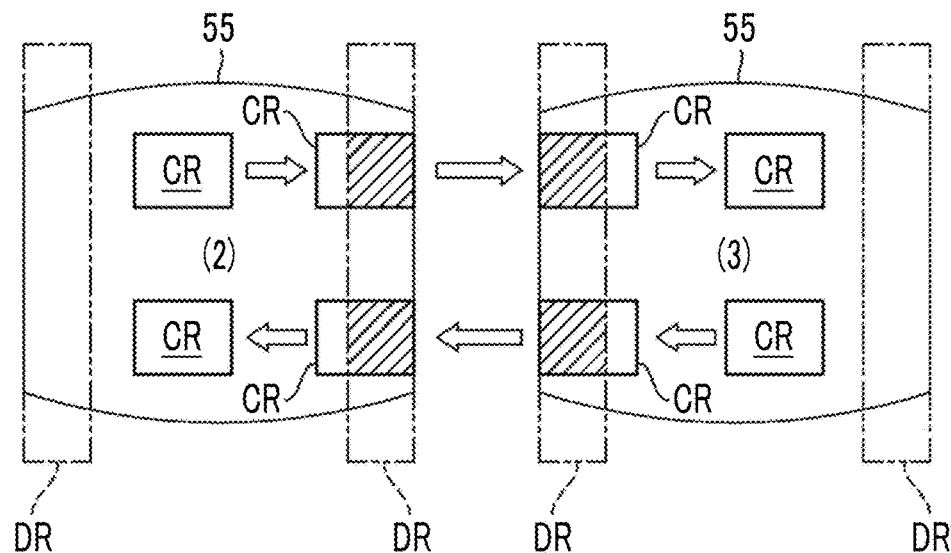
Figure 30C:
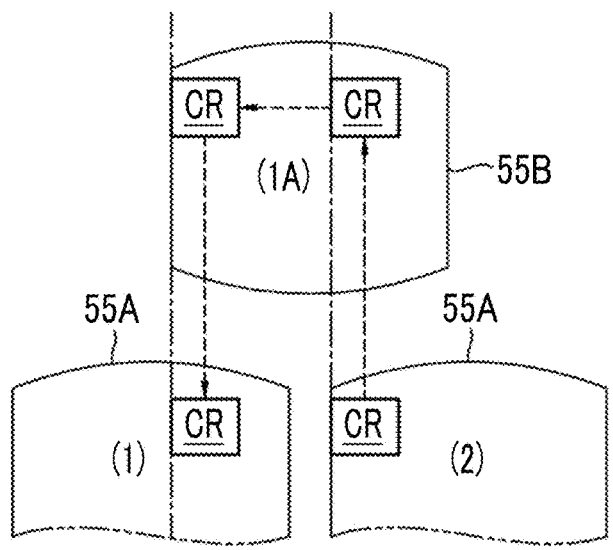

FIGS. 30A and 30B are illustrative diagrams illustrating a movement of a position of a corresponding region within original image data and a first transition process in the imaging device of the fifth embodiment, and FIG. 30C is an illustrative diagram illustrating a second transition process.

Figure 31:
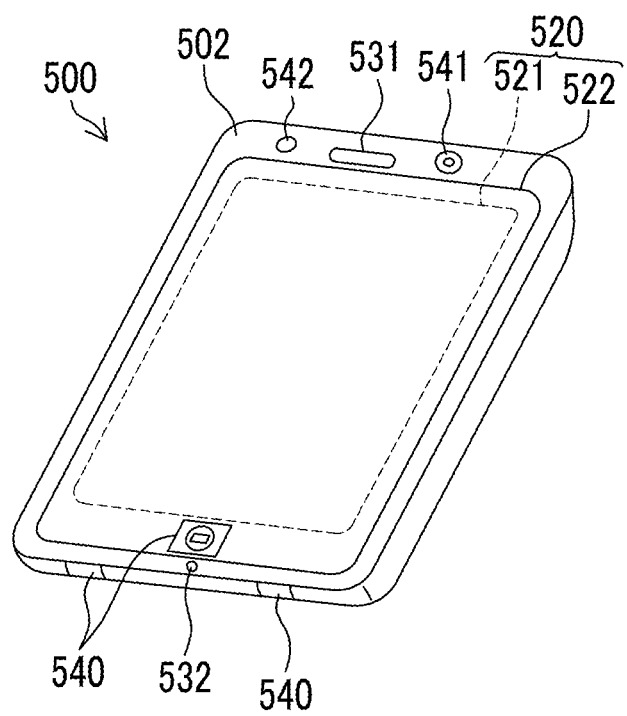

FIG. 31 is an external perspective view of a smartphone to which the invention can be applied.

Figure 32:
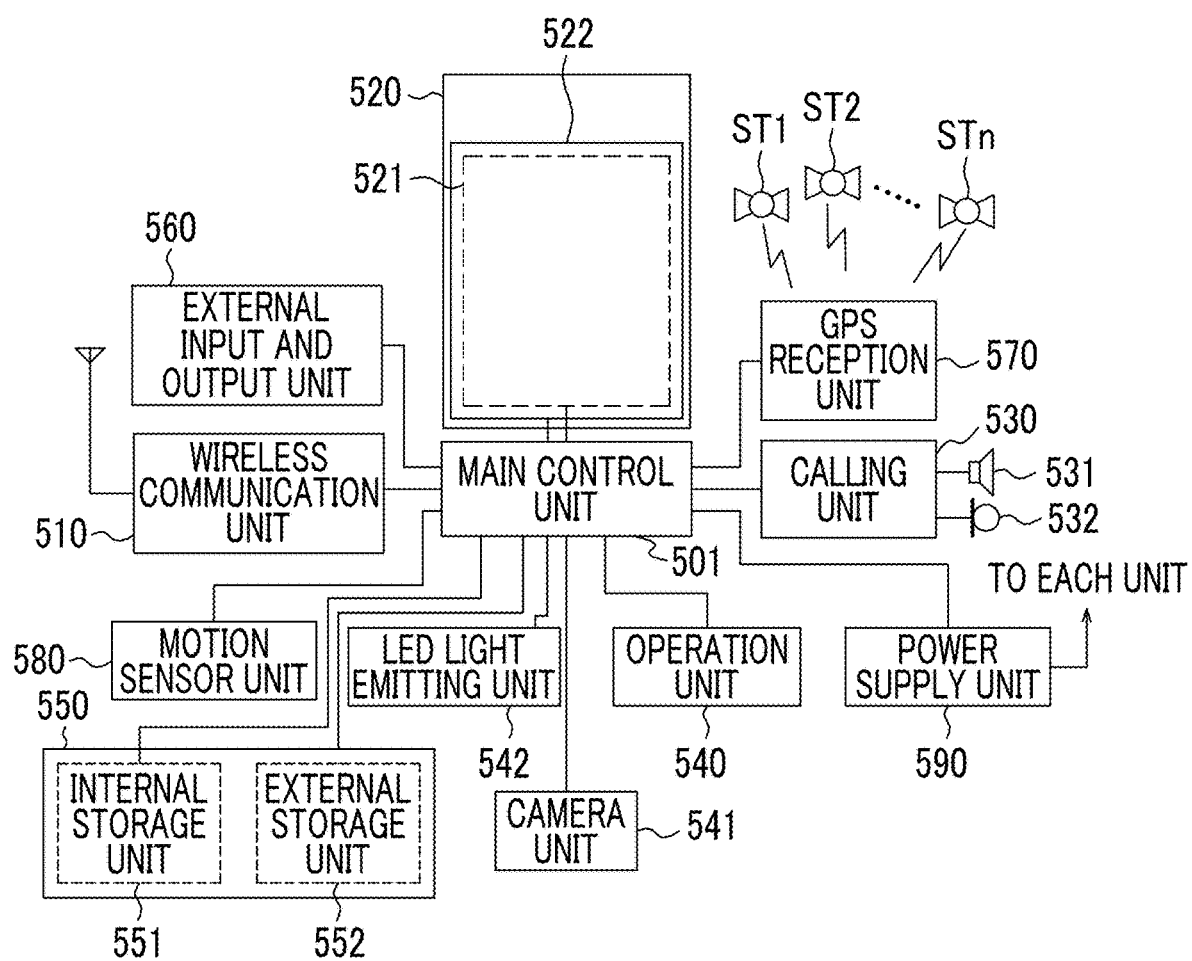

FIG. 32 is a block diagram illustrating a configuration of a smartphone illustrated in FIG. 31.

Figure 33A:
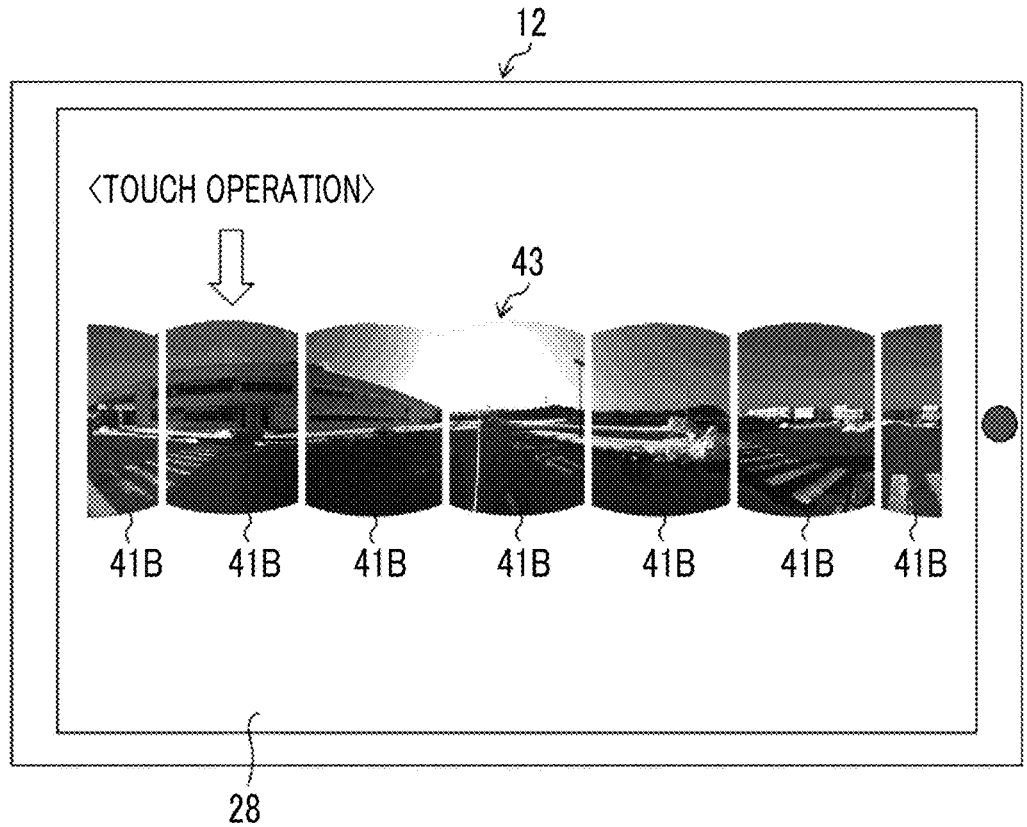
Figure 33B:
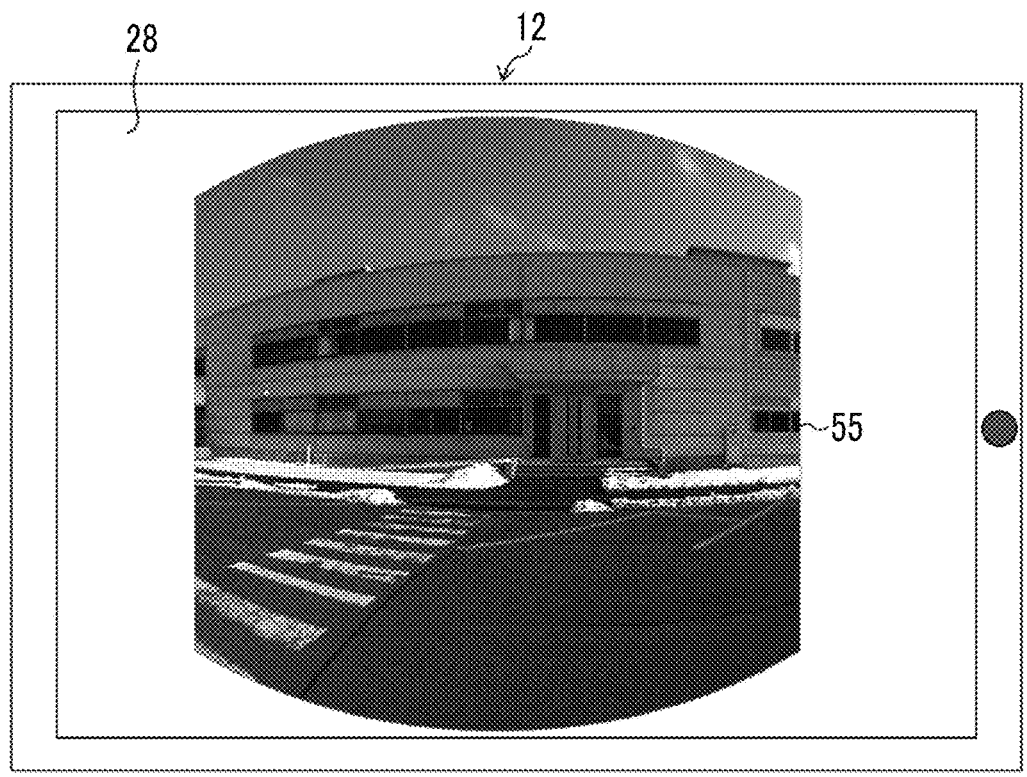

FIGS. 33A and 33B are illustrative diagrams illustrating an invention derived from description of the present specification.

DESCRIPTION OF THE PREFERRED EMBODIMENTS

[Overall Configuration of Imaging Device]

Figure 1:
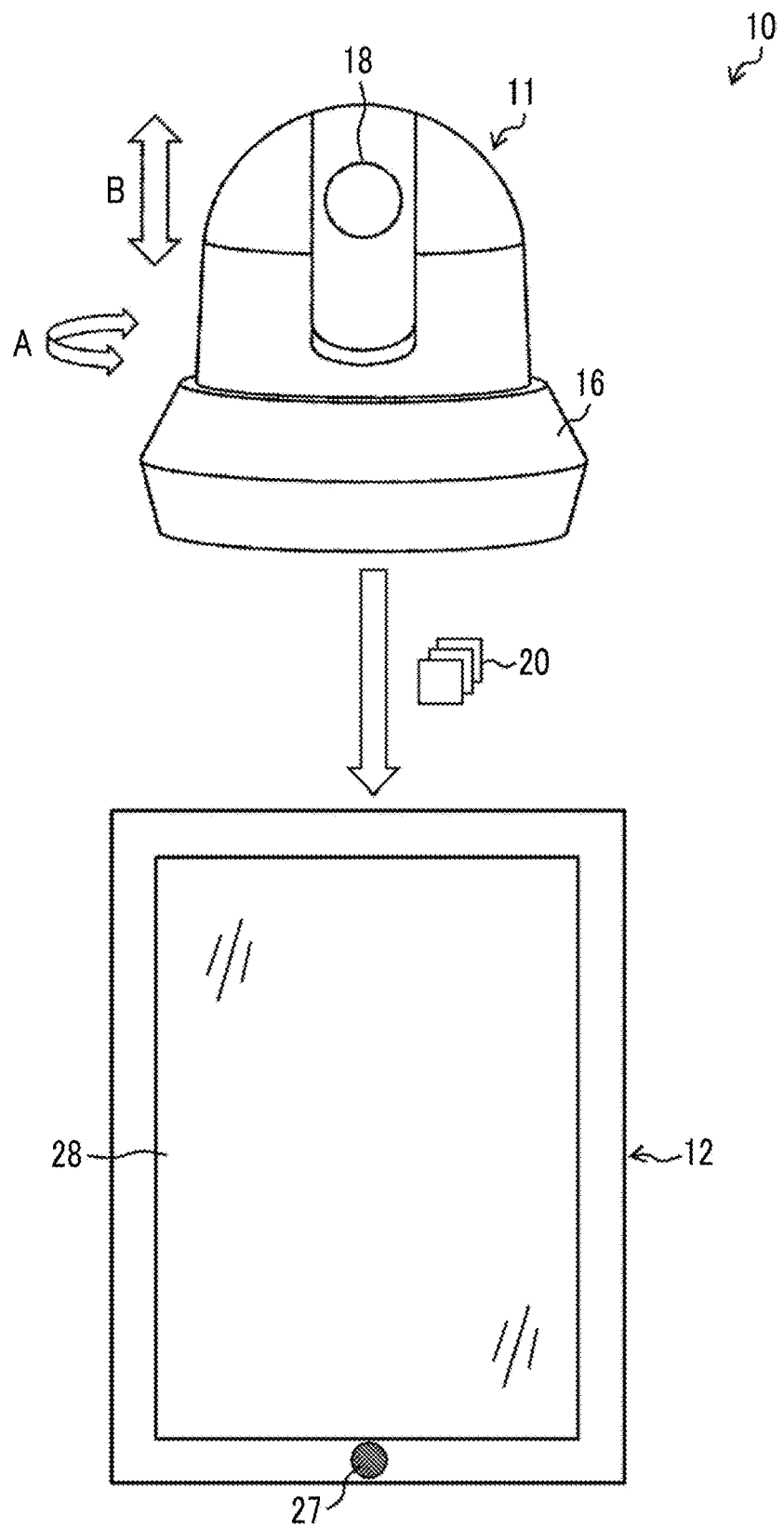
FIG. 1 is a schematic diagram of an imaging device according to a first embodiment.

FIG. 1 is a schematic diagram of an imaging device 10 according to a first embodiment. As illustrated in FIG. 1, the imaging device 10 roughly includes an imaging unit 11, and a tablet terminal 12 corresponding to an image processing device of the present invention.

The imaging unit 11 has a rotation table 16 (also referred to as a panhead) corresponding to a rotation mechanism of the present invention, and an imaging part 18 that images a subject. Although not illustrated, the imaging part 18 includes an optical system, an imaging element, and an image generation circuit. The imaging part 18 receives subject light transmitted through the optical system and performs imaging using the imaging element, and the image generation circuit generates captured image data 20 of the subject corresponding to a captured image of the present invention on the basis of an image signal read from the imaging element.

The rotation table 16 rotates the imaging part 18 in a pan direction (a horizontal direction) indicated by an arrow A in the drawing by rotating the imaging unit 11 in the pan direction. Further, the imaging part 18 is rotatable in a tilt direction (a vertical direction) indicated by an arrow B in the drawing in the imaging unit 11. Therefore, the imaging unit 11 is a so-called pan tilt camera capable of rotating the imaging direction (imaging optical axis) by the imaging part 18 in the pan direction and the tilt direction. This imaging unit 11 can image a subject around the imaging unit 11 in a dividing manner by continuously executing imaging while rotating (panning) in the pan direction using the rotation table 16. The "horizontal direction" in the present specification includes a direction parallel to a plane perpendicular to a rotation axis about which the imaging unit 11 (imaging part 18) is rotated.

Figure 2:
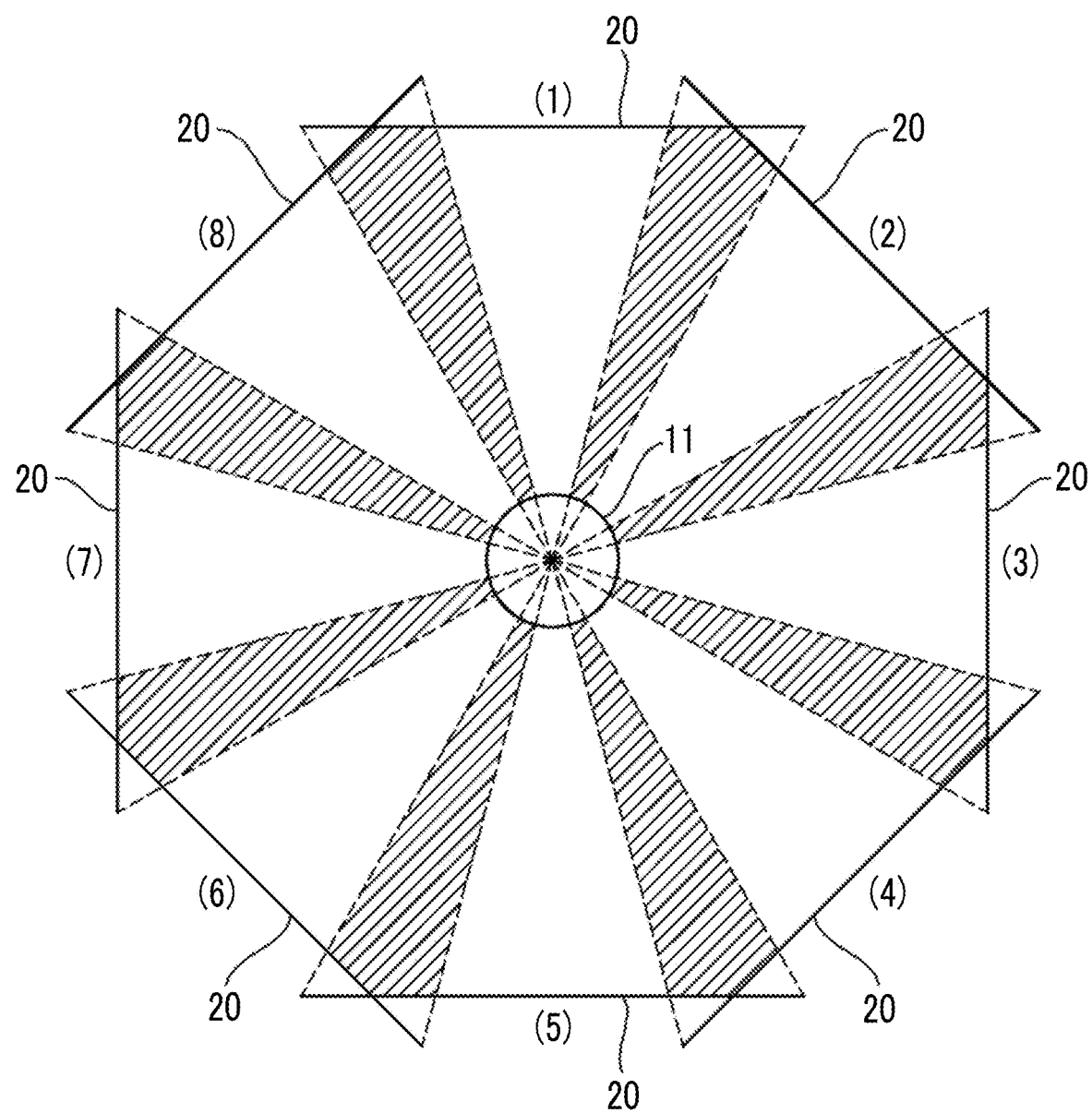
FIG. 2 is an illustrative diagram illustrating an example of imaging of a subject around an imaging unit in a dividing manner using the imaging unit.

FIG. 2 is an illustrative diagram illustrating an example of imaging of a subject around the imaging unit 11 in a dividing manner using the imaging unit 11. As illustrated in FIG. 2, the imaging unit 11 images surrounding subject at each rotation angle position while rotating by a preset constant (including substantially constant) rotation angle through the rotation table 16 to generate a plurality of pieces of captured image data 20. That is, the imaging unit 11 continuously executes the imaging while moving in an imaging range (indicated by a dotted line in FIG. 2) of the imaging unit 11 in a pan direction (horizontal direction) to image the subject around the imaging unit 11 in a dividing manner. Parenthesized numerals (1) to (8) in parentheses in FIG. 2 indicate an order of imaging in the imaging unit 11.

The above-described constant rotation angle is set to an angle at which the imaging ranges of the imaging part 18 are partially duplicated (indicated by shaded areas in FIG. 2) before and after successive imaging. This rotation angle is determined on the basis of the angle of view of the imaging part 18 of the imaging unit 11. The angle of view of the imaging part 18 can be obtained on the basis of a focal length of an optical system, a size of an imaging surface of an imaging element, and the like. Further, although the angle of view (a horizontal angle of view) of the imaging unit 11 in FIG. 2 is less than 90°, but may be 90° or more.

Since the imaging unit 11 of this example images a subject of 360° around the imaging unit 11 in a dividing manner, the captured image data 20 obtained by first imaging in time series are partially duplicated, in the imaging range, the captured image data 20 obtained by the second imaging and the last imaging in the time series.

In this example, the imaging unit 11 is rotated by a constant rotation angle by the rotation table 16. However, it is not always necessary to rotate the imaging unit 11 at the constant rotation angle as long as a condition that the imaging ranges of the imaging part 18 are partially duplicated before and after successive imaging is satisfied.

Referring back to FIG. 1, the tablet terminal 12 acquires the plurality of pieces of captured image data 20 obtained by imaging the subject around the imaging unit 11 in a dividing manner from the imaging unit 11, generates panoramic image data 43 to be described below on the basis of the plurality of pieces of captured image data 20 (see FIG. 7), and performs a display of the panoramic image data 43 or a display of a part of the panoramic image data 43 in an enlarging manner. An operation unit 27 and a touch panel type display unit 28 are provided in a casing of the tablet terminal 12.

[Tablet Terminal of First Embodiment]

Figure 3:
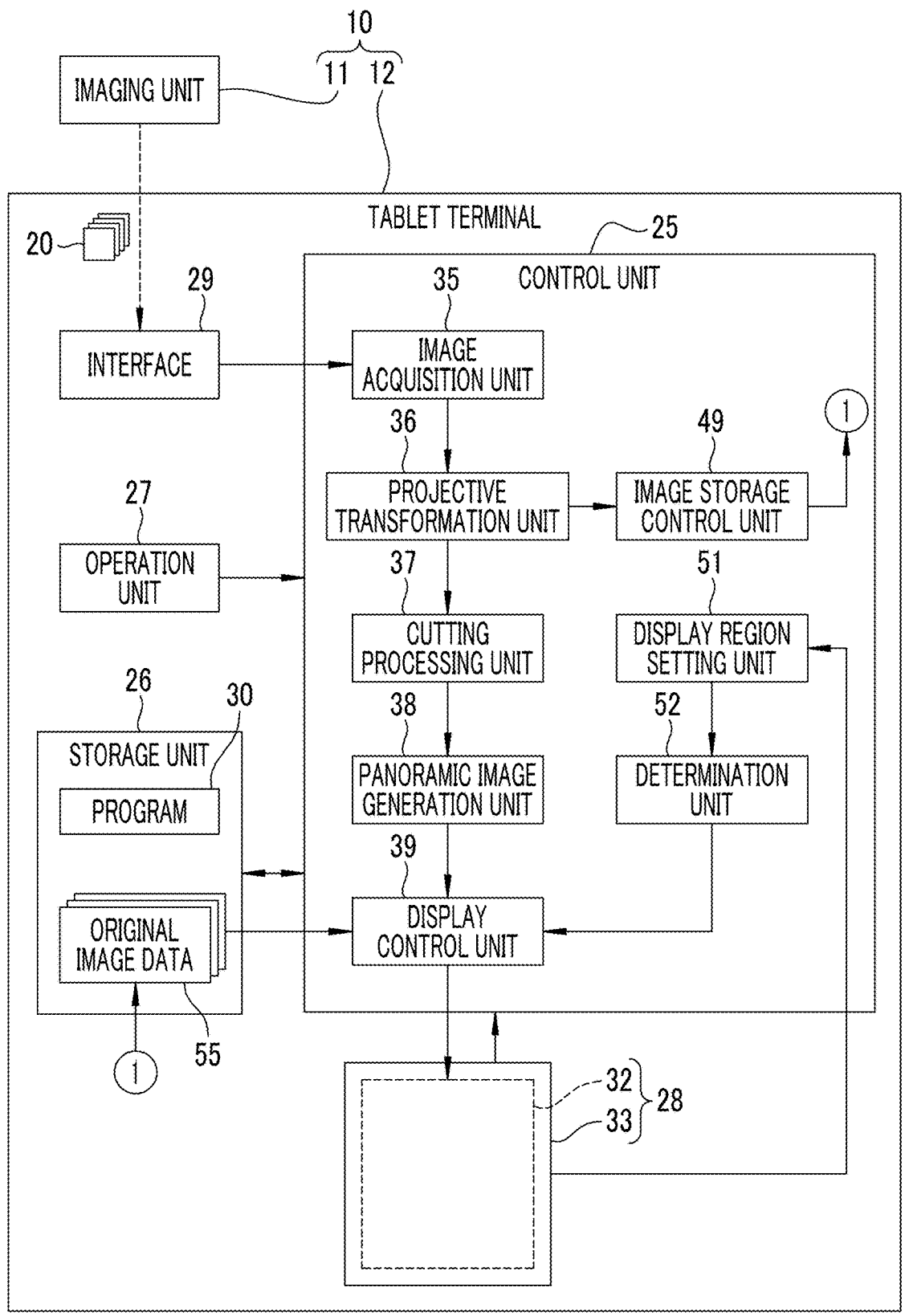
FIG. 3 is a block diagram illustrating a configuration of a tablet terminal according to the first embodiment.

FIG. 3 is a block diagram illustrating a configuration of the tablet terminal 12 of the first embodiment. As illustrated in FIG. 3, the tablet terminal 12 includes a control unit 25, a storage unit 26, an operation unit 27, a display unit 28, and an interface 29. In this example, the configuration of the tablet terminal 12 not related to the generation, display, or the like of the panoramic image data 43 is not illustrated for the sake of simplicity of description, The control unit 25 includes various calculation units including a central processing unit (CPU), a processing unit, and a memory. The control unit 25 executes various programs read from the storage unit 26 to totally control an overall operation or process of the tablet terminal 12 on the basis of control signals from the operation unit 27 and the display unit 28.

The storage unit 26 stores various programs for the control unit 25 executing a process. A program 30 for causing the control unit 25 to execute the generation and the display of the panoramic image data 43 (see FIG. 7) and the display of a part of the panoramic image data 43 in an enlarging manner is stored in the storage unit 26. Further, the storage unit 26 stores original image data 55 to be described below input from the control unit 25. Therefore, the storage unit 26 of this example functions as an image storage unit of the present invention.

The operation unit 27 is a hardware key using a key switch or the like, and receives an instruction from the user. For example, the operation unit 27 is a push button type switch which is turned on in a case where the push button type switch is pressed by a finger or the like, and is turned off due to a restoring force of a spring or the like in a case where the finger is released. The control unit 25 detects an operation with respect to the operation unit 27 and executes a process corresponding to the operation.

The display unit 28 is a touch panel that displays an image including a still image and a moving image, text information, or the like to visually deliver information to the user, and detects a user operation with respect to the displayed information under the control of the control unit 25. The display unit 28 includes a display panel 32, and an operation panel 33 arranged to cover the display panel 32.

The display panel 32 uses a liquid crystal display (LCD), an organic electro-luminescence display (GELD), or the like as a display device. The operation panel 33 is a device that is mounted so that an image displayed on a display surface of the display unit 28 (display panel 32) can be viewed and detects one or a plurality of coordinates at which the device is operated by a user's finger or a stylus. In a case where this operation panel 33 is operated by the user's finger or the stylus, a detection signal generated due to the operation is output from the operation panel 33 to the control unit 25. The control unit 25 detects the operation of the user with respect to the operation panel 33 on the basis of the detection signal input from the operation panel 33, and executes a processing according to this operation.

As the interface 29, a communication interface which is wiredly or wirelessly connected to the imaging unit 11, a communication interface which is connected to the imaging unit 11 via a communication network such as the Internet, or the like is used. The interface 29 acquires the plurality of pieces of captured image data 20 described above from the imaging unit 11 and outputs the plurality of pieces of captured image data 20 to the control unit 25. Instead of directly acquiring the plurality of pieces of captured image data 20 from the imaging unit 11, a plurality of pieces of captured image data 20 stored in a server (not illustrated), a memory card, or the like may be acquired in advance. In this case, as the interface 29, a communication interface communicatably connected to the server, or a card interface with the memory card is used.

[Function of Control Unit]

The control unit 25 (corresponding to a computer of the image processing device of the present invention) executes the program 30 read from the storage unit 26 to function as an image acquisition unit 35, a projective transformation unit 36, a cutting processing unit 37, a panoramic image generation unit 38, a display control unit 39, an image storage control unit 49, a display region setting unit 51, and a determination unit 52.

The image acquisition unit 35 functions as an image acquisition unit of the present invention together with the above-described interface 29. The image acquisition unit 35 acquires the plurality of pieces of captured image data 20 described above from the imaging unit 11 via the interface 29 and outputs the plurality of pieces of captured image data 20 to the projective transformation unit 36. Further, the image acquisition unit 35 acquires information on the angle of view (imaging range) of the imaging part 18 from the imaging unit 11 and outputs the information to the projective transformation unit 36.

Figure 4:
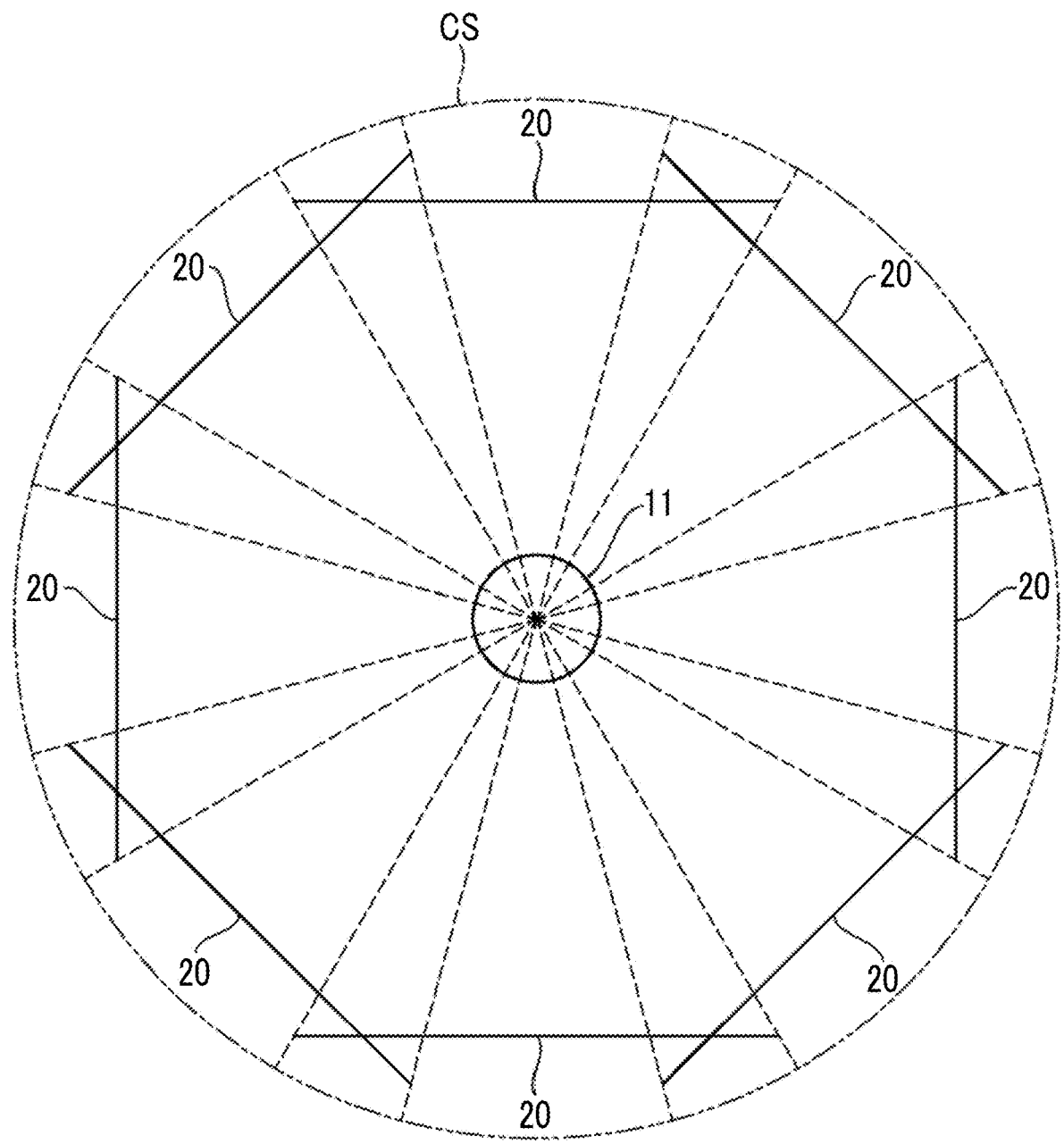
FIG. 4 is an illustrative diagram illustrating an example of a projective transformation process in a projective transformation unit.

FIG. 4 is an illustrative diagram illustrating an example of a projective transformation process in the projective transformation unit 36. As illustrated in FIG. 4, the projective transformation unit 36 performs the projective transformation process of performing projective transformation on the same projection plane on the basis of the angle of view of the imaging unit 11 on the plurality of pieces of captured image data 20 input from the image acquisition unit 35, to generate a plurality of pieces of transformed image data 41 (see FIG. 5). The projective transformation unit 36 of this example performs a cylindrical transformation process of performing cylindrical transformation on an image obtained by projecting the plurality of pieces of captured image data 20 onto a cylindrical plane CS which is the same projection plane as a projective transformation process. Since a specific method of this cylindrical transformation process is disclosed in JP2000-125190A described above, detailed description will be omitted herein.

(A) of FIG. 5 is a front view of the captured image data 20 before the projective transformation process (cylindrical transformation process), and (B) of FIG. 5 is a front view of the transformed image data 41 after the projective transformation process. The transformed image data 41 corresponds to the captured image subjected to a projective transformation process of the present invention.

As illustrated in (A) of FIG. 5, in a case where the captured image data 20 before the projective transformation process is arranged, the subject in each captured image data 20 is influenced by so-called tilt (a slope of an imaging target surface with respect to an imaging optical axis of the imaging part 18), and therefore, a position of the subject is shifted between adjacent pieces of image data in which the imaging ranges are partially duplicated. On the other hand, as illustrated in (B) of FIG. 5, in the transformed image data 41 after the cylindrical transformation process, the influence of the tilt is suppressed, and the shift of the position of the subject between the adjacent pieces of image data is reduced.

Referring back to FIG. 3, the projective transformation unit 36 outputs the plurality of pieces of transformed image data 41 subjected to the projective transformation process to the cutting processing unit 37 and the image storage control unit 49.

The image storage control unit 49 stores the plurality of pieces of transformed image data 41 after the projective transformation process in the projective transformation unit 36 and before the cutting process in the cutting processing unit 37 to be described below as a plurality of pieces of original image data 55 in the storage unit 26.

(A) of FIG. 6 is a front view of the transformed image data 41 before the cutting process in the cutting processing unit 37 and (B) of FIG. 6 is a front view of cut image data 41A after the cutting process in the cutting processing unit 37.

As illustrated in (A) of FIG. 6, first, in a case where the plurality of pieces of transformed image data 41 are input from the projective transformation unit 36, the cutting processing unit 37 discriminates the duplicate region DR between adjacent pieces of image data in the plurality of pieces of transformed image data 41 in which the imaging ranges are partially duplicated each other. In this example, since imaging is performed at each rotation angle position while rotating the imaging unit 11 by a predetermined angle, a range (width) of the duplicate region DR between the adjacent pieces of image data is determined by the angle of view and the rotation angle of the imaging unit 11.

Next, as illustrated in (B) of FIG. 6, the cutting processing unit 37 performs the cutting process of cutting the duplicate region DR between the adjacent pieces of image data with a preset width from the image ends thereof facing each other on the plurality of pieces of transformed image data 41 to generates a plurality of pieces of cut image data 41A. The cutting processing unit 37 outputs the plurality of pieces of cut image data 41A after the cutting process to the panoramic image generation unit 38 (see FIG. 3).

Here, it is preferable that the "preset width" at the time of the process of cutting the duplicate region DR is set to be great such that the pieces of adjacent image data (adjacent images) in a plurality of pieces of cut image data 41A after the cutting process overlap. In this case, a part of the subject present in the plurality of pieces of transformed image data 41 before the cutting process is prevented from being lost due to the cutting process. Accordingly, it is possible to reliably confirm the entire subject of 360° around the imaging unit 11 from the panoramic image data 43 to be described below generated on the basis of the plurality of pieces of cut image data 41A.

Further, in this case, it is more preferable that the "preset width" is set to such a size that the amount of overlapping (overlapping width) between the adjacent pieces of image data of the plurality of pieces of cut image data 41A becomes smaller. This is because in the panoramic image data 43 to be described below, a sense of discomfort is not given to the user as the amount of overlapping between the pieces of adjacent image data is smaller.

FIG. 7 is a front view of the panoramic image data 43 generated by the panoramic image generation unit 38 (see FIG. 3). As illustrated in FIG. 7, the panoramic image generation unit 38 performs a reducing process on each of the plurality of pieces of cut image data 41A input from the cutting processing unit 37 to generate a plurality of pieces of reduced image data 41B, and connects the plurality of pieces of reduced image data 41B in a state in which the plurality of pieces of reduced image data 41B are adjacent to each other at intervals therebetween in an order of imaging in the imaging unit 11 to generate the panoramic image data 43.

It is preferable that a reduction ratio at the time of the process of reducing the cut image data 41A to the reduced image data 41B has a value such that the user can look down the substantially entire panoramic image data 43 (or a region of a certain percentage or more) in a case where the panoramic image data 43 is displayed on the display unit 28, and is determined on the basis of the resolution of the display unit 28 (the display panel 32) or the like.

Further, it is preferable that a size of an interval between the adjacent pieces of image data of the plurality of pieces of reduced image data 41B within the panoramic image data 43 is limited to a size in a predetermined range in order to give a visual effect that adjacent pieces of image data have continuity, to the user. "Within this predetermined range" is, for example, a range narrower than the width of the duplicate region DR (not illustrated in FIG. 7) between the adjacent pieces of image data.

In this example, the panoramic image data 43 is generated by sequentially performing the cutting process, the reducing process, and the connection process on the plurality of pieces of transformed image data 41, but the method of generating the panoramic image data 43 is not limited thereto. For example, the pieces of cut image data 41A are connected at intervals in the above-described order of imaging to generate panoramic image data (not illustrated) with ultra-high resolution, and then, this panoramic image data (not illustrated) may be subjected to the reducing process to generate the panoramic image data 43.

Further, the panoramic image generation unit 38 does not perform the reducing process on the above-described panoramic image data with ultra-high resolution (not illustrated), and the display control unit 39 may perform the reducing process on the panoramic image data with ultra-high resolution. In this case, the display control unit 39 functions as a part of the panoramic image generation unit of the present invention.

Thus, the panoramic image generation unit 38 generates the panoramic image data 43 in which the plurality of pieces of reduced image data 41B subjected to the cutting process are connected in a state in which the plurality of pieces of reduced image data 41B are adjacent at intervals in the above-described imaging order. The panoramic image generation unit 38 outputs the generated panoramic image data 43 to the display control unit 39 (see FIG. 3).

FIG. 8 is an illustrative diagram illustrating a process of displaying the panoramic image data 43 in the display control unit 39 (see FIG. 3). FIG. 9 is an illustrative diagram illustrating a modification example of the process of displaying the panoramic image data 43 in the display control unit 39. As illustrated in FIG. 8, the display control unit 39 outputs the panoramic image data 43 input from the panoramic image generation unit 38 to the display unit 28 (display panel 32) illustrated in FIG. 3 described above, and displays the (substantially) entire panoramic image data 43 on the display unit 28.

A size of the panoramic image data 43 displayed on the display surface of the display unit 28 can be changed. For example, as illustrated in FIG. 9, in a case where the display control unit 39 displays the panoramic image data 43 on the display unit 28, it is also possible to enlarge the panoramic image data 43 so that only a part thereof is displayed on the display unit 28.

Referring back to FIGS. 3 and 8, the display region setting unit 51 functions as a display region setting unit 51 of the present invention together with the above-described operation panel 33. The display region setting unit 51 sets a region that the user has selected in the panoramic image data 43 on the display surface of the display unit 28 by operating the operation panel 33 during a display of the panoramic image data 43 in the display unit 28, as the display region VR to be displayed in an enlarging manner in the panoramic image data 43. In FIG. 8, a display region VR set to have a size falling in a range of the angle of view of the imaging part 18, that is, the imaging range of the original image data 55, and a display region VR set to have a size not falling in the imaging range of the original image data 55 are illustrated. Setting range information indicating the setting range of the display region VR in the display region setting unit 51 is output from the display region setting unit 51 to the determination unit 52.

The determination unit 52 determines whether the display region VR set by the display region setting unit 51 has a size in the imaging range of the original image data 55 (that is, in the range of angle of view of the imaging part 18) on the basis of the setting range information input from the display region setting unit 51. Here, since the reduction ratio of the reduced image data 41B is known, the size of the imaging range of the original image data 55 on the panoramic image data 43 (the range of angle of view of the imaging part 18) is obtained.

Therefore, the determination unit 52 determines that the display region VR is in the imaging range of the original image data 55 in a case where a size in a horizontal direction and a size in a vertical direction of the display region VR are smaller than a size in a horizontal direction and a size in a vertical direction of the original image data 55 on the panoramic image data 43 (ranges of a horizontal angle of view and a vertical angle of view of the imaging part 18). Conversely, the determination unit 52 determines that the display region VR does not fall in the imaging range of the original image data 55 (that is, NO) in a case where both of the sizes in the horizontal direction and the vertical direction of the display region VR are not smaller than the sizes in the horizontal direction and the vertical direction of the original image data 55 on the panoramic image data 43 (the ranges of the horizontal angle of view and the vertical angle of view of the imaging part 18). The determination unit 52 outputs a determination result to the display control unit 39.

In a case where the display region setting unit 51 sets the display region VR, the display control unit 39 displays the display region VR within the panoramic image data 43 in an enlarging manner on the display unit 28. In this case, the display control unit 39 changes a method of displaying the display region VR in an enlarging manner on the basis of the determination result input from the determination unit 52.

FIG. 10 is an illustrative diagram illustrating a display of the display region VR in an enlarging manner in the display control unit 39 in a case where the determination unit 52 determines that the display region is not in the imaging range of the original image. As illustrated in FIG. 10, in a case where the determination unit 52 determines that the display region is not in the imaging range of the original image, the display control unit 39 trims the region corresponding to the display region VR from the panoramic image data 43, and displays trimmed trimming image data 56 on the display unit 28 according to a screen size of the display panel 32 (display panel 32).

FIG. 11 is an illustrative diagram illustrating a display of the display region VR in an enlarging manner in the display control unit 39 in a case where the determination unit 52 determines that the display region VR is in the imaging range of the original image data 55. As illustrated in FIG. 11, first, the display control unit 39 searches for the original image data 55 corresponding to the reduced image data 41B in winch the display region VR has been set, from the original image data 55 stored in the storage unit 26.

Then, the display control unit 39 discriminates a corresponding region CR corresponding to the display region VR in the original image data 55 that has been searched for. Since the cut width of the cut image data 41A and the reduction ratio of the reduced image data 41B are already known, the display control unit 39 can determine position coordinates of the corresponding region CR within the original image data 55 and the range thereof from the position coordinates of the display region VR in the reduced image data 41B and the range thereof.

The display control unit 39 trims the corresponding region CR from the original image data 55 that has been searched for, and displays trimming image data 57 of the corresponding region CR on the display unit 28. In a case where a resolution of the trimming image data 57 is lower than or higher than the resolution of the display unit 28, the display control unit 39 may enlarge or reduce and display the trimming image data 57 according to the resolution of the display unit 28.

FIGS. 12A to 12D illustrate are illustrative diagram illustrating a display of the display region VR in an enlarging manner in the display control unit 39 in a case where the determination unit 52 determines that the display region VR is in the imaging range of the original image data 55 (in the range of the angle of view of the imaging part 18), and a case where the display region VR is set to extend over two pieces of reduced image data 41B.

As illustrated in (A) of FIG. 12, the display control unit 39 first discriminates the reduced image data 41B with a larger area within the display region VR (hereinafter referred to as an in-region area) among the two pieces of reduced image data 41B set to extend over the display region VR, and searches for the original image data 55 corresponding to the reduced image data 41B with the larger in-region area from the storage unit 26.

Next, as illustrated in FIGS. 12(B) and 12(C), the display control unit 39 discriminates the corresponding region CR corresponding to the display region VR from the original image data 55 that has been searched for. The corresponding region CR corresponding to the display region VR in this case is a corresponding region CR corresponding to the display region VR1 that is at a position moved in parallel from an initial set position of the display region VR into the reduced image data 41B having the larger in-region area. The amount of the parallel movement is a magnitude of the width of the display region VR outside the reduced image data 41B having the larger in-region area.

As illustrated in (D) of FIG. 12, the display control unit 39 trims the corresponding region CR corresponding to the display region VR1 from the original image data 55 that has been searched for, and displays the trimming image data 57 of this corresponding region CR on the display unit 28.

The display control unit 39 has a superimposed display mode in which the display control unit 39 displays a sub-screen 59 (FIG. 13) showing the range of the display region VR within the panoramic image data 43 in a part of the display surface of the display unit 28 in a case where the display control unit 39 displays the trimming image data 57 of the corresponding region CR trimmed from the original image data 55 on the display unit 28.

FIG. 13 is an illustrative diagram illustrating the sub-screen 59 displayed on the display surface of the display unit 28 in the superimposed display mode. In a case where the display control unit 39 receives an input of a sub-screen display instruction via the operation unit 27 or the operation panel 33, the display control unit 39 generates a reduced panoramic image data 43s obtained by reducing the panoramic image data 43, and displays the sub-screen 59 including the reduced panoramic image data 43s on a part of the display surface of the display unit 28. This reduced panoramic image data 43s is image data indicating the entirety (including substantially entirety) of the panoramic image data 43 and corresponds to an entire image of the present invention. Even in a case where the trimming image data 57 is displayed on the display unit 28 through the display of the sub-screen 59, the user can recognize the entire panoramic image data 43.

Further, in a case where the display control unit 39 displays the sub-screen 59 on the display unit 28, the display control unit 39 superimposes and displays a range image VRs indicating the range of the display region VR set by the display region setting unit 51 on the reduced panoramic image data 43s within the sub-screen 59. Thus, the user can easily discriminate which region of the panoramic image data 43 has been enlarged and displayed for the trimming image data 57 displayed on the display unit 28.

[Operation of Imaging Device of First Embodiment]

Next, an operation of the imaging device 10 having the above configuration will be described with reference to FIG. 14. FIG. 14 is a flowchart illustrating a flow of the process of displaying the panoramic image data 43 or a process of displaying the display region VR in an enlarging manner in the imaging device 10 of the first embodiment (an image processing method of the present invention).

<Process of Displaying Panoramic Image Data>

First the imaging unit 11 images a subject that is in an arbitrary orientation among subjects surrounding the imaging unit 11 to generate captured image data 20 (step S1). Then, the imaging unit 11 is rotated by a predetermined angle by the rotation table 16 (NO in step S2, and step S3), and then, the imaging unit 11 images the surrounding subject again (step S1). Accordingly, the second imaging in the imaging unit 11 is executed in a state in which the imaging range are partially duplicated the imaging range in the first imaging, and new captured image data 20 is generated by the imaging unit 11.

Similarly, each time the imaging unit 11 is rotated by a predetermined angle by the rotation table 16, the imaging unit 11 images surrounding subjects at each rotation angle position to generate a plurality of pieces of captured image data 20 (NO in step S2). Accordingly, as illustrated in FIG. 2 described above, the subject of 360° around the imaging unit 11 is imaged by the imaging unit 11, and the imaging in the imaging unit 11 is ended (YES in step S2). As a result, the plurality of pieces of captured image data 20 obtained by imaging 360° around the imaging unit 11 in a dividing manner are obtained.

In a case where a startup operation of the program 30 is performed in the tablet terminal 12, the control unit 25 reads and executes the program 30 from the storage unit 26, thereby functioning as the image acquisition unit 35, the projective transformation unit 36, the cutting processing unit 37, the panoramic image generation unit 38, the display control unit 39, the image storage control unit 49, the display region setting unit 51, and the determination unit 52.

First, the image acquisition unit 35 acquires a plurality of pieces of captured image data 20 from the imaging unit 11 via the interface 29 (step S4, which corresponds to an image acquisition step of the present invention). The image acquisition unit 35 may acquire the plurality of pieces of captured image data 20 in block after the imaging in the imaging unit 11 ends or may sequentially acquire the pieces of captured image data 20 from the imaging unit 11 each time the imaging unit 11 performs imaging. The plurality of pieces of captured image data 20 are output from the image acquisition unit 35 to the projective transformation unit 36.

The projective transformation unit 36 that has received the input of the plurality of pieces of captured image data 20 performs a projective transformation process (cylindrical transformation process) on the plurality of pieces of captured image data 20 as illustrated in FIGS. 4 and 5 described above to generate a plurality of pieces of transformed image data 41 (step S5). Accordingly, an influence of the tilt is suppressed, and the shift of the position of the subject between the adjacent pieces of image data of the plurality of pieces of transformed image data 41 is reduced. The plurality of pieces of transformed image data 41 are output from the projective transformation unit 36 to the cutting processing unit 37 and the image storage control unit 49.

The image storage control unit 49 that has received the input of the plurality of pieces of transformed image data 41 stores the plurality of pieces of transformed image data 41 as a plurality of pieces of original image data 55 in the storage unit 26 (step S6, which corresponds to an image storage control step).

On the other hand, as illustrated in FIG. 6 described above, the cutting processing unit 37 receiving the plurality of piece s of transformed image data 41 performs a cutting process of cutting the duplicate region DR between adjacent pieces of image data with a preset width from the image ends facing each other on the plurality of pieces of transformed image data 41 (step S7, which corresponds to a cutting process step of the present invention). Through this cutting process, a plurality of pieces of cut image data 41A is generated from the plurality of pieces of transformed image data 41.

Further, in the cutting process of tins example, the magnitude of the width for cutting the duplicate region DR is adjusted so that adjacent pieces of image data of the plurality of pieces of cut image data 41A are partially duplicated each other. Accordingly, as described above, a part of the subject present in the plurality of pieces of transformed image data 41 before the cutting process is prevented from being lost by the cutting process. The plurality of pieces of cut image data 41A are output from the cutting processing unit 37 to the panoramic image generation unit 38.

The panoramic image generation unit 38 that has received the input of the plurality of pieces of cut image data 41A performs a reducing process on the plurality of pieces of cut image data 41A to generate a plurality of pieces of reduced image data 41B (step S8). Then, as illustrated in FIG. 7 described above, the panoramic image generation unit 38 connects the plurality of generated reduced image data 41B in a state in winch the plurality of generated reduced image data 41B are adjacent to each other at intervals in an imaging order of the imaging unit 11 to generate panoramic image data 43 (step S9, which corresponds to a panoramic image generation step of the present invention). Since there is the interval in a case where the respective reduced image data 41B are connected, it is possible to reduce a sense of discomfort that is given to the user even in a case where the adjacent pieces of image data of the reduced image data 41B are partially duplicated each other.

Further, in this example, in a case where the panoramic image data 43 is generated from the plurality of pieces of reduced, image data 41B, a general connecting process (also referred to as a panorama combination process) for connecting the reduced image data 41B in a state in which the duplicate regions DR between two successive pieces of reduced image data 41B are overlapped is not performed. Therefore, a distant or near subject present in the duplicate region DR is prevented from being not normally combined, a subject is prevented from becoming a double image, or a step (shift) is prevented from occurring at a boundary portion between the images.

As described above, the method of generating the panoramic image data 43 in the panoramic image generation unit 38 may be appropriately changed. Thus, the panoramic image data 43 having a size that can be displayed on the display surface of the display panel 32 is obtained. The panoramic image data 43 is output from the panoramic image generation unit 38 to the display control unit 39.

The display control unit 39 that has received the input of the panoramic image data 43 outputs the panoramic image data 43 to the display unit 28, and displays the panoramic image data 43 on the display unit 28 as a whole as illustrated in FIG. 8 described above (step S10. which corresponds to a display control step of the present invention). The entire subject around the imaging unit 11 can be looked down from the panoramic image data 43 displayed on the display unit 28. Further, since the display of the panoramic image data 43 subjected to the reducing process is performed, it is possible to save the amount of use of a display memory (video RAM) (not illustrated) as compared with a case where the display of the panoramic image data 43 not subjected to the reducing process is performed.

<Process of Enlarging and Displaying Display Region>

In a case where the user operates the operation panel 33 to select the region to be displayed in an enlarging manner in the panoramic image data 43 during the display of the panoramic image data 43 in the display unit 28, the display region setting unit 51 sets the region selected by the user as the display region VR (step S11, which corresponds to a display region setting step of the present invention). The setting range information indicating the setting range of the display region VR is output from the display region setting unit 51 to the determination unit 52.

The determination unit 52 that has received the input of the setting range information determines whether or not the display region VR indicated by the setting range information is in the imaging range of the original image data 55 (in the range of the angle of view of the imaging part 18), and outputs a determination result to the display control unit 39 (step S12, which corresponds to a determination step of the present invention).

In a case where the display control unit 39 receives the determination result of "No" from the determination unit 52, the display control unit 39 trims a region corresponding to the display region VR from the panoramic image data 43 as illustrated in FIG. 10 (NO in step S12, and step S13). The display control unit 39 outputs the trimming image data 56 trimmed from the panoramic image data 43 to the display unit 28, and displays the trimming image data 56 in an enlarging manner on the display unit 28 (step S14, which corresponds to a display control step of the present invention). Thus, the user can confirm details of the selected display region VR.

On the other hand, in a case where the display control unit 39 receives the input of the determination result indicating that the display region VR is in the imaging range of the original image data 55 (in the range of the angle of view of the imaging part 18) from the determination unit 52, the determination unit 52 searches for the original image data 55 corresponding to the reduced image data 41B in which the display region VR has been set, from the storage unit 26 (YES in step S12). Then, as illustrated in FIG. 11, the display control unit 39 trims the corresponding region CR corresponding to the display region VR from the original image data 55 that has been searched for (step S15).

In a case where the display region VR is set to extend over two pieces of reduced image data 41B as illustrated in FIG. 12 described above, the display control unit 39 discriminates the reduced image data 41B having the in-region area among the two pieces of reduced image data 41B and searches for the original image data 55 corresponding to the reduced image data 41B having the larger inside area from the storage unit 26. Then, the display control unit 39 trims the corresponding region CR corresponding to the display region VR1 illustrated in (B) of FIG. 12 as the corresponding region CR corresponding to the display region VR from the original image data 55 that has been searched for.

The display control unit 39 outputs the trimming image data 57 trimmed from the original image data 55 to the display unit 28 to display the trimming image data 57 on the display unit 28 (step S16, which corresponds to a display control step of the present invention). Thus, by displaying the trimming image data 57 trimmed from the original image data 55 having high resolution on the display unit 28, the user can confirm more details of the selected display region VR.

In a case where the user operates the operation panel 33 or the like to reset the display region VR, step S11 and the subsequent processes described above are repeatedly executed (YES in step S30).

[Effects of First Embodiment]

As described above, in the imaging device 10 according to the first embodiment of the present invention, seamless switching between the display of the panoramic image data 43 with a resolution corresponding to the size of the display surface of the display unit 28 and the display of the trimming image data 56 or the display region VR based on the trimming image data 57 in an enlarging manner can be performed. In particular, since the trimming image data 57 is high-resolution data trimmed from the original image data 55, it is possible to achieve both of viewability and reliable viewing of the subject by switching between the display of the panoramic image data 43 and the display of the trimming image data 57. As a result, it is possible to look down the subject and confirm details thereof.

Further, in a case where the panoramic image data 43 is generated, the panoramic image data 43 is generated by connecting the plurality of pieces of reduced image data 41B subjected to the cutting process in a state the pieces of reduced image data 41B are made adjacent with intervals therebetween in an order of imaging in the imaging unit 11 instead of performing a general connection process (panorama combination process) for connecting the duplicate regions DR between two successive pieces of reduced image data 41B in a state in which the pieces of reduced image data 41B overlap. Thus, it is possible to avoid failure (combination failure) of the panoramic image data 43. Further, the influence of the tilt is less as compared with a case where the pieces of image data are simply arranged side by side, and it becomes easy to view the panoramic image data 43.

[Imaging Device According to Second Embodiment]

Next, an imaging device according to a second embodiment of the present invention will be described. In the imaging device according to the second embodiment, in a case where the trimming image data 57 trimmed from the corresponding region CR of the original image data 55 is displayed on the display unit 28, a position of the corresponding region CR trimmed from the original image data 55 can be moved according to user's operation.

The imaging device of the second embodiment has basically the same configuration as the imaging device 10 of the first embodiment and functions or configurations that are the same as those of the first embodiment are denoted with the same reference numerals and description thereof will be omitted.

An operation panel 33 of the second embodiment receives a moving operation of moving the position of the corresponding region CR within the original image data 55 from the user during the display of the trimming image data 57 on the display unit 28. This moving operation is, for example, a swipe operation that is performed on the display surface of the display unit 28 by the user.

For example, in a case where the user confirms the image data of a peripheral region (a region outside the corresponding region CR) that is outside the display surface during the display of the trimming image data 57 on the display unit 28, the user performs the swipe operation on the display surface of the display unit 28. The operation panel 33 detects the swipe operation performed on the display surface of the display panel 32 by the user as a moving operation for the position of the corresponding region CR, and outputs a moving operation defection signal to the display control unit 39. The moving operation detection signal includes a swipe operation direction indicating the movement direction of the position of the corresponding region CR, and the amount of the swipe operation indicating the amount of movement of the position of the corresponding region CR.

The display control unit 39 according to the second embodiment receives the moving operation for moving the position of the corresponding region CR via the operation panel 33. The display control unit 39 moves the position of the corresponding region CR to be trimmed from the original image data 55 according to the moving operation performed by the user on the basis of the moving operation defection signal input from the operation panel 33. Further, simultaneously the display control unit 39 sequentially trims the corresponding region CR at a new position from the original image data 55, and sequentially outputs the trimming image data 57 to the display unit 28. Accordingly the trimming image data 57 displayed on the display unit 28 is updated according to the moving operation performed by the user.

Further, the display control unit 39 executes a first transition process of causing the position of the corresponding region CR in one piece of original image data 55 among the pieces of original image data 55 adjacent to each other, to transition into the other original image data 55 according to the moving operation performed by the user.

FIGS. 15(A) and 15(B) are illustrative diagrams illustrating the first transition process for the position of the corresponding region CR between the pieces of original image data 55 adjacent to each other. Here, in the description, the position of the corresponding region CR transitions from one piece of original image data 55 on the left side in FIG. 15 to the other original image data 55 on the right side in FIG. 15, and a size and a shape of the corresponding region CR are a size and a shape fit to the duplicate region DR. The one piece of original image data 55 on the left side in FIG. 15 corresponds to one image of the present invention, and the other original image data 55 on the right side in FIG. 15 corresponds to the other image of the present invention.

As illustrated in (A) of FIG. 15, the display control unit 39 performs a temporarily stopping process for temporarily stopping a movement of the position of the corresponding region CR in a case where the position of the corresponding region CR in one piece of original image data 55 on the left side in FIG. 15 is moved to an image end on the side facing (adjacent to) the other original image data 55 on the right side in FIG. 15 by a moving operation performed by the user.

In a case where the display control unit 39 further receives a moving operation for moving the position of the corresponding region CR from one piece of original image data 55 to the other original image data 55 via the operation panel 33 after the temporarily stopping process, the display control unit 39 executes the first transition process. Specifically, the display control unit 39 causes a first position of the corresponding region CR at the image end of one piece of original image data 55 to transition to a second position within the other original image data 55 corresponding to the first position, as illustrated in (B) of FIG. 15.

Here, the second position corresponding to the first position is a position within the "duplicate region DR" of the other original image data 55 corresponding to the position (first position) of the corresponding region CR within the "duplicate region DR" of one piece of the original image data 55 in a case where the size and the shape of the corresponding region CR are the size and the shape fit to the duplicate region DR. That is, before and after the first transition process, a positional relationship is the same between the corresponding regions CR within the duplicate regions DR of the one piece of original image data 55 and the other original image data 55.

For example, in a case where a representative point of the first position is a point P1 and a representative point of the second position is a point P2, a y coordinate of the point P1 of the first position is the same as a y coordinate of the point P2 of the second position. Thus, the display control unit 39 can determine the y coordinate of the point P2 from the y coordinate of the point P1. Further, in a case where an arbitrary position in the duplicate region DR is set as an origin, an x coordinate of the point P1 in the duplicate region DR of one piece of original image data 55 is the same as an x coordinate of the point P2 in the duplicate region DR of the other original image data 55. Therefore, the display control unit 39 can determine the x coordinate of the point P2 from the x coordinate of the point P1.

Thus, the display control unit 39 executes the first transition process for the position of the corresponding region CR by determining the second position in the other original image data 55 corresponding to the first position from the first position of the corresponding region CR within one piece of original image data 55.

FIGS. 15C and 15D are illustrative diagrams illustrating a first transition process in a case where the corresponding region CR has a size or shape not fit to the duplicate region DR.

As illustrated in (C) of FIG. 15, in a case where the position of the corresponding region CR in one piece of original image data 55 has moved to the image end by the moving operation performed by the user, the display control unit 39 performs the above-described temporarily stopping process. Further, in a case where the display control unit 39 further receives a moving operation for moving the position of the corresponding region CR from one piece of original image data 55 to the other original image data 55 via the operation panel 33 after the temporarily stopping process, the display control unit 39 performs the first transition process as illustrated in (D) of FIG. 15.

Specifically, the display control unit 39 causes the first position of the corresponding region CR in one piece of original image data 55 to transition to the second position in the other original image data 55 corresponding to the first position.

However, in a case where the corresponding region CR has a size or shape not fir to the duplicate region DR, an image within the corresponding region CR of one piece of original image data 55 and outside the duplicate region DR does not exist in the other original image data 55. Therefore, the second position corresponding to the first position described herein is a position including the duplicate region DR (indicated by hatching in the drawing) within the other original image data 55 corresponding to the duplicate region DR (indicated by hatching in the drawing) within the corresponding region CR of one piece of original image data 55. That is, before and after the first transition process, the duplicate region DR included in the corresponding region CR in one piece of original image data 55 has a correspondence a relationship with the duplicate region DR included in the corresponding region CR in the other original image data 55.

For example, in a case where representative points on the left end side and the right end side of the first position are points L1 and R1, respectively, and representative points on the left end side and right end side of the second position are points L2 and R2, respectively, y coordinates of the points L1 and R1 are the same as y coordinates of points L2 and R2. Therefore, the display control unit 39 determines the y coordinates of the points L2 and R2 from the y coordinates of the points L1 and R1.

Further, the display control unit 39 determines a coordinate of the image end on the side facing the one piece of original image data 55 in the other original image data 55 as the x coordinate of the point L2 corresponding to the x coordinate of the point L1. Further, the display control unit 39 determines a value obtained by adding a magnitude of the width in the x direction of the corresponding region CR to the x coordinate of the point L2 as the x coordinate of the point R2.

Thus, the display control unit 39 determines the second position within the other original image data 55 corresponding to the first position from the first position of the corresponding region CR within one piece of original image data 55 and the magnitude of the width of the corresponding region CR in the x direction, and executes the first transition process for the position of the corresponding region CR.

The display control unit 39 trims the corresponding region CR from the other original image data 55 after the first transition process, and outputs the trimming image data 57 after trimming to the display unit 28. Accordingly the trimming image data 57 displayed on the display unit 28 is updated according to the moving operation performed by the user.

[Operation of Imaging Device of Second Embodiment]

Next, an operation of the imaging device of the second embodiment will be described with reference to FIG. 16.

FIG. 16 is a flowchart illustrating a flow of a process of displaying the trimming image data 57 in the imaging device of the second embodiment. Since the process up to step S16 is basically the same as the process up to step S16 illustrated in FIG. 14 of the above-described first embodiment, detailed description thereof will be omitted herein.

In a case where the user confirming the trimming image data 57 displayed on the display unit 28 in step S16 performs a swipe operation on the display surface to confirm the image data of the peripheral region outside the display surface of the display unit 28, this swipe operation is detected by the operation panel 33 as an operation of moving the position of the corresponding region CR. The operation panel 33 outputs a moving operation detection signal to the display control unit 39. Accordingly the display control unit 39 receives the moving operation for moving the position of the corresponding region CR via the operation panel 33 (step S17).

Then, the display control unit 39 trims the corresponding region CR at a new position from the original image data 55 while moving the position of the corresponding region CR within the original image data 55 on the basis of the moving operation detection signal from the operation panel 33, and sequentially outputs the trimming image data 57 to the display unit 28 (step S18). Accordingly, the trimming image data 57 displayed on the display unit 28 is updated according to the moving operation (step S19). Hereinafter, the processes from step S17 to step S19 are repetitively executed until the position of the corresponding region CR reaches the image end of the original image data 55 by the moving operation (NO in step S20).

On the other hand, as illustrated in FIGS. 15A and 15C, in a case where the position of the corresponding region CR within one piece of the original image data 55 is moved to the image end on the side facing the other original image data 55 by the moving operation, the display control unit 39 performs the temporarily stopping process for temporarily stopping a movement of the position of the corresponding region CR (YES in step S20, and step S21). In a case where the user does not perform a moving operation for moving the position of the corresponding region CR toward the other original image data 55 on the operation panel 33 after the temporarily stopping process, the processes from step S17 to step S21 described above are repeated (NO in step S22).

On the other hand, in a case where the user performs the moving operation for moving the position of the corresponding region CR toward the other original image data 55 on the operation panel 33 after the temporarily stopping process, the display control unit 39 that has received the moving operation performs the first transition process (YES in step S22). Through this first transition process, the first position of the corresponding region CR at the image end within one piece of the original image data 55 transitions to the second position in the other original image data 55 corresponding to the first position, as illustrated in (B) or (D) of FIG. 15 described above (step S23).

After the first transition process, the display control unit 39 trims the corresponding region CR from the other original image data 55 and outputs new trimming image data 57 to the display unit 28 (step S24). Accordingly, the display on the display unit 28 is updated to the trimming image data 57 trimmed from the other original image data 55 (step S25).

Hereinafter, step S17 and the subsequent processes are repeatedly executed until the user ends the moving operation (step S26).

[Effect of Second Embodiment]

As described above, in the imaging device according to the second embodiment, the position of the corresponding region CR to be trimmed in the original image data 55 is moved according to the moving operation by the user. Thus, if is possible to update the display of the trimming image data 57 on the display surface of the display unit 28 according to the movement of the position of the corresponding region CR, and to freely change a position at which details of the subject around the imaging unit 11 are confirmed in detail. Further, in a case where the position of the corresponding region CR in one of piece of the original image data 55 is moved to the image end by the moving operation of the user, it is possible to update display content of the display unit 28 into the trimming image data 57 trimmed from the other original image data 55 without causing the user to be aware of a gap (slit) between the individual images of the panoramic image data 43, by performing the first transition process through the temporarily stopping process.

Further, since the temporarily stopping process is performed before the first transition process, it is possible to notify the user that the first transition process of the corresponding region CR is performed, and it is possible to reduce a sense of discomfort that is given to the user in a case where the display of the display unit 28 is switched to the trimming image data 57 trimmed from the other original image data 55.

[Imaging Device of Third Embodiment]

Next, an imaging device 10A according to a third embodiment of the present invention wall be described with reference to FIG. 17. FIG. 17 is a block diagram illustrating a configuration of the imaging device 10A according to the third embodiment. In the imaging device according to the second embodiment, in a case where the position of the corresponding region CR in one piece of original image data 55 is moved to the image end according to the moving operation of the user, the first transition process is performed through the temporarily stopping process, whereas in the imaging device 10A of the third embodiment, a second transition process different from the first transition process is performed.

As illustrated in FIG. 17, the imaging device 10A basically has the same configuration as the imaging device according to the second embodiment except that a different method of imaging the subject around the imaging unit 11 in a dividing manner in the imaging unit 11 is used, and a tablet terminal 12A includes a control unit 25A differing from that in the second embodiment (first embodiment). Therefore, functions or configurations that are the same as those of each of the above embodiments are denoted with the same reference numerals, and description thereof will be omitted.

FIG. 18A is an illustrative diagram illustrating an example of imaging of a subject around the imaging unit 11 in a dividing manner in the imaging unit 11 according to each of the above embodiments, and FIG. 18B is an illustrative diagram illustrating an example of imaging of a subject around the imaging unit 11 in a dividing manner in the imaging unit 11 according to the third embodiment.

As illustrated in FIG. 18(A), the imaging unit 11 of each of the above-described embodiments images a surrounding subject at each rotation angle position while being rotated by the above-described constant rotation angle by the rotation table 16, thereby generating captured image data 20.

On the other hand, as illustrated in FIG. 18(B), the imaging unit 11 of the third embodiment images surrounding subjects at each rotation angle position to generate a plurality of pieces of captured image data 20 while being rotated by a rotation angle that is ½ of the above-described constant rotation angle by the rotation table 16. That is, the imaging unit 11 performs the first imaging of the surrounding subjects at a position rotated by the above-described constant rotation angle by the rotation table 16 as in the above embodiments, and performs second imaging of the surrounding subjects at a position further rotated by the rotation angle which is ½ of the above-described constant rotation angle from the position of the first imaging each time the first imaging is performed. Therefore, the imaging unit 11 generates the plurality of pieces of captured image data 20 which is twice the captured image data in the above embodiments through the first imaging [parenthesized numerals (1), (2), . . . in FIG. 18] and the second imaging [Parenthesized numerals (1A), (2A), . . . in FIG. 18].

Referring back to FIG. 17, the control unit 25A of the tablet terminal 12A executes the program 30 read from the storage unit 26 to function as an image acquisition unit 35A, a projective transformation unit 36A, a cutting processing unit 37A, a panoramic image generation unit 38A, a display control unit 39A, and an image storage control unit 49A, in addition to the display region setting unit 51 and the determination unit 52 described in the first embodiment.

The image acquisition unit 35A acquires a plurality of pieces of captured image data 20 obtained by the first imaging and the second imaging from the imaging unit 11 via the interface 29 and outputs the captured image data 20 to the projective transformation unit 36.

(A) to (C) of FIG. 19 is an illustrative diagram illustrating a flow from the projective transformation process to the panoramic image data generation process in the fourth embodiment. Parenthesized numerals (1), (1A), (2), (2A), . . . in FIG. 19 indicate an order of imaging in the imaging unit 11. Further, the captured image data 20 of parenthesized numerals (1), (2), . . . are obtained in the first imaging, and the captured image data 20 of parenthesized numerals (1A), (2A), . . . are obtained in the second imaging [see FIG. 18(B)].

As illustrated in (A) and (B) of FIG. 19, the projective transformation unit 36A performs a projective transformation process (cylindrical transformation process) on the plurality of pieces of captured image data 20 obtained in the first imaging (corresponding to one imaging of the present invention) and the plurality of pieces of second captured image data 20 obtained in the second imaging (corresponding to the other imaging of the present invention) to generate two sets of a plurality of pieces of transformed image data 41. The projective transformation unit 36A outputs the plurality of pieces of transformed image data 41 obtained in the first imaging to the cutting processing unit 37A. Further, the projective transformation unit 36A outputs two sets of the plurality of pieces of transformed image data 41 obtained in the first imaging and the second imaging to the image storage control unit 49A.

The image storage control unit 49A stores the plurality of pieces of transformed image data 41 corresponding to the plurality of pieces of captured image data 20 obtained in the first imaging as the plurality of pieces of first original image data 55A (see FIG. 17) in the storage unit 26. Further, the image storage control unit 49A stores the plurality of pieces of transformed image data 41 corresponding to the plurality of pieces of captured image data 20 obtained in the second imaging as a plurality of pieces of second original image data 55B (see FIG. 17) in the storage unit 26. Thus, the original image data 55 including the plurality of pieces of first original image data 55A and the second original image data 55B is stored in the storage unit 26.

Then, although not illustrated, the cutting processing unit 37A performs the cutting process as illustrated in FIG. 6 of the first embodiment described above on the plurality of pieces of transformed image data 41 obtained in the first imaging to generate a plurality of pieces of cut image data 41A.

As illustrated in (C) of FIG. 19, the panoramic image generation unit 38A connects the reduced image data 41B obtained by performing a reducing process on the plurality of pieces of cut image data 41A input from the cutting processing unit 37A in an order of imaging in the imaging unit 11 to generate panoramic image data 43. As described in the first embodiment, the method of generating the panoramic image data 43 is not particularly limited.

Thus, in the third embodiment, twice the number of pieces of captured image data 20 in each of the above embodiments are generated by the first imaging and the second imaging. However, the panoramic image data 43 is generated using the captured image data 20 obtained by the first imaging among the first imaging and the second imaging. The panoramic image data 43 may be generated using the captured image data 20 obtained by the second imaging instead of being generated using the captured image data 20 obtained by the first imaging.

Referring back to FIG. 17, the display control unit 39A outputs the panoramic image data 43 input from the panoramic image generation unit 38A to the display unit 28 and displays the panoramic image data 43 on the display unit 28.

In a case where the display region VR is set in the display region setting unit 51, the display control unit 39A displays the trimming image data 56 (see FIG. 10) or the trimming image data 57 (see FIG. 11) trimmed from the corresponding region CR of the first original image data 55A on the display unit 28 on the basis of the determination result of the determination unit 52, as in the second embodiment.

Further, in a case where the display control unit 39A receives an operation of moving the position of the corresponding region CR from the operation panel 33 during the display of the trimming image data 57 in the display unit 28, the display control unit 39A moves the position of the corresponding region CR to be trimmed from the first original image data 55A according to the moving operation, as in the second embodiment. In a case where the position of the corresponding region CR is moved to the image end within one piece of first original image data 55A among the pieces of first original image data 55A adjacent to each other by the moving operation as in (A) of FIG. 15 described above or the like, the display control unit 39A performs the second transition process after the above-described temporarily stopping process is performed.

FIG. 20 is an illustrative diagram illustrating the second transition process in the display control unit 39A of the third embodiment. Here, a case where the position of the corresponding region CR in one piece of first original image data 55A indicated by parenthesized numeral (2) is moved to the image end on the side facing (adjacent to) the other first original image data 55A indicated by parenthesized numeral (1) will be described by way of example.

As illustrated in FIG. 20, in a case where the display control unit 39A receives a moving operation for moving the position of the corresponding region CR from the one piece of first original image data 55A to the other first original image data 55A through the operation panel 33 after the temporarily stopping process described above, the display control unit 39A executes the second transition process.

Specifically the display control unit 39A causes the first position of the corresponding region CR at the image end in the one piece of first original image data 55A to transition to the third position corresponding to the first position within the second original image data 55B indicated by parenthesized numeral (1A) captured between the one piece of first original image data 55A and the other first original image data 55A. A point Q1 is a representative point of the first position, and a point Q3 is a representative point of the third position.

Since the imaging ranges of one piece of first original image data 55A indicated by parenthesized numeral (2) and the second original image data 55B indicated by parenthesized numeral (1A) overlap, both have common duplicate region DR (not illustrated). A range (width) of the duplicate region DR is obtained from the angle of view information and a magnitude of the rotation angle of the imaging unit 11. Therefore, as described in FIG. 15 described above, the third position corresponding to the first position can be determined by classifying cases according to whether or not the size and shape of the corresponding region CR are the size and shape fit to the duplicate region DR.

The display control unit 39A trims the corresponding region CR from the second original image data 55B after the second transition process, and displays the trimming image data 57 after trimming on the display unit 28.

The display control unit 39A performs the third transition process after the above-described temporarily stopping process in a case where the position of the corresponding region CR within the second original image data 55B is moved to the image end of the other first original image data 55A side by the moving operation received via the operation panel 33. In this case, the display control unit 39A causes a fourth position of the corresponding region CR within the second original image data 55B to transition to the second position within the other first original image data 55A corresponding to the fourth position, A point Q4 is a representative point of the fourth position and a point Q2 is a representative point of the second position.

Subsequently, the display control unit 39A trims the corresponding region CR from the other first original image data 55A after the third transition process, and displays the trimming image data 57 after trimming on the display unit 28.

[Operation of Imaging Device of Third Embodiment]

Next, an operation of the imaging device 10A of the third embodiment will be described with reference to FIG. 21. FIG. 21 is a flowchart illustrating a flow of a process of displaying the trimming image data 57 in the imaging device 10A according to the third embodiment.

As illustrated in FIG. 21, the process up to step S16 is basically the same as the process up to step S16 illustrated in FIG. 14 of the first embodiment described above. However, in the third embodiment, in steps S1 to S9 (see FIG. 14), a plurality of pieces of captured image data 20 twice the captured image data in each of the embodiments are generated by performing the first imaging and the second imaging as illustrated in FIG. 18(B) described above. After the projective transformation process is performed on the captured image data 20 obtained in the first imaging and the second imaging, the cutting process and the reducing process are performed on the plurality of transformed image data 41 corresponding to the first imaging (or the second imaging) to generate the panoramic image data 43.

Further, in step S6 (see FIG. 14), the image storage control unit 49A stores the plurality of pieces of transformed image data 41 obtained in the first imaging in the storage unit 26 as a plurality of pieces of first original image data 55A, and stores the plurality of pieces of transformed image data 41 obtained in the second imaging in the storage unit 26 as a plurality of pieces of second original image data 55B. Accordingly, the original image data 55 including the first original image data 55A and the second original image data 55B is stored in the storage unit 26.

In a case where the display control unit 39A receives an operation of moving the position of the corresponding region CR from the operation panel 33 (step S17A) during the display of the trimming image data 57 on the display unit 28 in step S16, the display control unit 39A moves the position of the corresponding region CR to be trimmed from the first original image data 55A according to this moving operation (step S18A). The display control unit 39A trims the corresponding region CR at a new position from the first original image data 55A, and sequentially outputs the trimming image data 57 to the display unit 28. Accordingly, the trimming image data 57 that is displayed on the display unit 28 is updated according to the moving operation (step S19A).

Hereinafter, the processes from step S17A to step S19A are repetitively executed until the position of the corresponding region CR reaches the image end of the first original image data 55A through the moving operation (NO in step S20A).

The display control unit 39A performs a temporarily stopping process for temporarily stopping a movement of the position of the corresponding region CR in a case where the position of the corresponding region CR is moved to an image end within the one piece of first original image data 55A described above by the moving operation (YES in step S20A, and step S21A). In a case where the user does not perform a mewing operation for moving the position of the corresponding region CR toward the other first original image data 55A on the operation panel 33 after the temporarily stopping process, the processes from step S17A to step S21A are repeatedly executed (NO in step S22A).

On the other hand, in a case where the user performs a moving operation for moving the position of the corresponding region CR toward the other first original image data 55A on the operation panel 33 after the temporarily stopping process, the display control unit 39A that has received this moving operation executes the second transition process (YES in step S22A). In the second transition process, the display control unit 39A causes the first position of the corresponding region CR within the one piece of first original image data 55A to transition to a third position corresponding to the first position within the second original image data 55B captured between the one and other pieces of first original image data 55A, as illustrated in FIG. 20 (step S23A).

After the second transition process, the display control unit 39 trims the corresponding region CR from the second original image data 55B and outputs new trimming image data 57 to the display unit 28 (step S24A). Accordingly the display on the display unit 28 is updated to the trimming image data 57 after trimming from the second original image data 55B (step S25A).

Here, the imaging range of the second original image data 55B is located between the imaging ranges of the one piece of first original image data 55A and the other first original image data 55A (see FIG. 18(B)). Therefore, the trimming image data 57 after trimming from the second original image data 55B becomes an image similar to the trimming image data 57 after trimming from the one piece of first original image data 55A, as compared with the trimming image data 57 after trimming from the other first original image data 55A. Therefore, in a case where the display on the display unit 28 is updated to the trimming image data 57 after trimming from the second original image data 55B, if is possible to reduce a sense of discomfort that is given to the user, as compared with a case of being updated to the trimming image data 57 after trimming from the other first original image data 55A.

After step S25A, in a case where the display control unit 39A receives an operation of moving the position of the corresponding region CR from the operation panel 33, the display control unit 39A moves the position of the corresponding region CR in the second original image data 55B according to this moving operation, and updates the trimming image data 57 displayed on the display unit 28 (steps S26A and S27A).

The display control unit 39A performs the above-described temporarily stopping process in a case where the position of the corresponding region CR within the second original image data 55B is moved to the image end of the other first original image data 55A side by the moving operation received via the operation panel 33, and performs the above-described third transition process illustrated in FIG. 20 in a case where a further moving operation is received. That is, the display control unit 39A causes the fourth position of the corresponding region CR within the second original image data 55B to transition to the second position within the other first original image data 55A corresponding to the fourth position.

Next, the display control unit 39A trims the corresponding region CR from the other first original image data 55A, and displays the trimming image data 57 after trimming on the display unit 28. Accordingly, the display on the display unit 28 is updated to the trimming image data 57 trimmed from the other first original image data 55A.

Hereinafter, step S17A and the subsequent processes are repeatedly executed until the user ends the moving operation.

[Effects of Third Embodiment]

As described above, in the imaging device 10A according to the third embodiment, in a case where the position of the corresponding region CR within one piece of first original image data 55A has moved to the image end by the moving operation of the user, if is possible to reduce a sense of discomfort that is given to the user, as compared with a case where the first transition process is performed, by performing the second transition process after the temporarily stopping process. Accordingly, it is possible to update the display content of the display unit 28 without causing the user to be aware of the gap (slit) between the images of the panoramic image data 43 as compared with the second embodiment.

<Modification Example of Third Embodiment>

In the third embodiment, in a case where the position of the corresponding region CR is moved to the image end within one piece of first original image data 55A among the pieces of first original image data 55A adjacent to each other, the above described temporarily stopping process is performed and then the second transition process is performed. However, the second transition process may be performed before the position of the corresponding region CR reaches the image end within one of the first original image data 55A. Accordingly, it is possible to avoid an influence of deterioration of resolution at the image end of the first original linage data 55A.

[Imaging Device According to Fourth Embodiment]

Next, an imaging device 10B of a fourth embodiment will be described with reference to FIG. 22. FIG. 22 is a block diagram illustrating a configuration of the imaging device 10B according to the fourth embodiment. In the imaging device 10B according to the fourth embodiment in a case where an imaging unit 11B images a subject around the imaging unit 11B in a dividing manner, the imaging starts from a preset orientation.

The imaging device 10B of the fourth embodiment has basically the same configuration as the imaging device 10 of the first embodiment (see FIG. 3) except that a geomagnetic sensor 61 is provided in the imaging unit 11B, and a control unit 25B of a tablet terminal 12B functions as the display control unit 39B. Therefore, functions or configurations that are the same as those of the first embodiment are denoted with the same reference numerals, and descript ion thereof will be omitted.

FIG. 23 is an illustrative diagram illustrating an example of imaging of a subject around the imaging unit 11B in a dividing manner in the imaging unit 11B of the fourth embodiment. Parenthesized numerals (1) to (8) in parentheses in FIG. 23 indicate an order of imaging in the imaging unit 11B.

As illustrated in FIG. 23, the imaging unit 11B has an orientation detection function of detecting an orientation (direction) on the basis of a detection result of a geomagnetic sensor 61. Therefore, in the case where the imaging unit 11B images the subject around the imaging unit 11B in a dividing manner, the imaging unit 11B starts the above-described imaging in a dividing manner after matching the imaging direction of the imaging part 18 to a predetermined orientation (for example, north). Accordingly, the imaging unit 11B starts imaging from a subject located in a preset orientation among the surrounding subjects, and then, images the surrounding subject at each rotation angle position while being rotated by a predetermined rotation angle by the rotation table 16 to generate a plurality of pieces of captured image data 20.

The captured image data 20 generated by the imaging unit 11B is acquired by the tablet terminal 12B. Accordingly, a projective transformation process, a cutting process, a reducing process, and a connecting process are performed on the plurality of pieces of captured image data 20 in the respective units of the control unit 25B of the tablet terminal 12B to generate the panoramic image data 43, similar to the first embodiment described above. The panoramic image data 43 is generated by connecting the plurality of pieces of reduced image data 41B in an order of imaging in the imaging unit 11B, that is, in an order along the rotation direction by the rotation table 16 from the above-described preset orientation. The panoramic image data 43 is input from the panoramic image generation unit 38 to the display control unit 39B.

FIG. 24 is an illustrative diagram illustrating the process of displaying the panoramic image data 43 in the display control unit 39B of the fourth embodiment. The display control unit 39B outputs the panoramic image data 43 input from the panoramic image generation unit 38 to the display unit 28, and displays the panoramic image data 43 as a whole on the display unit 28.

Further, in a case where the display control unit 39B displays the panoramic image data 43 on the display unit 28, the display control unit 39B discriminates whether each of the plurality of pieces of reduced image data 41B constituting the panoramic image data 43 is obtained by imaging a subject in which orientation with respect to the imaging unit 11B. In this example, since the panoramic image data 43 is generated by connecting the plurality of pieces of reduced image data 41B in the order along the rotation direction by the rotation table 16 from the above-described preset orientation, the display control unit 39B can discriminate the orientation corresponding to each of pieces of the reduced image data 41B on the basis of a known preset orientation and the rotation angle by the rotation table 16. The display control unit 39B displays orientation information 63 indicating whether the reduced image data 41B constituting the panoramic image data 43 is obtained by imaging the subject in which orientation with respect to the imaging unit 11B on the display surface of the display unit 28.

[Effects of Fourth Embodiment]

As described above, in the imaging device 10B according to the fourth embodiment, the imaging unit 11B having an orientation detection function starts imaging from a predetermined orientation, and the orientation information 63 is displayed together in a case where the panoramic image data 43 is displayed on the display unit 28. Thus, the user can view the panoramic image data 43 while recognizing the orientation (an absolute orientation such as north, east, west, south).

[Modification Example of Fourth Embodiment]

In the second embodiment and the third embodiment, imaging of the subject is performed from the preset orientation from the imaging unit 11, and the orientation information 63 may be displayed on the display unit 28 together with the panoramic image data 43, as in the fourth embodiment.

Further, in a case where the plurality of pieces of captured image data 20 are captured by the imaging unit 11B having the geomagnetic sensor 61, information indicating the orientation at the time of imaging may be added to each of the plurality of pieces of captured image data 20. Thus, even in a case where the imaging unit 11 starts imaging from an arbitrary orientation, the orientation corresponding to each of the pieces of reduced image data 41B can be discriminated and the orientation information 63 can be displayed on the display unit 28. Further, the plurality of pieces of reduced image data 41B can be connected in an order along the rotation direction by the rotation table 16 from the reduced image data in a preset orientation to generate panoramic image data 43 that is the same as in the fourth embodiment.

In the fourth embodiment, the imaging unit 11B having the orientation detection function using the geomagnetic sensor 61 has been described by way of example, but the method of detecting the orientation is not limited to the geomagnetic sensor 61 and various orientation detection means may be used.

[Imaging Device According to Fifth Embodiment]

Next, an imaging device 10C according to the fifth embodiment of the present invention will be described with reference to FIG. 25. FIG. 25 is a block diagram illustrating a configuration of the imaging device 10C according to the fifth embodiment. In each of the above embodiments, the panoramic image data 43 is generated by connecting the plurality of pieces of reduced image data 41B in a state in which the plurality of pieces of reduced image data 41B are adjacent to each other at intervals in the imaging order. However, in the imaging device 10C of the fifth embodiment, panoramic image data 43C (see FIG. 26) is generated using a method different from that in the above embodiment.

As illustrated in FIG. 25, the imaging device 10C has basically the same configuration as that of the imaging device 10 of the first embodiment except that the tablet terminal 12C includes a control unit 25C different from that of the first embodiment. Therefore, functions and configurations that are the same as those of the first embodiment are denoted with the same reference numerals, and description thereof will be omitted.

The control unit 25C executes the program 30 read from the storage unit 26 to function as a cutting processing unit 37C, a panoramic image generation unit 38C, a display control unit 39C, and an origin coordinate storage control unit 65, in addition to the image acquisition unit 35, the projective transformation unit 36, the image storage control unit 49, the display region setting unit 51, and the determination unit 52 described in the first embodiment.

(A) to (C) of FIG. 27 is an illustrative diagram illustrating a flow of a process of generating the panoramic image data 43C in the fifth embodiment. Parenthesized numerals (1), (2), (3), . . . in parentheses in FIG. 26 indicate an order of imaging in the imaging unit 11.

As illustrated in (A) and (B) of FIG. 26, the cutting processing unit 37C performs a cutting process of cutting an upper end portion and a lower end portion in which image distortion is large (is convexly curved) in the plurality of pieces of transformed image data 41 after the projective transformation process, to generate a plurality of pieces of cut image data 41Ac. The cutting processing unit 37C outputs the plurality of pieces of cut image data 41Ac after the cutting process to the panoramic image generation unit 38C. The cutting process in the cutting processing unit 37C may be omitted. Further, in each of the above embodiments, the same cutting process as in the cutting processing unit 37C may be executed.

As illustrated in (C) of FIG. 26, the panoramic image generation unit 38C, for example, connects reduced image data 41Bc obtained by performing a reducing process on the plurality of pieces of cut image data 41Ac input from the cutting processing unit 37C in a state in which the duplicate regions DR between adjacent images in which the imaging ranges are partially duplicated overlap (so-called panorama combination). Accordingly, the panoramic image data 43C in which the plurality of pieces of reduced image data 41Bc are connected in a state in which the duplicate regions DR between the adjacent pieces of image data overlap is generated. Thus, in the fifth embodiment, a general panorama combination process is performed. As in the first embodiment, the method of generating the panoramic image data 43C is not limited to the above method, and various methods of performing the reducing process after connecting a plurality of pieces of cut image data 41Ac may be used. The panoramic image generation unit 38C outputs the generated panoramic image data 43C to the display control unit 39C.

In a case where the panoramic image generation unit 38C generates the panoramic image data 43C, the origin coordinate storage control unit 65 obtains origin coordinates 67 (o1, o2, o3, . . . ) of each piece of reduced image data 41Bc within the panoramic image data 43C and stores the origin coordinates 67 in the storage unit 26. The origin coordinates 67 are used for identifying a range of each piece of reduced image data 41Bc within the panoramic image data 43C and are, for example, coordinates of a corner portion of each piece of reduced image data 41Bc in a case where an arbitrary point in the panoramic image data 43C is set as an origin. The origin coordinates 67 of each piece of reduced image data 41Bc can be obtained from a width (a length in the connecting direction) of each piece of reduced image data 41Bc and a width of the duplicate region DR.

Further, in a case where the origin coordinate storage control unit 65 stores the origin coordinates 67 of each piece of reduced image data 41Bc in the storage unit 26, the origin coordinate storage control unit 65 stores an image size 68 of each piece of reduced image da ta 41 Be in the storage unit 26.

Referring back to FIG. 25, the storage unit 26 of the fifth embodiment stores the origin coordinates 67 and the image size 68 input from the origin coordinate storage control unit 65, in addition to the program 30 and the original image data 55 described in the first embodiment. That is, the storage unit 26 of the fifth embodiment functions as an image storage unit and an origin coordinate storage unit of the present invention.

The display control unit 39C outputs the panoramic image data 43C input from the panoramic image generation unit 38 to the display unit 28, and displays the panoramic image data 43C on the display unit 28, as in FIGS. 8 and 9 of the first embodiment described above.

In a case where the user operates the operation panel 33 to select a region to be displayed in an enlarging manner in the panoramic image data 43C during the display of the panoramic image data 43C in the display unit 28, the display region setting unit 51 performs setting of the display region VR and outputs setting range information indicating the setting range of the display region VR to the determination unit 52. Further, the determination unit 52 determines whether or not the display region VR set by the display region setting unit 51 is in the imaging range of the original image data 55 on the basis of the setting range information input from the display region setting unit 51, and outputs a determination result to the display control unit 39C.

(A), (B) and (C) of FIG. 27 is an illustrative diagram illustrating a display of the display region VP, in an enlarging manner in the display control unit 39C of the fifth embodiment in a case where the determination unit 52 determines that the display region VR is in the imaging range of the original image data 55.

As illustrated in (A), (B), and (C) of FIG. 27, the display control unit 39C first searches for the original image data 55 including the corresponding region CR from the storage unit 26 on the basis of the position of the display region VR on the panoramic image data 43C and the origin coordinates 67 and the image size 68 read from the storage unit 26. A symbol v in FIG. 27 is a representative point of coordinates indicating the position of the display region VR on the panoramic image data 43C. By comparing the position (coordinates v) of the display region VR on the panoramic image data 43C with the coordinates of each of the points o1, o2, . . . of the origin coordinates 67 and the image size 68 of each piece of reduced image data 41Bc, the original image data 55 including the corresponding region CR corresponding to the display region VR can be discriminated.

For example, in a case where the display region VR completely falls in the range of the reduced image data 41Bc of (1) or the reduced image data 41Bc of (2), the display control unit 39C searches for the original image data 55 of (1) or (2) from the storage unit 26 as the original image data 55 including the corresponding region CR corresponding to the display region VR. The display control unit 39C trims the corresponding region CR from the original image data 55 of (1) or (2) that has been searched for, outputs the trimming image data 57 after trimming to the display unit 28, and displays the trimming image data 57 after trimming on the display unit 28.

On the other hand, in a case where the display region VR is set to extend over the reduced image data 41Bc of (2) and the reduced image data 41Bc of (3) instead of being fell in the range of the reduced image data 41 Be of (2) or the reduced image data 41Bc of (3) as in FIG. 12 of the first embodiment described above, the display control unit 39C searches for the original image data 55 of (3) having a large in-region area described above from the storage unit 26.

Then, the display control unit 39C discriminates the corresponding region CR corresponding to the display region VR from the original image data 55 of (3) that has been searched for. The corresponding region CR corresponding to the display region VR in this case is a corresponding region CR corresponding to the display region VR1 that is at a position moved in parallel from the initial setting position of the display region VR into the reduced image data 41Bc of (3) having a large in-region area. The amount of the parallel movement is a magnitude of the width (indicated by hatching in FIG. 27) of the display region VR that is outside the range on the reduced image data 41Bc of (3) having a larger in-region area. The display control unit 39C trims the corresponding region CR from the original image data 55 of (3), outputs the trimming image data 57 after trimming to the display unit 28, and displays the trimming image data 57 on the display unit 28.

FIG. 28 is an illustrative diagram illustrating a display of the display region VR (indicated by hatching in FIG. 28) in an enlarging manner in the display control unit 39C of the fifth embodiment in a case where the determination unit 52 determines "no". As illustrated in FIG. 28, the display control unit 39C trims the region corresponding to the display region VR from the panoramic image data 43C, outputs the trimming image data 56 after trimming to the display unit 28, and displays the trimming image data 56 in an enlarging manner on the display unit 28, as in the first embodiment.

[Operation of Imaging Device of Fifth Embodiment]

Next, an operation of the imaging device 10C of the fifth embodiment will be described with reference to FIG. 29. FIG. 29 is a flowchart illustrating a flow of the process of displaying the panoramic image data 43C and a process of displaying the display region VR in an enlarging manner in the imaging device IOC of the fifth embodiment. Since the process up to step S6 is basically the same as the processes from step S1 to step S6 illustrated in FIG. 14 of the first embodiment described above, detailed description will be omitted herein.

<Process of Displaying Panoramic Image Data>

After the process of step S6, the cutting processing unit 37 that has received the input of the plurality of pieces of transformed image data 41 performs a cutting process on the upper end portion and the lower end portion of the plurality of pieces of transformed image data 41 as illustrated in FIG. 26 described above to generate a plurality of pieces of cut image data 41Ac, and outputs the plurality of pieces of cut image data 41Ac to the panoramic image generation unit 38C (step S7C).

The panoramic image generation unit 38C that has received the input of the plurality of pieces of cut image data 41Ac performs a reducing process on the plurality of pieces of cut image data 41Ac to generate a plurality of pieces of reduced image data 41Bc (step S8C). Then, the panoramic image generation unit 38C connects (panorama-combines) the plurality of pieces of reduced image data 41Bc in a state in which the duplicate regions DR between adjacent images in which the imaging ranges are partially duplicated overlap to generate the panoramic image data 43C, and outputs the panoramic image data 43C to the display control unit 39C (step S9C). As described above, the method of generating the panoramic image data 43C in the panoramic image generation unit 38C is not limited to the above method.

In a case where the panoramic image generation unit 38C generates the panoramic image data 43C, the origin coordinate storage control unit 65 obtains the origin coordinates 67 of each piece of reduced image data 41Bc within the panoramic image data 43C, stores the origin coordinates 67 in the storage unit 26, and stores the image size 68 of each piece of reduced image data 41Bc in the storage unit 26 (step S9C-1).

The display control unit 39 that has received the panoramic image data 43C outputs the panoramic image data 43C to the display unit 28 and displays the panoramic image data 43C on the display unit 28 as a whole (step S10C).

<Process of Enlarging and Displaying Display Region>

As in the first embodiment, in a case where the user operates the operation panel 33 to select a region to be displayed in an enlarging manner in the panoramic image data 43C displayed on the display unit 28, the setting of the display region VR is executed by the display region setting unit 51 (step S11C), the determination is executed by the determination unit 52, and a determination result of the determination unit 52 is input to the display control unit 39C (step S12C).

In a case where the display control unit 39C receives a determination result of "No" from the determination unit 52, the display control unit 39C trims a region corresponding to the display region VR from the panoramic image data 43C and outputs the trimming image data 56 after trimming to the display unit 28, as illustrated in FIG. 28 (NO in step S12 C, and step S13C). The display control unit 39C displays the trimming image data 56 in an enlarging manner on the display unit 28 (step S14C).

On the other hand, in a case where the display control unit 39 receives the input of the determination result that the display region VR is in the imaging range of the original image data 55 (in the angle of view of the imaging part 18) from the determination unit 52, the display control unit 39 reads the origin coordinates 67 and the image size 68 stored in the storage unit 26. Then, as illustrated in FIG. 27 described above, the display control unit 39 searches for the original image data 55 including the corresponding region CR from the original image data 55 in the storage unit 26 on the basis of the position of the display region VR on the panoramic image data 43C, the origin coordinates 67 and the image size 68. The display control unit 39C trims the corresponding region CR from the original image data 55 that has been searched for (step S15C), outputs the trimming image data 57 after trimming to the display unit 28, and displays the trimming image data 57 on the display unit 28 (step S16C).

In a case where the user operates the operation panel 33 or the like to reset the display region VR, step S11C and the subsequent processes described above are repeatedly executed (YES in step S30).

[Effects of Fifth Embodiment]

As described above, in the imaging device 10C of the fifth embodiment, seamless switching between the display of the panoramic image data 43C with a resolution corresponding to the size of the display surface of the display unit 28 and the display of the trimming image data 56 or the display region VR in an enlarging manner based on the trimming image data 57 can be performed, it is possible to look down the subject and confirm details thereof, as in the first embodiment.

<Modification Example of Fifth Embodiment>

FIGS. 30A and 30B are illustrative diagrams illustrating movement of the position of the corresponding region CR within the original image data 55 and a first transition process in the imaging device 10C according to the fifth embodiment. FIG. 30C is an illustrative diagram illustrating a second transition process in the imaging device 10C of the fifth embodiment.

As illustrated in FIGS. 30A and 30B, in a case where the display control unit 39C of the fifth embodiment receives the operation for moving the position of the corresponding region CR irons the operation panel 33 during the display of the trimming image data 57 in the display unit 28, the display control unit 39C moves the position of the corresponding region CR within the original image data 55 according to this moving operation, as in the second embodiment, in a case where the display control unit 39C moves the position of the corresponding region CR to the image end in one piece of the original image data 55 among the pieces of original image data 55 that are adjacent to each other according to the moving operation, the display control unit 39C performs the temporarily stopping process described above.

Further, in a case where the moving operation for moving the position of the corresponding region CR toward the other original image data 55 is performed on the operation panel 33 after the temporarily stopping process, the display control unit 39C executes the first transition process described with reference to (A) and (B) of FIG. 15 or (C) and (D) of FIG. 15 of the second embodiment described above according to whether or not the corresponding region CR has a shape fit to the duplicate region DR.

Further, in the imaging device 10C of the fifth embodiment, the first imaging and the second imaging can be performed as described with reference to FIG. 18(B) of the third embodiment described above. In this case, as illustrated in FIG. 30C, the display control unit 39C executes the second transition process described with reference to FIG. 20 of the third embodiment described above according to performance of the moving operation for moving the position of the corresponding region CR from the one piece of first original image data 55A to the other first original image data 55A on the operation panel 33 after the temporarily stopping process.

In the imaging device 10C of the fifth embodiment, the sub-screen 59 may be displayed in a part of the display surfaces of the display unit 28 displaying the trimming image data 57 of the corresponding region CR, as described with reference to FIG. 13 of the first embodiment described above. Further, in the imaging device 10C of the fifth embodiment, imaging may be started from a preset orientation using the imaging unit 11B, as in the fourth embodiment described above (see FIGS. 22 to 24), and in a case where the panoramic image data 43C is displayed on the display unit 28, the orientation information 63 may be displayed together.

[Others]

In each of the above embodiments, the cylindrical transformation process has been exemplified as the projective transformation process that is performed on the plurality of pieces of captured image data 20 acquired from the imaging unit 11 or 11B. However, a projective transformation process other than the cylindrical transformation process may be performed. Further, the projective transformation process may be omitted. In this case, the image storage control unit 49 or 49A stores the plurality of pieces of captured image data 20 as a plurality of pieces of original image data 55 in the storage unit 26.

In each of the above embodiments, the tablet terminal 12, 12A, 12B, or 12C functions as the image processing device of the present invention. However, the generation of the panoramic image data 43 or 43C, the generation of the trimming image data 56 or 57, or the like may be executed in the imaging unit 11 or 11B side.

In each of the above embodiments, a pan and tilt camera is taken as an example of the imaging unit 11 or 11B, but a type of the imaging unit is not particularly limited, and a digital camera, a portable terminal, or the like may be used. In a case where the digital camera, the portable terminal, or the like is used, it is preferable for a device having an imaging assistance function (also referred to as a panoramic assistance function) to be used so that imaging can be executed while causing the imaging ranges to be partially duplicated before and after successive imaging in a case where imaging is performed successively while moving the imaging range in the horizontal direction. Further, in a case where the digital camera, the portable terminal, or the like is used as the imaging unit of the present invention, the imaging unit may also be caused to function as the image processing device of the present invention. Accordingly, the imaging device of the present invention can be realized by one device.

Although 360° around the imaging unit 11 or 11B is imaged in a dividing manner by the imaging unit 11 or 11B in each of the above-described embodiments, a range of imaging in a dividing manner may be less than 360°.

Although surroundings of the imaging unit 11 or 11B are imaged in a dividing manner while rotating the imaging unit 11 or 11B in each of the above-described embodiments, for example, the imaging may be executed continuously while moving the imaging unit 11 or 11B in an arbitrary direction including a horizontal direction instead of rotating the imaging unit 11 or 11B. Further, the imaging may be performed using a plurality of imaging units 11 or the like instead of being performed using one imaging unit 11 or the like.

In each of the above embodiments, the tablet terminals 12, and 12A to 12C have been described by way of example as the image processing device of the present invention, but it is also possible to apply the present invention to, for example, various image processing devices having an image processing function such as a personal computer, a server, and a portable terminal [a smartphone, a tablet terminal, a personal digital assistants (PDA), a portable game machine, or the like]. In this case, the storage unit 26 or the display unit 28 described in the above embodiments need not necessarily be provided integrally with the image processing device, but may be provided separately. Further, as described above, in the case where a device having an imaging function such as a mobile terminal is caused to function as the image processing device of the present invention, the imaging device of the present invention can be realized by a single device.

A program (the above-described program 30, or the like) for causing a computer to function as the imaging device described in each of the embodiments can be recorded on a compact disc read only memory (CD-ROM), a magnetic disk, or another computer-readable medium (tangible non-transitory information storage medium), and the program can be provided through the information storage medium. A program signal can be provided in a download service using a communication network such as the Internet, instead of an aspect in which the program is stored in such an information storage medium and provided.

<Configuration of Smartphone>

Hereinafter, an example of a smartphone to which the present invention (the image processing device and the imaging device) can be applied will be described.

FIG. 31 illustrates an external perspective view of a smartphone 500 to which the present invention can be applied. The smartphone 500 illustrated in FIG. 31 includes a plate-shaped casing 502, and includes a display panel 521 as a display unit on one surface of the casing 502, and a display and input unit 520 integrally formed with an operation panel 522 serving as an input unit. Further, the casing 502 includes a speaker 531, a microphone 532, an operation unit 540, a camera unit 541, and a light emitting diode (LED) light emitting unit 542. A configuration of the casing 502 is not limited thereto. For example, a configuration in which a display unit and an input unit are independent may be adopted or a configuration having a folding structure or a slide mechanism, can be adopted.

FIG. 32 is a block diagram illustrating a configuration of the smartphone 500 illustrated in FIG. 31. As illustrated in FIG. 32, main components of the smartphone 500 include a wireless communication unit 510, a display and input unit 520, a calling unit 530, an operation unit 540, a camera unit 541, a storage unit 550, an external input and output unit 560, a global positioning system (GPS) reception unit 570, a motion sensor unit 580, a power supply unit 590, and a main control unit 501. Further, a main function of the smartphone 500 includes a wireless communication function of performing mobile wireless communication via a base station device or a mobile communication network.

The wireless communication unit 510 performs wireless communication with the base station device accommodated in the mobile communication network according to an instruction from the main control unit 501. Using this wireless communication, transmission and reception of various types of file data such as audio data and image data, electronic mail data, or the like, or reception of Web data, streaming data, or the like is performed.

The display and input unit 520 is a so-called touch panel that displays an image (still image and a moving image), text information, or the like to visually transfer information to a user and detects a user operation for the displayed information under control of the main control unit 501, and includes a display panel 521 and an operation panel 522. In a case where a generated 3D image is viewed, the display panel 521 is preferably a 3D display panel.

The display panel 521 uses a liquid crystal display (LCD), an organic electro-luminescence display (OELD), or the like as a display device.

The operation panel 522 is a device that is mounted so that an image displayed on a display surface of the display panel 521 can be viewed and detects one or a plurality of coordinates at which the device is operated by a user's finger or a stylus. In a case where this device is operated by the user's finger or the stylus, a detection signal generated due to the operation is output to the main control unit 501. Then, the main control unit 501 detects an operation position (coordinates) on the display panel 521 on the basis of the received detection signal As illustrated in FIG. 31, the display panel 521 and the operation panel 522 of the smartphone 500 are integrally formed to constitute the display and input unit 520, but the operation panel 522 is arranged to completely cover the display panel 521. In a case where this arrangement is adopted, the operation panel 522 may have a function of detecting a user operation with respect to a region outside the display panel 521.

The operation panel 522 may include two sensitive regions including an outer edge portion and an inner portion other than the outer edge portion. Further, a width of the outer edge portion is appropriately designed according to a size of the casing 502, or the like. Further, examples of a position detection scheme adopted in the operation panel 522 may include a matrix switch scheme, a resistive film scheme, a surface acoustic wave scheme, an infrared scheme, an electromagnetic induction scheme, and an electrostatic capacitive scheme, and any of the schemes can be adopted.

The calling unit 530 includes a speaker 531 or a microphone 532, and converts user voice input via the microphone 532 into voice data which can be processed by the main control unit 501 and outputs the voice data to the main control unit 501, or decodes audio data received by the wireless communication unit 510 or the external input and output unit 560 and outputs decoded audio data from the speaker 531. Further, as illustrated in FIG. 31, for example, the speaker 531 and the microphone 532 can be mounted on the same surface as a surface on which the display and input unit 520 is provided.

The operation unit 540 is a hardware key using a key switch, and receives an instruction from the user. For example, the operation unit 540 is a push button type switch that is mounted on a lower portion or a lower surface of the display portion of the casing 502 of the smartphone 500, and is turned on in a case where the push button is pressed by a finger or the like and turned off by restoring force of a spring or the like in a case where the finger is released.

The storage unit 550 stores a control program or control data of the main control unit 501, address data associated with a name or a telephone number of a communication partner, data of a transmitted or received electronic mail, web data downloaded by web browsing, and downloaded content data, and temporarily stores streaming data or the like. The storage unit 550 includes an internal storage unit 551 built into a smartphone, and an external storage unit 552 having a slot for a detachable external memory. Each of the internal storage unit 551 and the external storage unit 552 constituting the storage unit 550 is realized using a storage medium such as a flash memory type memory, a hard disk type memory, a multimedia card micro type memory, a card type memory (for example, a micro SD (registered trademark) memory), a random access memory (RAM), or a read only memory (ROM). The storage unit 550 corresponds to the storage unit 26 of each of the above embodiments.

The external input and output unit 560 serves as an interface with all external devices connected to the smartphone 500, and is used for direct or indirect connection to other external devices through communication or the like (for example, Universal Serial Bus) or a network (for example, the Internet or a wireless local area network (LAN), Bluetooth (registered trademark), radio frequency identification (RFID), infrared communication (infrared Data Association: IrDA), ultra wideband (UWB) (registered trademark), or ZigBee (registered trademark)).

Examples of the external device connected to the smartphone 500 include a wired/wireless headset, a wired/wireless external charger, a wired/wireless data port, a memory card or a subscriber identity module (SIM)/a user identity module (UIM) card connected via a card socket, an external audio and video device that is connected via an audio and video input/output (I/O) terminal, a wirelessly connected external audio and video device, a wiredly/wirelessly connected smartphone, a wiredly/wirelessly connected personal computer, a wiredly/wirelessly connected PDA, and an earphone. The external input and output unit can transfer data received a transmission from such an external device to each component in the smartphone 500 or causes data in the smartphone 500 to be transferred to an external device.

According to an instruction of the main control unit 501, the GPS reception unit 570 receives a GPS signal transmitted from GPS satellite ST1 to STn, and executes a position measurement calculation process based on a plurality of received GPS signals to detect a position including latitude, longitude, and altitude of the smartphone 500. When the GPS reception unit 570 acquires position information from the wireless communication unit 510 or the external input and output unit 560 (for example, a wireless LAN), the GPS reception unit 570 can detect the position using the position information.

The motion sensor unit 580 includes, for example, a three-axis acceleration sensor, and detects a physical motion of the smartphone 500 according to an instruction of the main control unit 501. By detecting the physical motion of the smartphone 500, a direction or an acceleration at which the smartphone 500 moves is detected. A result of the detection is output to the main control unit 501.

The power supply unit 590 supplies power stored in a battery (not illustrated) to each unit of the smartphone 500 according to an instruction from the main control unit 501.

The main control unit 501 includes a microprocessor, operates according to a control program or control data stored in the storage unit 550, and generally controls respective units of the smartphone 500. Further, the main control unit 501 includes a mobile communication control function of controlling each unit of a communication system in order to perform voice communication or data communication via the wireless communication unit 510, and an application processing function.

The application processing function is realized by the main control unit 501 operating according to application software stored in the storage unit 550. Examples of the application processing function include an infrared communication function of controlling the external input and output unit 560 and performing data communication with a counterpart device, an electronic mail function of performing transmission and reception of an electronic mail, and a web browsing function of browsing web pages.

Further, the main control unit 501 includes an image processing function of, for example, displaying an image on the display and input unit 520 on the basis of image data (data of a still image or a moving image) such as received data or downloaded streaming data. The image processing function refers to a function in which the main control unit 501 decodes the image data, perform image processing on a result of decoding, and displays the image on the display and input unit 520.

Further, the main control unit 501 executes display control for the display panel 521, and an operation detection control for defecting a user operation though the operation unit 540 and the operation panel 522.

Through the execution of the display control, the main control unit 501 displays an icon for starting up an application software or a software key such as a scroll bar, or displays a window for creating an electronic mail. The scroll bar refers to a software key for receiving an instruction to move a display portion of the image, for example, for a large image which cannot be fit to the display panel 521.

Further, through the execution of the operation detection control, the main control unit 501 detects a user operation through the operation unit 540, receives an operation with respect to the icons through the operation panel 522 or an input of a character string to an input column of the window, or receives a request for scrolling of a display image through the scroll bar.

Further, through the execution of the operation detection control, the main control unit 501 includes a touch panel control function of determining an operating position with respect to the operation panel 522 is an overlapping portion overlapping the display panel 521 or an outer edge portion (a non-display region) that does not overlap the display panel 521 other than the display region, and controlling a sensitive region of the operation panel 522 or a display position of the software keys.

Further, the main control unit 501 can detect a gesture operation with respect to the operation panel 522, and execute a predetermined function according to the detected gesture operation. The gesture operation is not an existing simple touch operation and refers to an operation of drawing a trajectory using a finger or the like, simultaneously designating a plurality of positions, or combining them to draw a trajectory with respect to at least one of a plurality of positions.

The camera unit 541 is an imaging part for performing electronic imaging using a complementary metal oxide semiconductor (CMOS) or charge-coupled device (CCD) type imaging element.

The LED light emitting unit 542 includes a white LED and a near-infrared LED, turns on the white LED in a case where light quantity of the subject is insufficient in the visible light image capturing mode to emit white light from the white LED as auxiliary light at the time of capturing of the visible light image, and turns on the near-infrared LED in the near-infrared light image capturing mode to emit near-infrared light from the near-infrared LED as auxiliary light at the time of near-infrared light image capturing. Further, the near-infrared LED can be used as a light source for infrared communication in the case of the smartphone 500 having an infrared communication function.

Further, the camera unit 541 can convert the image data obtained by imaging into, for example, compressed image data such as JPEG (Joint Photographic coding Experts Group) and record the compressed image data in the storage unit 550 or output the compressed image data through the external input and output unit 560 or the wireless communication unit 510 under control of the main control unit 501. In the smartphone 500 illustrated in FIG. 31, the camera unit 541 is mounted on the same surface as the display and input unit 520, but a mounting position of the camera unit 541 is not limited thereto. The camera unit 541 may be mounted on a back surface of the display and input unit 520 or a plurality of camera units 541 may be mounted, in a case where the plurality of camera units 541 are mounted, switching to the camera unit 541 for imaging occurs and the camera unit 541 performs imaging alone, or imaging can be performed using the plurality of camera units 541.

Further, the camera unit 541 can be used for various functions of the smartphone 500. For example, the image acquired in the camera unit 541 can be displayed on the display panel 521 or the image of the camera unit 541 can be used as one operation input of the operation panel 522. Further, in a case where the GPS reception unit 570 detects a position, it is also possible to detect the position by referring to the image from the camera unit 541. Further, it is possible to determine the optical axis of the camera unit 541 of the smartphone 500 or determine a current use environment without using a three-axis acceleration sensor or in combination with the three-axis acceleration sensor by referring to the image from the camera unit 541. It is understood that the image from the camera unit 541 can be used in application software.

The main control unit 501 has functions that are the same as those of the control units 25, and 25A to 25C of the above embodiments, and corresponds to the image processing device of the present invention. Further, the camera unit 541 can be caused to function as the imaging unit of the present invention. In this case, it is preferable to mount the above-described imaging assistance function (panorama assistance function) on the smartphone 500.

<Invention Derived from Description of This Specification>

Further, the following invention can be derived, from the description of the present specification. FIGS. 33A and 33B are illustrative diagrams illustrating the invention derived from the description of the present specification. For example, as illustrated in FIG. 33A, in the first embodiment (also in the other embodiments), in a case where a selection operation such as a touch operation for selecting a part of the panoramic image data 43 displayed on the display unit 28 of the tablet terminal 12 is performed, the reduced image data 41B including coordinates at which the selection operation is performed in the panoramic image data 43 is defected. As illustrated in FIG. 33B, the display control unit 39 reads the original image corresponding to the defection result of the reduced image data 41B from the storage unit 26 and displays the original image on the display unit 28.

That is, an invention "an image processing device comprising: an image acquisition unit that acquires a plurality of captured images obtained by continuously executing imaging while moving an imaging range of an imaging unit in a horizontal direction, the plurality of captured images being obtained by executing imaging while causing the imaging ranges to be partially duplicated before and after successive imaging; a panoramic image generation unit that generates a panoramic image in which a plurality of reduced images obtained by performing a reducing process on the plurality of captured images are connected, from the plurality of captured images acquired by the image acquisition unit; an image storage control unit that stores the plurality of captured images before the reducing process by the panoramic image generation unit as original images in an image storage unit; a display control unit that displays the panoramic image generated by the panoramic image generation unit on a display unit; and an image detection unit that detects a reduced image including coordinates at which a selection operation is performed in the panoramic image in a case where a selection operation for selecting a part of the panoramic image displayed on the display unit is performed, wherein the display control unit reads the original image corresponding to a defection result of the image detection unit from the image storage unit on the basis of the detection result of the image detection unit and displays the original image on the display unit" is derived from the description of the present specification.

EXPLANATION OF REFERENCES

10, 10A to 10C: imaging device
11, 11B: imaging unit
12, 12A to 12C: tablet terminal
16: rotation table
18: imaging part
20: captured image data
25, 25A to 25C: control unit
26: storage unit
28: display unit
30: program
33: operation panel 35, 35A: image acquisition unit
36, 36A: projective transformation unit
37, 37A, 37C: cutting processing unit
38, 38A, 38C: panoramic image generation unit
39, 39A to 39C: display control unit
41A, 41Ac: cut image data
41B, 41Bc: reduced image data
41: transformed image data
43, 43C: panoramic image data
49, 49A: image storage control unit
51: display region setting unit
52: determination unit
55: original image data
55A: first original image data
55B: second original image data
56: trimming image data
57: trimming image data
59: sub-screen
61: geomagnetic sensor
65: origin coordinate storage control unit
67: origin coordinates

What is claimed is:

1. An image processing device comprising:
an image acquisition unit that acquires a plurality of captured images obtained by continuously executing imaging while moving an imaging range of an imaging unit in a horizontal direction, the plurality of captured images being obtained by executing imaging while causing imaging ranges to be partially duplicated before and after successive imaging;
a panoramic image generation unit that generates a panoramic image in which a plurality of reduced images obtained by performing a reducing process on the plurality of captured images are connected, from the plurality of captured images acquired by the image acquisition unit;
an image storage control unit that stores the plurality of captured images before the reducing process by the panoramic image generation unit as original images in an image storage unit;
a display control unit that displays the panoramic image generated by the panoramic image generation unit on a display unit;
a display region setting unit that sets a display region to be displayed in an enlarging manner in the panoramic images displayed on the display unit; and
a determination unit that determines whether or not the display region set by the display region setting unit is in the imaging ranges of the original images,
wherein the display control unit trims the display region from the panoramic image and displays the display region on the display unit in an enlarging manner in a case where the determination unit determines that the display region is not in the imaging ranges of the original images, and trims a corresponding region corresponding to the display region from the original images stored in the image storage unit and displays the corresponding region on the display unit in a case where the determination unit determines that the display region is in the imaging ranges of the original images.

2. The image processing device according to claim 1, wherein in a case where the corresponding region within the original images is displayed on the display unit and a case where the display control unit further receives a moving operation for moving the position of the corresponding region within the original images, the display control unit moves the position of the corresponding region to be trimmed from the original images according to the moving operation.

3. The image processing device according to claim 2, wherein the display control unit executes
a temporarily stopping process for temporarily stopping a movement of the position of the corresponding region in a case where, with respect to a first image and a second image among the original images, the first image and the second image being adjacent to each other, the position of the corresponding region is moved by the moving operation to an image end of the first image on a side adjacent to the second image, and
a first transition process of causing a first position of the corresponding region at the image end of the first image to transition to a second position corresponding to the first position within the second image in a case where the display control unit further receives a moving operation for moving the position of the corresponding region subjected to the temporarily stopping process from the first image to the second image.

4. An imaging device comprising:
an imaging unit, a rotation mechanism that rotates an imaging range of the imaging unit in a horizontal direction; and the image processing device according to claim 3.

5. The image processing device according to claim 2, wherein the imaging unit generates a first set of the plurality of captured images by performing first imaging each time the imaging unit is rotated by a predetermined rotation angle in a horizontal direction and generates a second set of the plurality of captured images by performing second imaging at a position further rotated by ½ of the predetermined rotation angle from a position of the first imaging each time the first imaging is performed,
the image acquisition unit acquires the first set of the plurality of captured images generated by the first imaging of the imaging unit and the second set of the plurality of captured images generated by the second imaging of the imaging unit,
the panoramic image generation unit generates the panoramic image from any one of the first set and the second set of the plurality of captured images,
the image storage control unit sets one of the first set and the second set of the plurality of captured images as first original images, sets the other of the first set and the second set of the plurality of captured images as second original images, and stores the original images including the first original images and the second original images in the image storage unit, and
the display control unit executes
a temporarily stopping process for temporarily stopping a movement of the position of the corresponding region in a case where, with respect to a first image and a second image among the first original images, the first image and the second image being adjacent to each other, the position of the corresponding region is moved by the moving operation to an image end of the first image on a side adjacent to the second image, and
a second transition process of causing a first position of the corresponding region at the image end within the first image to transition to a third position corresponding to the first position within one of the second original images captured between the first image and the second image in a case where the display control unit further receives a moving operation for moving the position of the corresponding region subjected to the temporarily stopping process from the first image to the second image.

6. An imaging device comprising:
an imaging unit, a rotation mechanism that rotates an imaging range of the imaging unit in a horizontal direction; and the image processing device according to claim 5.

7. An imaging device comprising:
an imaging unit, a rotation mechanism that rotates an imaging range of the imaging unit in a horizontal direction; and the image processing device according to claim 2.

8. The image processing device according to claim 1, wherein the image acquisition unit acquires the plurality of captured images generated by performing imaging each time the imaging unit is rotated by a predetermined rotation angle in a horizontal direction.

9. An imaging device comprising:
an imaging unit, a rotation mechanism that rotates an imaging range of the imaging unit in a horizontal direction; and the image processing device according to claim 8.

10. The image processing device according to claim 1, wherein the panoramic image generation unit generates the panoramic mage in which the plurality of reduced images are connected in a state in which the plurality of reduced images are made adjacent to each other at intervals therebetween in an order of imaging in the imaging unit, the panoramic image being a panoramic image in which a duplicate region between adjacent images among the plurality of reduced images in which the imaging ranges are partially duplicated is subjected to a cutting process with a preset width from image ends facing each other in the duplicate regions between the adjacent images.

11. The image processing device according to claim 10, wherein the preset width is set to such a size that adjacent images among the plurality of reduced images subjected to the cutting process partially overlap each other.

12. An imaging device comprising:
an imaging unit, a rotation mechanism that rotates an imaging range of the imaging unit in a horizontal direction; and the image processing device according to claim 10.

13. The image processing device according to claim 1, wherein the panoramic image generation unit generates the panoramic image in which the plurality of reduced images are connected in a state in which duplicate regions between adjacent images in which the imaging ranges are partially duplicated each other are overlapped,
the image processing device further includes an origin coordinate storage control unit that stores origin coordinates of each of the plurality of reduced images in the panoramic image in an origin coordinate storage unit in a case where the panoramic image generation unit generates the panoramic image, and
in a case where the determination unit determines that the display region is in the imaging ranges of the original images, the display control unit searches for one of the original images including the corresponding region from among the original images stored in the image storage unit on the basis of the display region set by the display region setting unit and the origin coordinates stored in the origin coordinate storage unit, trims the corresponding region of the one of the original images that has been searched for, and displays the corresponding region on the display unit.

14. The image processing device according to claim 1, further comprising:
a projective transformation unit that performs a projective transformation process for performing projective transformation on a same projection plane on the basis of an angle of view of the imaging unit, on the plurality of captured images acquired by the image acquisition unit,
wherein the panoramic image generation unit generates a panoramic image by connecting the plurality of reduced images generated from the plurality of captured images subjected to the projective transformation process by the projective transformation unit, and
the image storage control unit stores the plurality of captured images subjected to the projective transformation process by the projective transformation unit in the image storage unit as the original images.

15. The image processing device according to claim 1, wherein the display control unit displays an entire image indicating the entire panoramic image on a part of the display surface of the display unit in a case where the corresponding region is trimmed from the original images and displayed on the display unit.

16. The image processing device according to claim 15, wherein the display control unit superimposes and displays a range image indicating a range of the display region on the entire image.

17. An imaging device comprising:
an imaging unit, a rotation mechanism that rotates an imaging range of the imaging unit in a horizontal direction; and the image processing device according to claim 1.

18. The imaging device according to claim 17, wherein the imaging unit has an orientation detection function, and starts imaging from a preset orientation.

19. An image processing method comprising:
an image acquisition step of acquiring a plurality of captured images obtained by continuously executing imaging while moving an imaging range of an imaging unit in a horizontal direction, the plurality of captured images being obtained by executing imaging while causing imaging ranges to be partially duplicated before and after successive imaging;
a panoramic image generation step of generating a panoramic image in which a plurality of reduced images obtained by performing a reducing process on the plurality of captured images are connected, from the plurality of captured images acquired in the image acquisition step;
an image storage control step of storing the plurality of captured images before the reducing process in the panoramic image generation step as original images in an image storage unit;
a display control step of displaying the panoramic image generated in the panoramic image generation step on a display unit;
a display region setting step of setting a display region to be displayed in an enlarging manner in the panoramic images displayed on the display unit; and
a determination step of determining whether or not the display region set in the display region setting step is in the imaging ranges of the original images,
wherein the display control step includes trimming a corresponding region corresponding to the display region from the original images stored in the image storage unit and displaying the corresponding region on the display unit in a case where it is determined in the determination step that the display region is in the imaging ranges of the original images.

20. A computer-readable non-transitory tangible medium having a program causing a computer of an image processing device to function as:

an image acquisition unit that acquires a plurality of captured images obtained by continuously executing imaging while moving an imaging range of an imaging unit in a horizontal direction, the plurality of captured images being obtained by executing imaging while causing imaging ranges to be partially duplicated before and after successive imaging;

a panoramic image generation unit that generates a panoramic image in which a plurality of reduced images obtained by performing a reducing process on the plurality of captured images are connected, from the plurality of captured images acquired by the image acquisition unit;

an image storage control unit that stores the plurality of captured images before the reducing process by the panoramic image generation unit as original images in an image storage unit;

a display control unit that displays the panoramic image generated by the panoramic image generation unit on a display unit;

a display region setting unit that sets a display region to be displayed in an enlarging manner in the panoramic images displayed on the display unit; and a determination unit that determines whether or not the display region set by the display region setting unit is in the imaging ranges of the original images, wherein the display control unit trims the display region from the panoramic image and displays the display region on the display unit in an enlarging manner in a case where the determination unit determines that the display region is not in the imaging ranges of the original images, and trims a corresponding region corresponding to the display region from the original images stored in the image storage unit and displays the corresponding region on the display unit in a case where the determination unit determines that the display region is in the imaging ranges of the original images.

* * * * *